United States Patent [19]
Arai et al.

[11] 4,059,561
[45] Nov. 22, 1977

[54] FLAME-RESISTANT COMPOSITION CONTAINING A NORBORNENE DERIVATIVE POLYMER

[75] Inventors: Fumio Arai, Machida; Masaaki Kira, Yokohama; Shiro Kokuryo, Yokohama; Takashi Ueshima, Yokohama, all of Japan

[73] Assignee: Showa Denko Kabushiki Kaisha, Tokyo, Japan

[21] Appl. No.: 656,266

[22] Filed: Feb. 9, 1976

[30] Foreign Application Priority Data

Feb. 7, 1975 Japan .................................. 50-15280
Mar. 5, 1975 Japan .................................. 50-26085

[51] Int. Cl.$^2$ .............................................. C08K 5/00
[52] U.S. Cl. ........................ 260/45.8 R; 260/45.7 R; 260/45.8 RW
[58] Field of Search ........ 260/18 R, 45.7 RZ, 45.8 R, 260/45.9 R

[56] References Cited
U.S. PATENT DOCUMENTS

| | | | |
|---|---|---|---|
| 3,313,857 | 4/1967 | Gelfand | 260/45.7 RL X |
| 3,347,822 | 10/1967 | Jenkner | 260/45.7 RL X |
| 3,385,819 | 5/1968 | Gouinlock | 260/45.7 RL X |
| 3,392,136 | 7/1968 | Hindersinn et al. | 260/45.7 RL X |
| 3,396,201 | 8/1968 | Weil et al. | 260/45.7 RL X |
| 3,403,036 | 9/1968 | Hindersinn et al. | 260/45.7 RL X |
| 3,418,263 | 12/1968 | Hindersinn et al. | 260/45.7 RL X |
| 3,519,597 | 7/1970 | Weil et al. | 260/45.7 RL X |
| 3,796,772 | 3/1974 | Luce | 260/45.7 RL X |
| 3,806,492 | 4/1974 | Dombro | 260/45.7 RL |
| 3,856,758 | 12/1974 | Ueshima et al. | 260/78.4 N |
| 3,976,722 | 8/1976 | Carlson | 260/45.7 RL X |

*Primary Examiner*—Lewis T. Jacobs
*Attorney, Agent, or Firm*—Fitzpatrick, Cella, Harper & Scinto

[57] ABSTRACT

A flame-resistant composition of (a) a ring-opening polymerization product of a norbornene derivative and (b) a halogen-containing multicyclic compound or bromine-containing aromatic compound. The composition is employed in shaped articles and structural materials which are subjected to flame and heat exposure.

46 Claims, No Drawings

FLAME-RESISTANT COMPOSITION CONTAINING A NORBORNENE DERIVATIVE POLYMER

BACKGROUND OF THE INVENTION

This invention relates to a flame-resistant composition of (a) a ring-opening polymerization product of a norbornene derivative and (b) a halogen-containing multicyclic compound or bromine-containing aromatic compound and to articles formed from the flame-resistant composition.

The preparation of the cyano derivative of norbornene was described in the article by H. L. Holmes appearing in "Organic Reaction," Volume 4, pages 60 to 173, published in 1948 by John Wiley and Sons Inc. These monomers were obtained by reacting dicyclopentadiene with acrylonitrile or other vinyl compounds containing the nitrile group, by a Diels-Alder reaction. It has been discovered that cycloolefins such as norbornene and the cyano derivative thereof can be subjected to a ring-opening polymerization to form a new type of polymer. The product formed by the ring-opening polymerization of norbornene derivatives containing the nitrile group, such as 5-cyano-bicyclo [2,2,1]-heptene-2, using a tungsten and/or molybdenum catalyst has been reported in U.S. Pat. No. 3,856,758. This product has greater impact strength than polyvinyl chloride resin (PVC) and polypropylene resin (PP). The tensile strength and hardness of the polymerized, ring-opened, nitrile norbornene derivative is comparable to that of PVC and higher than that of PP. Further, the ring-opened polymer displays high heat resistance, owing, in part, to its high glass transition temperature.

It has been shown that other norbornene derivative monomers containing at least one polar group, such as the ester, ether, imide, halogen and the like, group, can be prepared by a Diels-Alder reaction or other appropriate synthesis. These polar group containing norbornene derivative monomers can then be subjected to a ring-opening polymerization reaction using the catalytic system described in U.S. Pat. No. 3,856,758 or Japanese Patent Application Laid-open No. 112500/75, Laid-open Sept. 3, 1975 to provide ring-opening polymerization norbornene derivatives having excellent mechanical properties. It has been found that the ring-opened polymerization product of a norbornene derivative containing at least one polar group has high impact strength at room temperature and low temperatures. Such products also exhibit higher transparency than PVC and PP and also display good moldability. Owing to these and other factors, shaped articles can be formed from such norbornene ring-opened polymeric derivatives as, for example, containers, films, sheets and pipes. The ring-opened products exhibit good workability and can be employed in the molding process widely employed in the field of synthetic resins, such as extrusion molding, injection molding, blow molding and compression molding.

It has long been desired in the plastics industry to produce resinous compositions with good moldability, mechanical strength and high flame-resistant properties. Such plastics are needed in a variety of products such as consumer electrical appliances, heat resistant casings for industry and the like. It has been found that the ring-opened norbornene polymerization products per se, set forth above do not always possess satisfactory flame retardancy.

As a result, certain conventional and other flame retardants have been proposed for incorporation to the ring-opened norbornene derivatives. It has been found that high flame resistance can be obtained by incorporating a halogen-containing phosphate in the ring-opened polymerization product of a norbornene derivative. The composition excels in flame retardancy and does not produce a cross-linked material on working (a gel material) and can successfully be fabricated into various shapes. Unfortunately, the composition does not always possess satisfactory heat resistance.

Attempts to modify the halogen-containing phosphate to improve its heat resistance have proved unsatisfactory. When amounts of halogen in the phosphate are varied in an attempt to improve heat resistance, the resultant composition containing the norbornene polymer forms a gel at the time of blending, and, consequently, its workability markedly deteriorates and the resulting product is discolored. Products made from this composition, therefore, do not have the requisite luster and transparency for practical use.

Attempts have been made to combine a conventional flame retardant commercially employed in olefinic polymers in the ring-opened polymerization products. The resulting products do not have uniformly acceptable properties. For example, compositions obtained by mixing ring-opened norbornene polymerization products with chlorinated paraffin, tetrabromobutane or tetrabromobisphenol A, each conventional flame retardants employed in synthetic resins, are not heat stable. When such compositions are heated at the time of blending or working, a gel is produced. It is difficult to work the gel into a suitable product. Further the resultant product is deeply dicolored and lacks commercial luster and appeal.

SUMMARY OF THE INVENTION

It is, therefore, a primary objective of the present invention to provide a thermally stable, flame-resistant composition of a ring-opening polymerization product of a norbornene derivative containing at least one polar group.

It is another objective of the invention to provide a flame-resistant composition containing a ring-opening polymerization product of a norbornene derivative having good thermal stability such that no gel is produced during the heating of the composition on blending or working.

It is an additional objective of the invention to provide a flame-resistant composition having acceptable mechanical properties such as tensile strength and impact strength.

Further, it is a further objective of the invention to provide a lustrous flame-resistant composition free from discoloration when formed into shaped articles.

Other objects, features and advantages will be apparent from the following detailed discussion.

The above and other objects are achieved in a thermally stable, flame-resistant resinous composition comprising (a) a ring-opening polymerization product of a norbornene derivative containing at least one polar group, and (b) a flame retarding compound in sufficient amounts to elevate the flame resistance of said composition without reducing mechanical strength thereof, said flame retarding compound selected from the group consisting of a halogen-containing multicyclic compound and a brominecontaining aromatic compound.

The halogen-containing multicyclic compound is of the general formula (1) to (3) as follows:

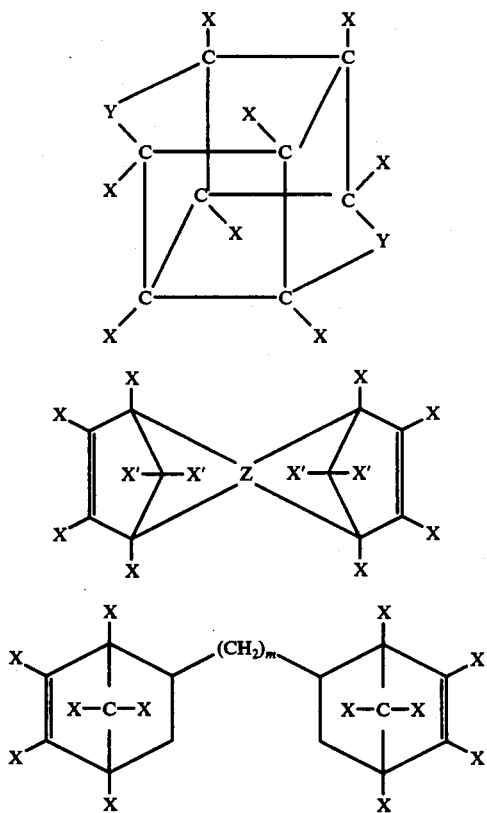

wherein X is chlorine or bromine, X' is fluorine, chlorine, bromine, alkyl, alkoxy having 1-20 carbon atoms,

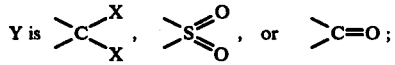

Z is a tetravalent cyclic hydrocarbon group having at least 5 carbon atoms and m is an integer from 4-16.

The bromine-containing aromatic compound is of the general formula (4) to (6) as follows:

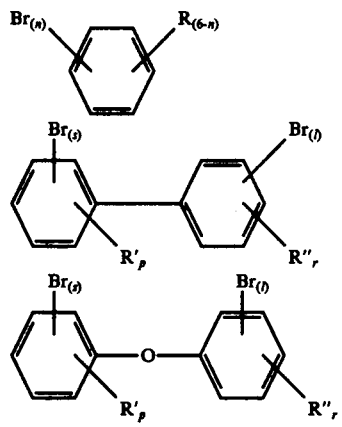

wherein R is hydrogen, alkyl having 1-6 carbon atoms, bromoalkyl, or hydroxy wherein one R, but not more than one R, is hydroxy; R' and R" are hydrogen or alkyl having 1-6 carbon atoms, $n$ is an integer from 3-6; $l$, $s$, $p$ and $r$ are each integers; the sum of $l$ plus $s$ is an integer from 2-10; and the sum of $l$, $s$, $p$ and $r$ is 10.

A Group III - V metal inorganic compound can be employed in the flame-resistant composition of the invention to improve flame retardance. The addition of a carboxylic acid further enhances the thermal stability of the composition of the invention. If desired, a dehydrochlorination inhibitor may be employed in the composition of the invention to enhance the heat resistance of the composition.

The ring-opening polymerization product of the norbornene derivative containing at least one polar group can be employed alone, or in combination with a resinous moiety, such as a resinous material and/or a rubber.

DESCRIPTION OF THE PREFERRED EMBODIMENTS

Preferred ring-opening polymerization products of norbornene derivatives containing at least one polar group include a ring-opening polymerization homopolymer of a norbornene derivative containing at least one nitrile group; a ring-opening polymerization homopolymer of a norbornene derivative containing at least one ester group; a ring-opening polymerization homopolymer of a norbornene derivative containing at least one ether group; a ring-opening polymerization homopolymer of a norbornene derivative containing at least one N-substituted cyclic imide group; a ring-opening polymerization homopolymer of a norbornene derivative containing at least one halogen atom; a ring-opening polymerization copolymer of the aforesaid norbornene derivatives; and copolymers obtained by the ring-opening polymerization of a mixture of more than about 50 mole percent of the aforesaid norbornene derivatives as the major component and, as the minor component, an unsaturated cyclic compound.

The cyanonorbornene derivative used as a monomer in preparing the above-mentioned ring-opening polymerization product contains at least one nitrile group or a substituent including said nitrile group at the 5 and/or 6 positions of bicyclo[2,2,1]-heptene-2 as shown in the following general formula:

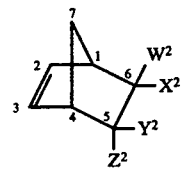

where:
$W^2$, $X^2$, $Y^2$, $Z^2$ = the same or different ones selected from the group consisting of hydrogen atom, nitrile group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the nitrile group, at least one of said $W^2$, $X^2$, $Y^2$ and $Z^2$ being a nitrile group or said hydrocarbon radicals substituted by the nitrile group.

The hydrocarbon radicals substituted by the nitrile group include a cyanomethyl radical, cyanoethyl radical, cyanopropyl radical, cyano-n-butyl radical, cyano-isobutyl radical and ω-cyano-n-heptyl radical. The hydrocarbon radicals include a methyl radical, ethyl radical, propyl radical, n-butyl radical, isobutyl radical, octyl radical, phenyl radical, cyclohexyl radical and 2-octenyl radical.

The above-mentioned cyano-substituted norbornene derivatives can be synthesized by the Diels-Alder reaction between cyclopentadiene and vinyl compounds containing a nitrile group or substituent including said nitrile group, for example, acrylonitrile, methacrylonitrile, vinylidene cyanide, and maleonitrile (refer to "Organic Reactions" by H. L. Holmes, Vol. 4, pp. 60 to 173, 1948, published by John Wiley and Sons, Inc.).

Formation of said cyano-substituted norbornene derivatives is also obtained by reacting di-cyclopentadiene with the above-mentioned vinyl compounds. Typical cyanosubstituted norbornene derivatives are 5-cyano-bicyclo[2,2,1]-heptene-2, 5-methyl-5-cyano-bicyclo[2,2,1]-heptene-2, 5-ethyl-5-cyano-bicyclo[2,2,1]-heptene-2, 5-n-propyl-5-cyano-bicyclo [2,2,1]-heptene-2, 5-n-butyl-5-cyano-bicyclo[2,2,1]-heptene-2, 5-isobutyl-5-cyano-bicyclo[2,2,1]-heptene-2, 5-n-octyl-5-cyano-bicyclo[2,2,1]-heptene-2, 5-phenyl-5-cyano-bicyclo [2,2,1]-heptene-2, 5-cyclohexyl-5-cyano-bicyclo[2,2,1]-heptene-2, 5-(2-octenyl)-5-cyano-bicyclo[2,2,1]-heptene-2, 5,5-dicyano-bicyclo[2,2,1]-heptene-2, 5,6-dicyano-bicyclo [2,2,1]-heptene-2, 5-methyl-6-cyano-bicyclo[2,2,1]-heptene-2, 5-ethyl-6-cyano-bicyclo[2,2,1]-heptene-2, 5-n-butyl-6-cyano-bicyclo[2,2,1]-heptene-2, 5-isobutyl-6-cyano-bicyclo [2,2,1]-heptene-2, 5-phenyl-6-cyano-bicyclo[2,2,1]-heptene-2 5-cyanomethyl-bicyclo[2,2,1]-heptene-2, 5-cyanoethyl-bicyclo[2,2,1]-heptene-2, 5-(cyano-n-butyl)-bicyclo[2,2,1]-heptene-2, 5-(cyano-isobutyl)-bicyclo[2,2,1]-heptene-2, 5-(ω-cyano-n-heptyl)-bicyclo[2,2,1]-heptene-2, and 5-cyanophenylbicyclo[2,2,1]-heptene-2. In this derivative, the substituent is attached to the chain in the endo and exo positions.

The ester type norbornene derivative used as a monomer in preparing the ring-opening polymerization product employed in this invention contains at least one ester group or substituent including said ester group at the 5 and/or 6 positions of bicyclo[2,2,1]-heptene-2, as shown in the following general formula:

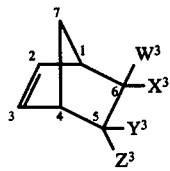

where:
W³, X³, Y³, Z³ = the same or different ones selected from the group consisting of hydrogen atom, ester group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the ester group, at least one of said W³, X³, Y³ and Z³ being an ester group of said hydrocarbon radicals substituted by the ester group. The above-mentioned ester type norbornene derivatives can be synthesized by the Diels-Alder reaction between cyclopentadiene and vinyl compounds containing either an ester group or a substituent including said ester group (for example, methyl acrylate, methyl methacrylate, dimethyl maleate, hexyl crotonate, and vinyl acetate), and also between dicyclopentadiene and said vinyl compounds.

Typical ester type norbornene derivatives are 5-methoxycarbonyl-bicyclo[2,2,1]-heptene-2, 5-ethoxycarbonylbicyclo[2,2,1]-heptene-2, 5-butoxycarbonyl-bicyclo[2,2,1]-heptene-2, 5-allyloxycarbonyl-bicyclo[2,2,1]-heptene-2, 5-methyl-5-methoxycarbonyl-bicyclo[2,2,1]-heptene-2, 5-hexyloxycarbonyl-6-methyl-bicyclo[2,2,1]-heptene-2, 5-ethoxycarbonyl-6-phenyl-bicyclo[2,2,1]-heptene-2, 5-heptyl-6-octyloxycarbonyl-bicyclo [2,2,1]-heptene-2, 5-methoxycarbonyl-6-methoxycarbonylmethylbicyclo[2,2,1]-heptene-2, 5,6-dimethoxycarbonyl-bicyclo[2,2,1]-heptene-2, 5,6-diethoxy-carbonyl-bicyclo[2,2,1]-heptene-2, 5,5-dibutoxycarbonyl-bicyclo[2,2,1]-heptene-2, 5-methyl-6,6-dimethoxycarbonyl-bicyclo[2,2,1]-heptene-2, 5-ω-methoxycarbonylheptyl-6-octyl-bicyclo[2,2,1]-heptene-2, 5-ω-methoxycarbonyl-2-decenyl-6-pentyl-bicyclo[2,2,1]-heptene-2, 5-ω-methoxycarbonyl-6-heptyl-2-octenyl-bicyclo[2,2,1]-heptene-2, 5-acetoxymethyl-bicyclo[2,2,1]-heptene-2, 5-acetoxy-bicyclo [2,2,1]-heptene-2, 5-propionoxymethyl-bicyclo[2,2,1]-heptene-2, and 5-stearoxy-methyl-bicyclo[2,2,1]-heptene-2. In this derivative, the substituent is attached to the chain in the endo and exo positions.

Ether type norbornene derivatives used as a monomer in preparing the ring-opening polymerization product employed in this invention contain at least one ether group or substituent including said ether group at the 5 and/or 6 positions of bicyclo-[2,2,1]-heptene-2, as shown in the following general formula:

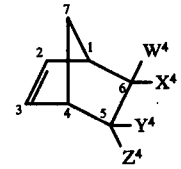

where:
W⁴, X⁴, Y⁴, Z⁴ = the same or different ones selected from the group consisting of hydrogen atom, ether group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the ether group, at least one of said W⁴, X⁴, Y⁴ and Z⁴ being an ether group or said hydrocarbon radicals substituted by the ether group.

The hydrocarbon radicals substituted by the ether group include a methoxy radical, ethoxy radical, propoxy radical, n-butoxy radical, isobutoxy radical, n-octyloxy radical, methoxy methyl radical, 2-methoxyethyl radical, phenoxy radical and benzyloxy radical. The hydrocarbon radicals include a methyl radical, ethyl radical, propyl radical, n-butyl radical, isobutyl radical, octyl radical, phenyl radical, cyclohexyl radical and 2-octenyl radical.

The above-mentioned ether type norbornene derivatives can be synthesized by the Diels-Alder reaction between cyclopentadiene and vinyl compounds containing either an ether group or substituent including said ether group (for example, methylvinyl ether, n-butylvinyl ether, cyclohexylvinyl ether, allylmethyl ether, 1,3-dimethoxypropylene, and phenylvinyl ether), and also between dicyclopentadiene and said vinyl compounds.

Typical ether type norbornene derivatives are 5-methoxy-bicyclo[2,2,1]-heptene-2, 5-ethoxy-bicyclo[2,2,1]-heptene-2, 5-n-propoxy-bicyclo[2,2,1]-heptene-2, 5-isopropoxybicyclo[2,2,1]-heptene-2, 5-n-butoxy-bicyclo[2,2,1]-heptene-2, 5-cyclohexoxy-bicyclo[2,2,1]-heptene-2, 5-methoxymethyl-bicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2. In this derivative, the substituent is attached to the chain in the endo and exo positions as in the cyano-substituted norbornene derivatives and ester type norbornene derivatives.

The N-substituted cyclic imide type norbornene derivatives may be broadly divided into two types. One type is imide type norbornene derivatives obtained from those norbornene derivatives which contain a cyclic carboxylic anhydride group (hereinafter referred to as the "A-type imide type norbornene derivatives"). The other type is imide type norbornene derivatives obtained from norbornene derivatives containing an amino group and a cyclic acid anhydride (hereinafter referred to as the "B-type imide type norbornene derivatives").

The A-type imide type norbornene derivatives can be prepared by reacting primary amines with the later described norbornene derivatives containing an acid anhydride group which can be synthesized by the Diels-Alder reaction between cyclopentadiene or dicyclopentadiene and vinyl compounds containing a cyclic carboxylic anhydride group.

On the other hand, the B-type imide type norbornene derivatives can be easily obtained by the reaction between the later described norbornene derivatives containing an amino group or substituent including said amino group and cyclic carboxylic anhydride, using a process resembling the N-phenyl maleimide synthesizing process proposed by M.P. Cava (Refer to "Organic Syntheses" by John D. Roberts, Vol. 41, pp. 93 to 95, 1961, published by John Wiley and Sons, Inc.).

Typical A-type imide type norbornene derivatives are N-substituted-3,6-methylene-1,2,3,6-tetrahydro-cis-phthalimide compounds, N-substituted-3,6-methylene-1-methyl-1,2,3,6-tetrahydro-cis-phthalimide compounds, bicyclo[2,2,1]-hepta-2-ene-5-spiro-3'-CN-substituted succinimide compounds, 2-substituted-2-aza-1,3-dioxo-5,8-methano-1,2,3,4,4a,5,8,8a-octahydronaphthalene compounds, N-substituted-5,8-methano-1,2,3,4,4a,5,8,8a-octahydronaphthalene-2,3-dicarboxyimide compounds, N-substituted-5,8-methano-2-methyl-1,2,3,4,4a,5,8,8a-octahydronaphthalene-2,3-dicarboxyimide compounds, 1,4-methano-1,4,4a,5,6,7,8,8a-octahydronaphthalene-6-spiro-3'-(N-substituted succinimide) compounds, 2-substituted-2-aza-1,3-dioxo-5,8-methano-1,2,3,4,4a,5,8,8a,9,9a,10,10a-dodecahydroanthracene compounds, N-substituted-1,4,5,8-dimethano-1,2,3,4,4a,5,8,8a-octahydronaphthalene-2,3-dicarboxyimide compounds, N-substituted-1,4,5,8-dimethano-2-methyl-1,2,3,4,4a,5,8,8a-octahydronaphthalene-2,3-dicarboxyimide compounds, 1,4,5,8-dimethano-2-methyl-1,2,3,4,4a,5,8,8a-octahydronaphthalene-2,3-dicarboxyimide compounds, N-substituted-2-aza-5,8,9,10-dimethano-1,3-dioxo-1,2,3,4,4a,5,8,8a,9,9a,10,10a-dodecahydroanthracene compounds, and N-substituted-4-(5-bicyclo[2,2,1]-hepta-2-enyl) phthalimide compounds.

Typical N-substituted-3,6-methylene-1,2,3,6-tetrahydro-cis-phthalimide compounds have the following general formula:

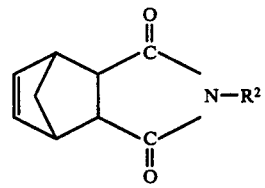

where:
R² = a hydrocarbon radical selected from the group consisting of an alkyl radical having 1 to 10 carbon atoms, alkenyl radical having 2 to 10 carbon atoms, cycloalkyl radical or cycloalkenyl radical having 4 to 10 carbon atoms, aryl radical having 6 to 10 carbon atoms, aryl radical substituted by an alkyl radical having 1 to 10 carbon atoms and aralkyl radical having 7 to 10 carbon atoms, or —(CH₂)$_t$COOR³ (where $t$ is an integer of 1 to 10 and R³ denotes one of the above-mentioned hydrocarbon radicals) or —(CH₂)$_t$OCOR³ (where $t$ again is an integer of 1 to 10 and R³ represents one of the above hydrocarbon radicals).

The N-substituted-3,6-methylene-1,2,3,6-tetrahydro-cis-phthalimide compounds are exemplified by N-methyl-3,6-methylene-1,2,3,6-tetrahydro-cis-phthalimide, N-ethyl-3,6-methylene-1,2,3,6-tetrahydro-cis-phthalimide, N-hexyl-3,6-methylene-1,2,3,6-tetrahydro-cis-phthalimide, N-amyl-3,6-methylene-1,2,3,6-tetrahydro-cis-phthalimide, N-decyl-3,6-methylene-1,2,3,6-tetrahydro-cis-phthalimide, N-cyclohexyl-3,6-methylene-1,2,3,6-tetrahydro-cis-phthalimide, N-(4-methylcyclohexyl)-3,6-methylene-1,2,3,6-tetrahydro-cis-phthalimide, N-phenyl-3,6-methylene-1,2,3,6-tetrahydro-cis-phthalimide, N-(4-ethylphenyl)-3,6-methylene-1,2,3,6-tetrahydro-cis-phthalimide, N-methoxycarbonyl-3,6-methylene-1,2,3,6-tetrahydro-cis-phthalimide, N-ethoxycarbonylmethyl-3,6-methylene-1,2,3,6-tetrahydro-cis-phthalimide, and N-acetoxy-3,6-methylene-1,2,3,6-tetrahydro-cis-phthalimide.

Other useful A-type imide type norbornene derivatives have a general formula as set forth in Japanese Patent Application Laid-open No. 75300/75, Laid-open June 20, 1975.

The B-type imide type norbornene derivatives typically include N-[ω-(5-bicyclo[2,2,1]-hepta-2-enyl) alkyl substituted]-maleimide compounds, N-[ω-(5-bicyclo[2,2,1]-hepta-2-enyl) alkyl substituted]-citraconimide compounds, N-[ω-(5-bicyclo[2,2,1]-hepta-2-enyl) alkyl substituted]-glutaconimide compounds, N-[ω-(5-bicyclo[2,2,1]-hepta-2-enyl) alkyl substituted]-succinimide compounds, N-[ω-(5-bicyclo[2,2,1]-hepta-2-enyl) alkyl substituted]-phthalimide compounds, N-[ω-(5-bicyclo[2,2,1]-hepta-2-enyl) alkyl substituted]-naphthalene-1,8-dicarboxyimide compounds, and N-[ω-(5-bicyclo[2,2,1]-hepta-2-enyl) alkyl substituted]-naphthalene-2,3-dicarboxyimide compounds.

Typical N-[ω-(5-bicyclo[2,2,1]-hepta-2-enyl alkyl substituted]maleimide compounds may be expressed by the following general formula:

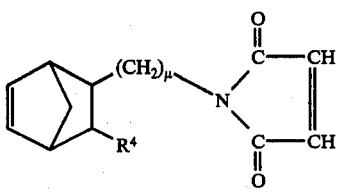

where:
R⁴ = an alkyl radical having 1 to 20 carbon atoms
μ = an integer of 1 to 20

Typical N-[ω-(5-bicyclo[2,2,1]-hepta-2-enyl) alkyl substituted]maleimide compounds are N-(5-bicyclo[2,2,1]-hepta-2-enyl) methylmaleimide, N -[3-(5-bicyclo[2,2,1]-hepta-2-enyl)propyl]maleimide, N-[6-(5-bicyclo[2,2,1]-hepta-2-enyl) hexyl]maleimide, N-[12-(5-bicyclo[2,2,1]-hepta-2-enyl) dodecyl]maleimide, N-(6-methyl-5-bicyclo[2,2,1]-hepta-2 enyl)methylmaleimide, N-[4-(6-methyl-5-bicyclo[2,2,1]-hepta-2-enyl)butyl]-maleimide, N-[10-(6-methyl-5-bicyclo[2,2,1]-hepta-2-enyl)decyl]maleimide, N-[16-(6-methyl-5-bicyclo[2,2,1]-hepta-2-enyl)hexadecyl]maleimide, N-(6-ethyl-bicyclo[2,2,1]-hepta-2-enyl)methylmaleimide, N-[2-(6-ethyl-5-bicyclo[2,2,1]-hepta-2-enyl)ethyl]maleimide, N-[8-(6-ethyl-5-bicyclo[2,2,1]-hepta-2-enyl)octyl]maleimide, N-[18-(6-ethyl-5-bicyclo[2,2,1]-hepta-2-enyl)octadecyl]maleimide, N-[3-(6-propyl-5-bicyclo[2,2,1]-hepta-2-enyl)propyl]maleimide, N-[9-(6-propyl-5-bicyclo[2,2,1]-hepta-2-enyl)nonyl]maleimide, N-[11-(6-butyl-5-bicyclo[2,2,1]-hepta-2-enyl) undecyl]-maleimide, N-(6-hexyl-5-bicyclo[2,2,1]-hepta-2-enyl) methylmaleimide, N-(6-dodecyl-5-bicyclo[2,2,1]-hepta-2-enyl) methylmaleimide, N'-[12-(6-dodecyl-5-bicyclo[2,2,1]-hepta-2-enyl) dodecyl]maleimide, and N-(6-octadecyl-5-bicyclo[2,2,1]-hepta-2-enyl) methylmaleimide.

B-type imide type norbornene derivatives other than the N-[ω-(5-bicyclo[2,2,1]-hepta-2-enyl) alkyl substituted]maleimide compounds may be typically exemplified in the same manner as described above. Said other B-type imide type norbornene derivatives may be expressed by the general formula presented in Japanese Patent Application Laid-open No. 75300/75, Laid-open June 20, 1975.

Typical examples of other imide type norbornene derivatives are described in U.S. Pat. No. 3,959,234, issued May 25, 1976.

The halogenated norbornene derivatives contain at least one halogen atom or substituent including said halogen atom at the 5 and/or 6 positions of bicyclo[2,2,1]-heptene-2, as shown in the following general formula:

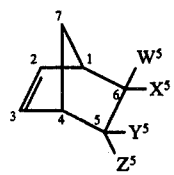

where:
W⁵, X⁵, Y⁵, Z⁵ = the same or different ones selected from the group consisting of hydrogen atom, halogen atom, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms, and aralkyl radical having 7 to 20 carbon atoms, and said hydrocarbon radicals substituted by the halogen atom, at least one of said W, X, Y and Z being a halogen atom, or said hydrocarbon radicals substituted by the halogen atom.

The above-mentioned halogenated norbornene derivatives can be synthesized by the Diels-Alder reaction between cyclopentadiene and halogen atom-bearing compounds (for example, vinyl chloride, 1,2-dichloroethylene, vinyl bromide, and vinylidene chloride), and also between said halogen atom-bearing compounds and dicyclopentadiene. Typical halogen type norbornene derivatives include 5-chloro-bicyclo[2,2,1]-heptene-2, 5-chloromethyl-bicyclo[2,2,1]-heptene-2, 5-chloro-5-methyl-bicyclo[2,2,1]-heptene-2, 5-chloro-6-methyl-bicyclo[2,2,1]-heptene-2, 5-chloromethyl-6-methyl-bicyclo[2,2,1]-heptene-2, 5-chloromethyl-6-ethyl-bicyclo[2,2,1]-heptene-2, 5-(α-chloroethyl)-bicyclo[2,2,1]-heptene-2, 5-(β-chloroethyl)-bicyclo[2,2,1]-heptene-2, 5-chloromethyl-5-ethyl-bicyclo[2,2,1]-heptene-2, 5-chloro-5-propyl-bicyclo[2,2,1]-heptene-2, 5-chloro-6-n-butyl-bicyclo[2,2,1]-heptene-2, 5-chloro-5-isobutyl-bicyclo[2,2,1]-heptene-2, 5-chloro-5-isobutyl-bicyclo[2,2,1]-heptene-2, 5-(β-chloropropyl)-bicyclo[2,2,1]-heptene-2, 5-(α-chloropropyl)-bicyclo[2,2,1]-heptene-2, 5-chloromethyl-6-methyl-bicyclo[2,2,1]-heptene-2, 5-chloro-6-cyclohexyl-bicyclo[2,2,1]-heptene-2, 5,5-dichloro-bicyclo[2,2,1]-heptene-2, 5,6-dichloro-bicyclo[2,2,1]-heptene-2, 5,5-dichloro-6-methyl-bicyclo[2,2,1]-heptene-2, 5,6-dichloro-5-methyl-bicyclo[2,2,1]-heptene-2, 5-chloro-6-chloromethyl-bicyclo[2,2,1]-heptene-2, 5,5-dichloro-6-ethyl-bicyclo[2,2,1]-heptene-2, 5,6-dichloro-5-ethyl bicyclo[2,2,1]-heptene-2, 5-(α-dichloroethyl)-bicyclo[2,2,1]-heptene-2, 5-chloro-5-methyl-6-chloromethyl-bicyclo[2,2,1]-heptene-2, 5,5-dichloromethyl-bicyclo[2,2,1]-heptene-2, 5,6-dichloromethyl-bicyclo[2,2,1]-heptene-2, 5-chloromethyl-5-methyl-6-chloro-bicyclo[2,2,1]-heptene-2, 5,5-dichloro-6-n-propyl-bicyclo[2,2,1]-heptene-2, 5,6-dichloro-5-isobutyl-bicyclo[2,2,1]-heptene-2, 5,5-dichloro-6-hexyl-bicyclo[2,2,1]-heptene-2, 5,5,6-trichloro-bicyclo[2,2,1]-heptene-2 and 5,5,6,6-tetrachloro-bicyclo[2,2,1]-heptene-2. In addition all or portion of the chlorine atoms of the above halogenated norbornene derivatives may be replaced with a fluorine atom and/or a bromine atom.

The ring-opening polymerization homopolymers prepared from the respective types of norbornene derivatives may be used alone. In addition, copolymers obtained by the ring-opening polymerization of two or more of the above-mentioned types of norbornene derivatives can be employed. Further, a mixture of a major proportion (over 50 mole percent) of any of said norbornene derivatives as a main component and a minor proportion (less than 50 mole percent) of an unsaturated cyclic compound may also be employed. This unsaturated cyclic compound is exemplified by acid anhydride type norbornene derivatives, aromatic norbornadiene derivatives, ester type norbornadiene derivatives, aromatic nitrogen-containing heterocyclic norbornene derivatives, amide type norbornene derivatives, aromatic norbornene derivatives, including aromatic dimethanooctahydronaphthalene derivatives and cycloolefinic compounds.

Typical acid anhydride type norbornene derivatives are 3,6-methylene-1,2,3,6-tetrahydro-cis-phthalic anhydride, 6-(5-carboxy-bicyclo[2,2,1]-hepta-2-enyl)acetic anhydride, 3,6-methano-1-methyl-1,2,3,6-tetrahydro-cis-phthalic anhydride, 2-oxa-1,4-dioxo-5,8-methano-1,2,3,4,4a,5,8,8a-octahydronaphthalene, 5,8-methano-1,2,3,4,4a,5,8,8a-octahydronaphthalene-1,2-dicarboxylic anhydride, 5,8-methano-1-methyl-1,2,3,4,4a,5,8,8a-octahydronaphthalene-2,3-dicarboxylic anhydride, 4,7-methano-1-methyl-1,2,3,3a,4,7,7a,8-naphthalene-1,2-dicarboxylic anhydride, 1,4,5,8-dimethano-1,2,3,4,4a,5,8,8a-octahydronaphthalene-2,3-dicarboxylic anhydride, 2-oxa-1,3-dioxo-1,2,3,4,4a,5,8,8a,9,9a,10,10a-dodecahydroanthracene and 4-(5-bicyclo [2,2,1]-hepta-2-enyl) phthalic anhydride.

These and other such compounds are set forth in Japanese Patent Application Laid-open No. 58200/75, Laid-open May 20, 1975.

The aromatic norbornene derivatives contain at least one aromatic hydrocarbon radical or substituent including said aromatic hydrocarbon radical at the 5 and/or 6 position of bicyclo[2,2,1]-heptene-2, (norbornene). Typical aromatic nobornene derivatives are set forth by the following general formula (A):

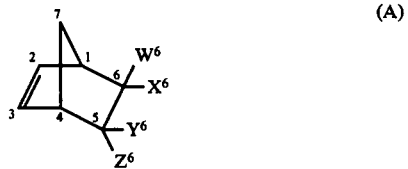

(A)

The aromatic dimethanooctahydronaphthalene derivatives contain at least one aromatic hydrocarbon radical or substituent including said aromatic hydrocarbon radical at the 2 and/or 3 position of 1,4:5,8-dimethano-1,2,3,4,5,8,8a-octahydronaphthalene. Typical aromatic dimethanooctahydronaphthalene derivatives are set forth by the following general formula (B):

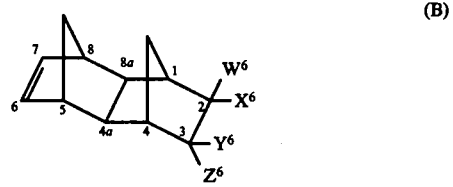

(B)

In the above structural formulas (A) and (B) — $W^6$, $X^6$, $Y^6$, $Z^6$ may denote the same or different ones selected from the group consisting of a hydrogen atom, aromatic hydrocarbon radical, a substituent including said aromatic hydrocarbon radical, and alkyl or alkenyl radical having 1 to 20 carbon atoms. In this case, at least one of said $W^6$, $X^6$, $Y^6$, $Z^6$ is an aromatic hydrocarbon radical or substituent including said aromatic hydrocarbon radical. This substituent may be expressed by any of the following general formulae:

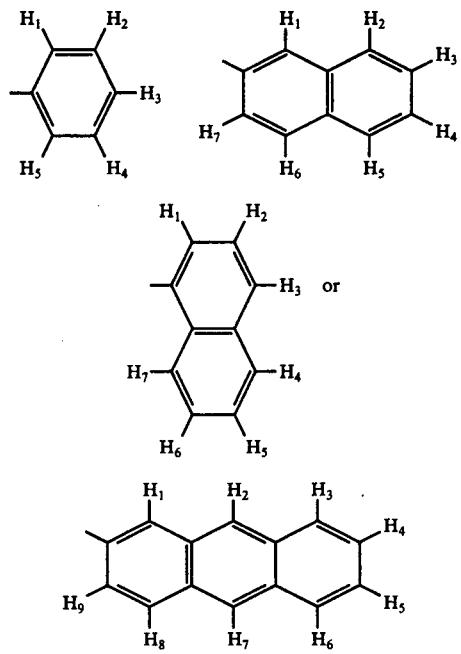

where:
$H_1$, $H_2$, $H_3$, $H_4$, $H_5$, $H_6$, $H_7$, $H_8$, $H_9$ = same or different ones selected from the group consisting of a hydrogen atom, alkyl or alkenyl radical having 1 to 20 carbon atoms, cycloalkyl radical having 4 to 10 carbon atoms, aryl radical having 6 to 10 carbon atoms and aralkyl radical having 7 to 10 carbon atoms.

The aromatic norbornene derivatives typically include 5-phenyl-bicyclo[2,2,1]-heptene-2, 5-methyl-5-phenyl-bicyclo[2,2,1]-heptene-2, 5,5-diphenyl-bicyclo[2,2,1]-heptene-2, 5-hexyl-5-phenyl-bicyclo[2,2,1]-heptene-2, 5-decenyl-5-phenyl-bicyclo[2,2,1]-heptene-2, 5-cyclohexyl-5-phenyl-bicyclo[2,2,1]-heptene-2, 5-phenyl-6-ethyl-bicyclo [2,2,1]-heptene-2, 5-α-naphthyl-bicyclo[2,2,1]-heptene-2, and 5-(p-tolyl)-bicyclo[2,2,1]-heptene-2.

The aromatic dimethanooctahydronaphthalene derivativesinclude 2-phenyl-1,4:5,8-dimethano-1,2,3,4,4a,5,8,8a-octahydronaphthalene, 2-methyl-2-phenyl-1,4:5,8-dimethano-1,2,3,4,4a,5,8,8a-octahydronaphthalene, 2-n-butyl-2-phenyl-1,4:5,8-dimethano-1,2,3,4,4a,5,8,8a-octahydronaphthalene, 2-cyclohexyl-1,4:5,8-dimethano-1,2,3,4,4a,5,8,8a-octahydronaphthalene, 2,2,2- or 2,3-diphenyl-1,4:5,8-dimethano-1,2,3,4,4a,5,8,8a-octahydronaphthalene, 2-(p-tert-butylphenyl)-1,4:5,8-dimethano-1,2,3,4,4a,5,8,8a-octahydronaphthalene, 2-decyl-2-phenyl-1,4:5,8-dimethano-1,2,3,4,4a,5,8,8a-oxtahydronaphthalene, and 2α-anthryl-1,4:5,8-dimethano-1,2,3,4,4a,5,8,8a-octahydronaphthalene.

Other aromatic norbornene derivatives, including aromatic dimethanooctahydronaphthalene derivatives and methods for preparing the same are set forth in Japanese Patent Application Laid-open No. 153100/75, Laid-open Dec. 9, 1975.

The aromatic nitrogen-bearing heterocyclic norbornene derivatives contain at least one aromatic heterocyclic ring having at least one nitrogen atom in said ring (for example, a pyridine nucleus, or a quinoline nucleus) in the 5 and/or 6 position of the norbornene (namely, bicyclo[2,2,1]-heptene-2). (Refer to the item "Aromatic Character" in the *Chemical Encyclopedia*, Vol. 8, p. 601, 1969, published by Kyoritsu Publishing Company.) Typical aromatic nitrogen-bearing heterocyclic norbornene derivatives are included in the following general formula:

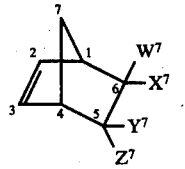

wherein:

$W^7$, $X^7$, $Y^7$, $Z^7$ = the same or different ones selected from the group consisting of a hydrogen atom, alkyl radical having 1 to 20 carbon atoms, cycloalkyl radical having 4 to 10 carbon atoms, alkyl substituted cycloalkyl radical having 5 to 10 carbon atoms, aryl radical having 6 to 10 carbon atoms and aralkyl radical having 7 to 10 carbon atoms or other radicals containing an aromatic nitrogen-bearing heterocyclic ring, at least one of said $W^7$, $X^7$, $Y^7$, $Z^7$ bearing a radical containing said aromatic nitrogen-bearing heterocyclic ring. Typical aromatic nitrogen-bearing heterocyclic norbornene derivatives are 5-(2-pyridyl)-bicyclo [2,2,1]-heptene-2, 5-(3-pyridyl)-bicyclo[2,2,1]-heptene-2, 5-(4-pyridyl)-bicyclo[2,2,1]-heptene-2, 5-(3-methyl-2-pyridyl)-bicyclo[2,2,1]-heptene-2, 5-(5-n-butyl-3-pyridyl)-bicyclo[2,2,1]-heptene-2, 5-(4-cyclohexyl-2-pyridyl)-bicyclo[2,2,1]-heptene-2, 5-(3-phenyl-4-pyridyl)-bicyclo [2,2,1]-heptene-2, 5-(2,6-dimethyl-4-pyridyl)-bicyclo [2,2,1]-heptene-2, 5-(3-hexyl-2-pyridyl)-bicyclo[2,2,1]-heptene-2, 5-(4-quinolyl)-bicyclo[2,2,1]-heptene-2, 5-(9-carbazolyl)-bicyclo[2,2,1]-heptene-2, 5-(9-propyl-3-carbazoline)-bicyclo[2,2,1]heptene-2, and 5-(9-dodecyl-3-carbazolyl)-bicyclo[2,2,1]-heptene-2.

Other aromatic nitrogen-containing heterocyclic norbornene derivatives are set forth in the Japanese Patent Application Laid-open No. 110000/75, Laid-open Aug. 29, 1975.

The amide type norbornene derivatives contain at least one N,N-disubstituted carbonamide radical or substituent including said N,N-disubstituted carbonamide radical at the 5 and/or 6 positions of the bicyclo[2,2,1]-heptene-2. Typical amide type norbornene derivatives may be expressed by the following general formula:

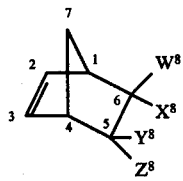

where:

$W^8$, $X^8$, $Y^8$, $Z^8$ = the same or different ones selected from the group consisting of a hydrogen atom, alkyl radical having 1 to 12 carbon atoms, alkenyl radical having 2 to 12 carbon atoms, cycloalkyl radical having 4 to 12 carbon atoms, alkyl substituted cycloalkyl radical having 5 to 12 carbon atoms, aryl radical having 6 to 10 carbon atoms and aralkyl radical having 7 to 10 carbon atoms or N-disubstituted carbonamide radical

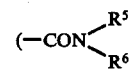

where $R^5$, $R^6$ denote the same or different ones selected from the group consisting of a hydrogen atom and the above-mentioned hydrocarbon radicals).

The amide type norbornene derivatives typically include N,N-dimethyl-bicyclo[2,2,1]-heptene-2-carbonamide-5, N-methyl-N-ethyl-bicyclo[2,2,1]-heptene-2-carbonamide-5, N-methyl-N-octyl-bicyclo-[2,2,1]-heptene-2-carbonamide-5, N,N-dicyclohexyl-bicyclo[2,2,1]-heptene-2-carbonamide-5, N,N-di(methylcyclohexyl)-bicyclo[2,2,1]-heptene-2-carbonamide-5, N,N-diphenyl-bicyclo[2,2,1]-heptene-2-carbonamide-5, N,N-dibenzyl-bicyclo[2,2,1]-heptene-2-carbonamide-5, N,N-di(3-methylphenyl)-bicyclo[2,2,1]-heptene-2-carbonamide-5, N,N-dimethyl-5-methyl-bicyclo[2,2,1]-heptene-2-carbonamide-5, N,N-dimethyl-5,6-methyl-bicyclo[2,2,1]-heptene-2-carbonamide-5, N,N-diethyl-5-hexyl-bicyclo[2,2,1]-heptene-2-carbonamide-5, and N,N-di(cyclohexyl)-5-phenyl-bicyclo[2,2,1]-heptene-2-carbonamide-5, N,N-diphenyl-5-methyl-bicyclo[2,2,1]-heptene-2-carbonamide-5, N,N,N',N'-tetramethyl-bicyclo[2,2,1]-heptene-2 carbonamide. Other amide type norbornene derivatives employed are illustrated in the Japanese Patent Application Laid-open No. 5540/76, Laid-open May 15, 1976.

The aromatic norbornadiene derivatives are the compounds in which carbon atoms occupying the 5 and 6 positions of bicyclo[2,2,1]-heptene-2[namely, norbornene] concurrently constitute the two adjacent carbon atoms of an aromatic cyclic compound. Typical aromatic norbornadiene derivatives are also set forth in the following general formula (D) and (E):

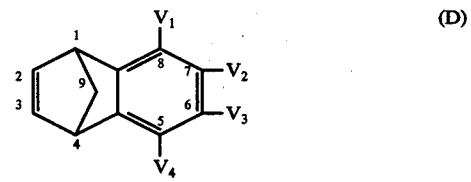

(D)

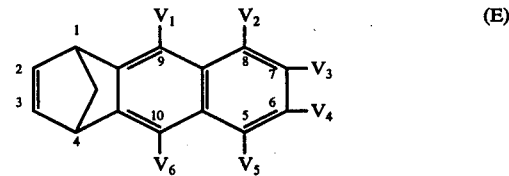

(E)

where:

$V_1$, $V_2$, $V_3$, $V_4$, $V_5$, $V_6$ = the same or different ones selected from the group consisting of a hydrogen atom, alkyl radical having 1 to 10 carbon atoms, alkenyl radical having 2 to 10 carbon atoms, cycloalkyl radical having 4 to 10 carbon atoms, aryl radical having 6 to 10 carbon atoms and aralkyl radical having 7 to 10 carbon atoms or polar radicals selected from the group consisting of an ether group and ester group or the above-mentioned hydrocarbon radicals containing said polar radicals. Typical aromatic norbornadiene derivatives are 1,4-dihydro-1,4-methanonaphthalene, 1,4-dihydro-1,4-methano-6-methylnaphthalene, 1,4-dihydro-1,4-methano-6-methoxynaphthalene, 1,4-dihydro-6-fluoro-1,4-methanonaphthalene, 6-chloro-1,4-dihydro-1,4-methanonaphthalene, 6-cyano-1,4-dihydro-1,4-methanonaphthalene, 5,8-diacetoxy-1,4-dihydro-1,4-methano-naphthalene, 5,8-diacetoxy-1,4-dihydro-6,7-dimethyl-1,4-methanonaphthalene, 9,10-diacetoxy-1,4-dihydro-1,4-methanoanthracene, and 1,4-dihydro-9,10-diphenyl-1,4-methanoanthracene. The method of preparing the aromatic norbornadiene derivatives and typical examples thereof are described in Japanese Patent Application No. Laid-open No. 61500/75, Laid-open May 27, 1975.

The ester type norbornadiene derivatives have at least one ester group or a substitute containing said ester group at the 2 and 3 positions of the bicyclo[2,2,1]-heptadiene-2,5. Typical ester type norbornadiene derivatives are expressed by the following general formula:

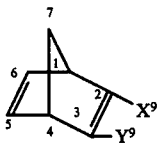

where:

$X^9$, $Y^9$ = the same or different ones selected from the group consisting of a hydrogen atom, alkyl radical having 1 to 10 carbon atoms, alkenyl radical having 2 to 10 carbon atoms, cycloalkyl radical having 4 to 10 carbon atoms, alkyl substituted cycloalkyl radical having 5 to 10 carbon atoms, aryl radical having 6 to 10 carbon atoms and aralkyl radical having 7 to 10 carbon atoms, ester group and hydrocarbon radicals substituted by the ester group, at least one of said $X^9$ and $Y^9$ denoting an ester group or said hydrocarbon radicals substituted by the ester group.

The ester type norbornadiene derivatives typically include 2-methoxycarbonyl-bicyclo[2,2,1]-hepta-2,5-diene, 2-butyloxycarbonyl-bicyclo[2,2,1]-hepta-2,5-diene, 2-octyloxycarbonyl-bicyclo[2,2,1]-hepta-2,5-diene, 2-decyloxycarbonyl-bicyclo[2,2,1]-hepta-2,5-diene, 2-methoxycarbonyl-3-methyl-bicyclo[2,2,1]-hepta-2,5-diene, 2-ethoxycarbonyl-3-hexyl-bicyclo[2,2,1]-hepta-2,5-diene, 2-methoxycarbonyl-3-cyclohexyl-bicyclo[2,2,1]-hepta-2,5-diene, 2-ethoxy-3-(4-methylcyclohexyl)-bicyclo[2,2,1]-hepta-2,5-diene, 2-methoxycarbonyl-3-phenyl-bicyclo[2,2,1]-hepta-2,5-diene, 2-ethoxycarbonyl-3-tolyl-bicyclo[2,2,1]-hepta-2,5-diene, 2,3-dimethoxycarbonyl-bicyclo[2,2,1]-hepta-2,5-diene, 2-methoxycarbonyl-3-ethoxycarbonyl-bicyclo[2,2,1]-hepta-2,5-diene, 2-acetoxymethyl-bicyclo[2,2,1]-hepta-2,5-diene, 2-caproyloxy-3-methyl-bicyclo[2,2,1]-hepta-2,5-diene, 2-ethoxycarbonyl-3-hexyloxycarbonyl-bicyclo[2,2,1]-hepta-2,5-diene, 2,3-di(propionyloxymethyl-bicyclo[2,2,1]-hepta-2,5-diene, 2-acetoxymethyl-3-cyclohexyl-bicyclo[2,2,1]-hepta-2,5-diene, 2-valeryloxy-3-ethyl-bicyclo[2,2,1]-hepta-2,5-diene, 2-valeryloxymethyl-decyl-bicyclo[2,2,1]-hepta-2,5-diene, and 2-valeryloxymethyl-3-phenyl-bicyclo[2,2,1]-hepta-2,5-diene.

The method of preparing the ester type norbornadiene derivatives and other typical examples thereof are set forth in the Japanese Patent Application Laid-open No. 103600/75, Laid-open Aug. 15, 1975.

The cycloolefinic compounds used as comonomers for producing the ring-opening polymerization products of this invention are generally classified broadly into three groups; (1) monocyclic monoolefinic compounds, (2) non-conjugated cyclic polyene compounds, and (3) polycyclic olefinic compounds.

The monocyclic monoolefinic compounds are shown by the following general formula (II):

wherein $q$ is an integer of 3 or from 5 to 20.

Typical examples of monocyclic monoolefinic compounds are cyclopentene, cycloheptene, cyclooctene, cyclodecene, and cyclododecene. These monocyclic monoolefinic compounds can each be substituted with at least one hydrocarbon group selected from the class consisting of an alkyl group having from 1 to 10 carbon atoms, an alkenyl group having from 1 to 10 carbon atoms, and an aryl group having from 6 to 10 carbon atoms, at the methylene carbon thereof.

The non-conjugated cyclic polyene compounds are shown by the following general formulae (III) and (IV):

and

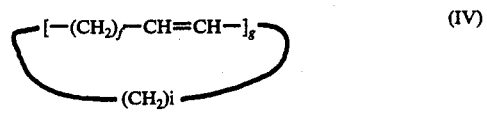

wherein $i$ is an integer from 1–20 and $f$ and $g$ each is an integer from 2–20.

Typical examples of non-conjugated cyclic polyene compounds are 1,5-cyclooctadiene and 1,5,9-cyclododecatriene. Furthermore, the aforesaid non-conjugated cyclic polyene compounds may be substituted by at least one of the aforesaid hydrocarbon groups and/or a halogen atom. Typical examples of such compounds are 1-chloro-1,5-cyclooctadiene and 1-methyl-1,5-cyclooctadiene.

Moreover, other examples of the non-conjugated cyclic polyene compounds represented by the aforesaid general formula (IV) which can be used in the practice of this invention are the oligomers (generally having up to about 100 repeating units) obtained by subjecting the cycloolefinic compounds represented by aforesaid general formulae (II) or (III) to, for example, a metathesis polymerization as described in *Journal of Macromolecular Science*, Review C-7 (1), p. 105–109, (1972) MARCEL DEKKER, INC. and U.S. Pat. No. 3,074,918.

Further, the polycyclic olefinic compounds can be olefinic compounds having 2 to 10 rings and 1 to 5 carbon-carbon double bonds. Typical examples of such polycyclic olefinic compounds are bicyclo[2,2,1]-heptene-2-norbornene); 5-methyl-bicyclo [2,2,1]-heptene-2; 5-vinyl-bicyclo[2,2,1]-heptene-2; 5-ethylidene-bicyclo[2,2,1]-heptene-2; 5-isopropenylbicyclo[2,2,1]-heptene-2; dicyclopentadiene; bicyclo[2,2,1]-hepta-2,5- diene (norbornadiene); and 1,4,5,8-dimethano1,2,3,4,-4a,5,8,8a-octahydronaphthalene. These unsaturated cyclic compounds may be used alone or as a mixture thereof in the ring-opening polymerization employing the aforesaid norbornene derivatives.

Other examples of the norbornene derivatives and the unsaturated cyclic compounds which can be used as the monomers and comonomers for producing the ring-opening polymerization product employed in this invention are described in U.S. Patent Application Ser. No. 507,556. Also in U.S. Pat. No. 3,959,234, issued May 25, 1976 and 3,991,139, issued Nov. 9, 1976; and Japanese Pat. Application Laid Open Nos. 77999/74, 61500/75 and, 71800/75. Further examples of norbornene polar derivatives and preparation techniques therefor are set forth in U.S. Pat. Nos. 3,294,767, 3,470,248 and 3,277,036.

The norbornene derivatives used as the monomers and the comonomers for producing the ring-opening polymerization products employed in this invention may contain two or more different polar groups. In such norbornene derivatives, at least two of said polar groups included in $W^2 - W^9$, $X^2 - X^9$, $Y^2 - Y^9$ and $Z^2 - Z^9$ are selected from the group consisting of nitrile groups, ester groups, halogen atoms, ether groups, imide groups, acid anhydride groups, amide groups or hydrocarbon substituted with two or more of the aforesaid polar groups, where at least two of said polar groups differ from each other. For example, when $W^2$ is cyano then $X^2$, $Y^2$ and $Z^2$ is a different polar group, such as an ester group, ether group, amide group; $X^2$, $Y^2$ and $Z^2$ can also be a hydrocarbon group substituted by such a different polar group.

The cyano-, ester-, halogenated, amide-, acid anhydride-, aromatic- type norbornene derivatives, aromatic nitrogen-containing heterocyclic norbornene derivatives, and some (for example, 5-methylbicyclo[2,2,1]-heptene-2) of the cycloolefinic compounds, all have two forms of isomers which are designated as the endo- and exotypes according to the manner in which the substituent is attached to the chain. To prepare the ring-opening polymerization products employed in the present invention, the above compounds may be used either after separating the isomers; such as, for example, by precision distillation (rectification) or recrystallization, or without separating said isomers; that is, in the form still mixed therewith.

In the case of the cyano-, ester-, ether-, amide-, aromatic- and aromatic nitrogen-containing heterocyclic norbornene derivatives, it has been found that if more than a total of 8 carbon atoms are present in the radicals denoted by $X^2 - X^9$, $W^2 - W^9$, $Y^2 - Y^9$ and $Z^2 - Z^9$, then the resulting ring-opening polymerization product has a reduced heat resistance. Therefore, the total number of carbon atoms for the radicals denoted by said $X^2 - X^9$, $W^2 - W^9$, $Y^2 - Y^9$ and $Z^2 - Z^9$ for these derivatives is preferably less than about 8 and more preferably no more than about 6.

In the case of the ring-opening polymerization product prepared from the A-type imide norbornene derivatives it has been found that if more than a total of about 8 carbon atoms are present in the radical denoted by $R^2$, then the resulting product exhibits reduced heat resistance and/or workability. Consequently, the total number of carbon atoms for the $R^2$ radical is preferably no more than about 8, more preferably no more than about 6. The same exists for the B-type imide derivative and consequently, it is preferred that the $R^4$ radical in the B-type imide general formula contain a total of no more than about 6 carbon atoms, more preferably no more than about 4 carbon atoms.

In the case of the acid anhydride type norbornene derivatives, it has been found that when the total number of carbon atoms in the rings apart from the norbornene ring is more than about 10, the heat resistance, workability and mechanical properties of the resulting polymerization product are adversely affected. Accordingly it is proposed that the rings other than the norbornene ring, preferably contain 2 to 10 or, more preferably, 2 to 8 carbon atoms. Similar results obtained with the aromatic norbornadiene derivatives and accordingly, it is preferred that the rings other than the norbornadiene ring preferably contain up to about 20 carbon atoms or, more preferably, up to about 16 carbon atoms. The ester type norbornadiene derivatives are subject to the identical deficiencies. Therefore, the radicals denoted by $X^8$, $Y^9$ given in the general formula of the ester type norbornadiene derivatives preferably contain a total number of up to about 16 carbon atoms or, more preferably, up to about 12 carbon atoms.

Obviously, the individual parameters, such as the total number of carbon atoms in the radicals for the norbornene and norbornadiene derivatives are, in part, affected by the proportions of the aforesaid unsaturated cyclic compounds contained in the ring-opening polymerization copolymer. Also, the above parameters are, of course, affected by various polymerization conditions during preparation of the ring-opening polymerization product, such as the kind and proportion of the catalyst system, the kind and proportion of a third catalyst component, when applied, or the omission thereof, the proportion of the catalyst system based on the monomer, polymerization temperature, and the kind and proportion of the molecular weight-controlling agent, when applied, or the omission thereof.

Where ring-opening copolymerization is carried out between the unsaturated cyclic compounds and norbornene derivatives of the cyano-, ester-, ether- halogen- and imide- types, the proportion of said unsaturated cyclic compounds is preferably less than about 50 mole percent. Ring-opening polymerization copolymers of said various types of norbornene derivatives and more than about 50 mole percent of said unsaturated cyclic compounds are not preferred, because this form of copolymer often exhibits reduced mechanical properties, such as impact strength, impact strength at low temperature, tensile strength and hardness, and reduced physical properties, such as heat resistance (for example, softening point), moldability, gas impermeability and transparency, when compared to the preferred ring-opening polymerization homopolymers prepared from the cyano-, ester-, ether-, halogen- and imide- types norbornene derivatives, respectively, or copolymers of any combination of said preferred derivatives.

Ring-opening polymerization copolymers containing a relatively large amount of monocyclic olefinic compounds (for example, cyclohexene and cyclooctene) generally have good impact strength but also tend to exhibit reductions in heat resistance (softening point) and mechanical properties, such as tensile strength and hardness. During preparation of a ring-opening polymerization copolymer containing a relatively large amount of polycyclic olefinic compound and non-conjugated cyclic polyene compound (for example, dicyclopentadiene and norbornene), gelation occasionally results. Gelation decreases the workability of said copolymer and, consequently, presents difficulties in providing satisfactory moldings from said products. Therefore, the cycloolefinic compounds contained in the ring-opening polymerization copolymers are preferably present in amounts no greater than about 40 mole% and, preferably, no greater than about 20 mole%.

The ring-opening homopolymerization and copolymerization of the aforesaid norbornene derivatives and cycloolefinic compounds can be carried out in accordance with the processes described in U.S. Pat. No. 3,856,758, and Japanese Patent Application Laid-open Nos. 77999/74, Laid-Open July 26, 1974, 71800/75, Laid-open June 13, 1975, 75300/75, Laid-open June 20, 1975, 55400/76, Laid-open May 15, 1976 and 112500/75, Laid-open Sept. 3, 1975. A description of typical polymerization techniques, catalysts, solvents, molecular weight controlling agents, and other parameters are described in the aforesaid patents and patent applications. Other process techniques for recovering the ring-opening polymerization products employed in the invention are described in Japanese Patent Application Laid Open Nos. 77999/75 and 130500/74, U.S. Ser. No. 507,556. U.S. Pat. No. 3,959,234, issued May 25, 1976, Japanese Patent Application Laid Open Nos. 71800/75, 103600/75 and Japanese Patent Application Laid-Open Nos. 159598/75, Laid-open Dec. 24, 1975, 153100/75, Laid-open Dec. 9, 1975, 160400/75, Laid-open Dec. 25, 1975.

A typical ring-opening homopolymerization and copolymerization technique employing the aforesaid norbornene derivatives and cycloolefinic compounds employs a catalytic system consisting of a transition metal compound such as a tungsten, molybdenum, rhenium, tantalum, niobium compound and an organometallic compound. This system is described in U.S. Pat. No. 3,856,758, the disclosure of which is expressly incorporated herein by reference.

In addition, a catalytic system consisting of (1) oxides of tungsten or molybdenum and a Lewis acid or (2) both components and oganometallic aluminum compounds, can be employed to produce the ring-opening homopolymerization and copolymerization products of the aforesaid norbornene derivatives and cycloolefinic compounds. This system is illustrated in Japanese Patent Application Laid-open No. 112500/75, Laid-open Sept. 3, 1975, the disclosure of which is expressly incorporated herein by reference.

Other catalytic systems and homo- and co- polymerization procedures for preparing ester, halogen and cyano ring-opening polymers are illustrated in U.S. Pat. Nos. 3,859,265, 3,557,062 and 3,546,183. Preparation of ring-opening polymerization homopolymers of norbornene derivatives containing hydroxyl, amine, and carboxyl groups (having an active hydrogen) can be accomplished by using a nobel metal catalyst system set forth in U.S. Pat. No. 3,546,183 or by hydrolyzing a polymer of an acid anhydride substituted norbornene derivative.

The ring-opening polymerization in accordance with the above processes employing any of the above catalytic systems generally results in the production of a polymer (1) set forth below according to the following mechanism:

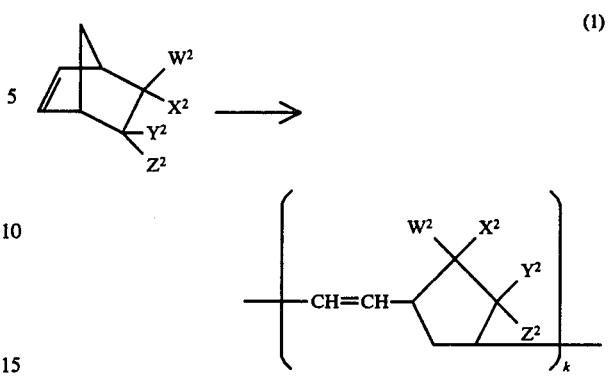

There is a possibility that the monomeric norborene derivatives set forth above can form the vinylene-type polymer (2) set forth below:

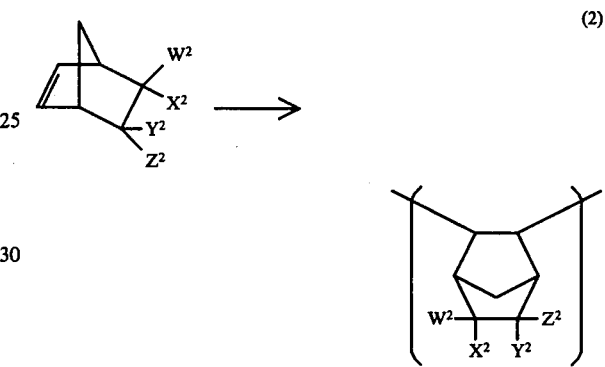

However, it has been found that little, if any, vinylene-type polymer is produced during the ring-opening polymerization of the norbornene derivatives employed in the invention. The mechanisms described above have been illustrated with respect to the ring-opening homopolymer of the cyanonorbornene derivative. Of course, the polymerization products for the other ring-opening polar norbornene derivatives of the invention are formed similarly; $k$ is an integer.

Employing the coordination type polymerization catalysts described in the preferred aforesaid polymerizing techniques, the ring scission readily occurs and the desired polymer is formed. Where free radical catalysts are employed, no ring scission occurs, generally, and the undesired vinylene type polymer forms. Accordingly, free radical catalyst systems are not desirable.

The ring-opening polymerization products used in this invention can be effectively formed alone. If desired, they can be produced in the presence of an unsaturated polymer. The unsaturated polymer employed has a carbon-carbon double bond. The Mooney viscosity of the unsaturated polymer is generally about 10 to 200, preferably 20 to 150, most preferably 30 to 130. Also, it is preferred that the unsaturated polymer have at least one carbon-carbon double bond and more preferably, more than 10 carbon-carbon double bonds, per 1,000 total carbon-carbon bonds. Examples of such unsaturated polymers are butadiene rubbers containing butadiene as the main component (generally more than 50% by weight), such as a butadiene homopolymer rubber, a styrene-butadiene copolymer rubber, and an acrylonitrile-butadiene copolymer rubber. Additional examples of unsaturated polymers are chloroprene rubbers, isoprene rubbers, natural rubbers and ethylene-propylenediene terpolymers (generally called EPT or EPDM). Furthermore, cycloolefinic rubbers prepared by ring-opening polymerizing cycloolefinic compounds may be used for this purpose. The unsaturated polymers including polyolefinic rubbers used in this invention may also be random copolymer rubbers or block copolymer rubbers such as, for example, styrene-butadiene copolymer rubber.

Processes for producing such unsaturated polymers and the properties thereof are described in Kanbara et al, *Synthetic Rubber Handbook*, 1967, published by Asakura Shoten, and *Encyclopedia Polymer Science and Technology (Plastics, Rubbers, Fibers)* by Herman F. Mark et al, Vol 1 to 16 (1964–1971) published by John Wiley & Sons, Inc.

When the ring-opening polymerization products used in this invention are produced in the presence of an unsaturated polymer as described hereinabove, the proportion of the unsaturated polymer is generally no greater than about 1,000 parts by weight, preferably less than about 500 parts by weight, and more preferably, less than about 300 parts by weight, per 100 parts by weight of the monomer(s) used. If the proportion of the unsaturated polymer is more than about 1,000 parts by weight per 100 parts by weight of the monomer(s) (10:1), the polymerized co-product thereof does not exhibit the inherent properties possessed by the polymerized monomer(s). Within the proportion of the unsaturated polymer used, this embodiment becomes especially useful in fields in which high impact resistance is required.

The ring-opening polymerization product employed in the invention can be polymerized in the presence of the aforesaid unsaturated polymers according to the polymerization processes set forth hereinabove.

It is often desirable, where the composition of the invention is employed as a master batch, to increase the workability of the batch and to tailor the mechanical properties thereof by blending the above mentioned ring-opening polymerization products of norbornene derivatives containing at least one polar group with a resinous moiety, including a resinous material, a graft copolymer as illustrated below, and/or a rubber.

As employed herein the term "resinous materials" denotes vinyl chloride polymers, styrene homopolymer, methylmethacrylate homopolymer, and copolymers and graft copolymers. The term "vinyl chloride polymers", as used in this invention, denotes homopolymers prepared by polymerizing vinyl chloride alone, and copolymers prepared by copolymerizing more than about 50 mole percent of vinyl chloride with less than about 50 mole percent of at least one monomer such as vinyl acetate, vinylidene chloride, ethylene, propylene, acrylonitrile and maleic acid. These homopolymers and copolymers of vinyl chloride (namely, vinyl chloride polymers) are well known to the art and are manufactured on an industrial scale by emulsion-, suspension- or bulk-polymerization. For the present invention it is preferred to employ a vinyl chloride polymer having a degree of polymerization from about 350 to 1800, preferably from about 450 to 1500 and particularly from about 600 to 1300.

Vinyl chloride polymers are unstable to heat and light and are likely to partially deteriorate during the mixing process. Consequently, it is preferred to mix vinyl chloride polymer with a stabilizer (or dehydrochlorination inhibitor) such as a metal soap, a tin compound and a compound containing an epoxy radical. Such stabilizing compounds are well known to the art.

The styrene homopolymer, methylmethacrylate homopolymer and copolymers such as acrylonitrile-styrene copolymer, methylmethacrylate-styrene copolymer, copolymers of methylmethacrylate as the major component and, as the minor component, a second monomer (referred to as "methylmethacrylate resin",) acrylonitrile-styrene-methylmethacrylate terpolymer, and copolymers mainly consisting of styrene or acrylonitrile, are manufactured on an industrial scale and are well known to the art. Typical homo and copolymers, their manufacturing process, properties and uses, are set forth in *Plastics Handbook* by Murahashi, Oda and Imoto, published by Asakura Publishing Company and in *Encyclopedia of Polymer Science and Techology (Plastics, Resins, Rubbers, Fibers)* by Herman F. Mark et al, Vols. 1 to 16 (1974–1971) published by John Wiley & Sons, Inc.

As used in this invention, the above-mentioned resinous material preferably has a molecular weight from about 3,000 to 500,000, more preferably from about 5,000 to 200,000. It will be apparent to those skilled in the art that the particular molecular weight employed may vary with the kind, thermal, or mechanical properties and moldability of said resinous material.

The graft copolymers used as a component of the composition of this invention are prepared by grafting at least one vinyl compound selected from the group consisting of styrene, acrylonitrile and methylmethacrylate to the later described rubber.

These graft copolymers preferably contain from about 1 to 85% by weight of rubber and 99 to 15% by weight of vinyl compounds, or more preferably from about 2 to 80% by weight of rubber and from about 98 to 20% by weight of vinyl compounds.

Examples of the graft copolymers ae methylmethacrylate-butadiene-stryene terpolymer (MBS resin) prepared by grafting styrene and methylmethacrylate to butadiene rubber or styrene-butadiene rubber, acrylonitrile-butadiene-styrene terpolymer (ABS resin) prepared by grafting styrene and acrylon-itrile to butadiene rubber, acrylonitrile-butadiene rubber or styrene-butadiene rubber, acrylonitrile-chlorinated polyethylenestyrene terpolymer (ACS resin) prepared by grafting acrylonitrile and styrene to chlorinated polyethylene rubber, methylmethacrylate-chlorinated polyethylene-styrene terpolymer (MCS resin) prepared by grafting methylmethacrylate and styrene to chlorinated polyethylene rubber, graft copolymer (AEVS resin) prepared by grafting styrene and acrylonitrile to ethylene-vinyl acetate rubber, and graft copolymer (AAS resin) prepared by grafting styrene and acrylonitrile to acrylic ester rubber. The above graft copolymers are known to the art and are manufactured on an industrial scale. They are often used in a master batch for preparing high impact resins. Typical graft copolymers, the manufacturing process therefor, properties and use thereof are found in *Plastics Handbook* by Murahashi, Oda and Imoto, published by Asakura Publishing Company and in *Encyclopedia of Polymer Science and Technology (Plastics, Resins, Rubbers, Fibers)* by Herman F. Mark et al, Vols. 1 to 16 (1964–1971) published by John Wiley & Sons, Inc.

A resinous material grafted to the rubber generally has an average molecular weight from about 1,000 to 200,000 or more preferably from 2,000 to 100,000.

The rubber used as a component of the ring-opened polymerization product of the composition of this invention includes butadiene rubber, ethylene-propylene rubber, ethylenepropylenediene-terpolymer rubber, chlorinated polyethylene rubber, isoprene rubber, acrylic ester rubber, ethylene-vinyl acetate rubber, chloroprene rubber, chlorosulfonated polyethylene rubber, butyl rubber, alkylene oxide rubber and natural rubber.

The butadiene type rubber includes butadiene rubber and rubber prepared by copolymerizing butadiene as the major component with a small amount (generally 30% by weight at most, preferably 25% by weight at most) of a monomer such as styrene or acrylonitrile.

The chlorinated polyethylene rubber is prepared by chlorinating in a solvent or aqueous suspension, ethylene homopolymer having a high density of 0.93 to 0.98 g/cc or a copolymer of ethylene and a small amount (generally less than 10 mole %) of an alpha-olefin, such as propylene or butene-1. The chlorinated polyethylene rubber preferably contains from about 25 to 45% by weight of chlorine.

The acrylic ester rubber is prepared by the emulsion polymerization of a mixture consisting of acrylic acid ester (for example, butyl acrylate) as the major component and a minor amount (generally less than 10% by weight) of another monomer (for example, acrylonitrile) in the presence of a catalyst such as persulfate. This rubber is generally referred to as acrylic rubber.

The ethylene-vinyl acetate rubber is prepared by copolymerizing ethylene with vinyl acetate by, for example, the emulsion polymerization process. In this case, the content of the vinyl acetate is preferably from about 20 to 60% by weight and more preferably from about 30 to 50% by weight based on the weight of rubber.

The chloroprene rubber is prepared by polymerizing a monomer consisting of chloroprene, alone, or chloroprene and a minor amount of another monomer by bulk-, solution- or emulsion-polymerization, employing, as the catalyst, a persulfate, peroxide or an azo compound. Polymerization is generally carried out in the presence of a polymerization-controlling agent such as a mercaptan, sulfur or a dialkyl-xanthogen disulfide.

The chlorosulfonated polyethylene rubber is prepared by chlorosulfonating in an organic solvent the homopolymer or copolymer of ethylene used in preparing the aforesaid chlorinated polyethylene rubber. Said chlorosulfonated polyethylene rubber preferably contains from about 20 to 50% by weight, more preferably from about 24 to 45% by weight of chlorine and from about 0.3 to 2.0% by weight, more preferably from about 0.5 to 1.7% by weight of sulfur.

The alkylene oxide rubber is prepared by polymerizing alkylene oxide, such as ethylene oxide, propylene oxide and epichlorohydrin or other derivatives of said oxides, in the presence of a catalytic system composed of organic metal compounds (for example, organic aluminum compounds), according to well known procedures.

The aforesaid rubbers preferably have a Mooney viscosity from about 20 to 140, more preferably from about 30 to 120, and most preferably from about 40 to 110, though the viscosity may vary with the various kinds of rubber. These rubbers are widely used on an industrial scale and are applied in broad fields. The manufacturing processes, properties and applicaions of said materials are well known and are found in *Synthetic Rubbers Handbook* by S. Kanbara et al, published by Asakura Publishing Company and *Encyclopedia of Polymer Science and Technology* (Plastics, Resins, Rubbers, Fibers) by Herman F. Mark et al, Vols. 1 to 16 (1964–1971) published by John Wiley & Sons, Inc.

The type of resin and rubber selected as well as the proportions thereof based on the ring-opening polymerization homopolymer or copolymer for the subject composition, can be determined based upon the particular desired application. One or more types of resin and/or rubber may be employed. If desired, the resin and rubber can be premixed, and thereafter, the mixture can be added to the homopolymer or copolymer. Alternatively, the aforesaid components are mixed simultaneously to prepare the subject composition.

The proportion of the resinous moiety is generally no greater than about 90% by weight, more preferably, no greater than about 75% by weight, and most preferably no greater than about 60% by weight based on the weight of the total mixture of ring-opening polymerization homopolymer or copolymer and the aforesaid resinous moiety, including the grafted mass and mixture of resinous material, graft polymer-rubber and rubber. It will be recognized that the above proportions may vary with the kinds of resinous moiety and homopolymer or copolymer and the object for which the resultant composition is intended.

It has been found that if the proportion of resinous moiety is greater than about 90% by weight, the resultant composition is not sufficiently impact-resistant.

The content of rubber in the mixture of (1) ring-opening polymerization product and rubber or (2) the mixture of ring-opening polymerization product, resinous material, including grafted mass, and rubber is chosen to be no greater than about 75% by weight, preferably no greater than about 60% by weight, and most suitably no greater than about 45% by weight. Where the subject mixture contains the grafted mass, the proportion of said rubber is calculated on the basis of the amount of the rubber used in preparing said grafted mass. If amounts of rubber greater than about 75% by weight are employed, the tensile strength of the resultant composition is substantially reduced.

To enhance the mechanical properties of the flame resistant compositions of the invention such as impact strength, a metal salt of a fatty acid can be employed. The salts include metallic fatty acid salts wherein said metal cation is at least one metal selected from the group consisting of lithium, sodium, potassium, magnesium, calcium, strontium, barium, zinc, cadmium, aluminum, tin, lead, iron, nickel and cobalt.

The fatty acid portion (anionic portion) of the salt includes saturated monobasic fatty acids having 6 to 20 carbon atoms (for example, capric acid, lauric acid, stearic acid), saturated dibasic fatty acids having 6 to 20 carbon atoms (for example, adipic acid, sebacic acid, octadecane-1,18-di-carboxylic acid), unsaturated fatty acids having 11 to 24 carbon atoms (for example, 5-myristoleic acid, oleic acid, tsuzuic acid, linoleic acid) and derivatives thereof.

The derivatives of the saturated and unsaturated fatty acids include hydroxy fatty acids containing up to 4 hydroxy groups and halogenated fatty acids containing up to 10 halogen atoms.

Preferred saturated fatty acids are the monobasic fatty acids, which contain 8 to 20 carbon atoms. Among the preferred monobasic fatty acids, those which contain 8 to 18 carbon atoms are especially preferred.

Among the unsaturated fatty acids, those which contain 11 to 18 carbon atoms are particularly preferred. Among the metals which form salts with the fatty acids, lithium, sodium, magnesium, calcium, strontium barium, cadmium and lead are most preferred.

Of the metal salts of fatty acids, lithium stearate, sodium stearate, magnesium stearate, calcium stearate, strontium stearate, barium stearate, cadmium stearate, lead stearate, calcium laurate, barium laurate, cadmium laurate, calcium 2-ethyl hexoate, barium 2-ethyl hexoate, cadmium 2-ethyl hexoate, cadmium octylate, calcium ricinolate, barium ricinolate, and cadmium ricinolate are preferred. Most preferred are sodium stearate, magnesium stearate, calcium stearate, barium stearate, lead stearate, calcium laurate, barium laurate, calcium ricinolate, and barium ricinolate. The above-listed metal salts of fatty acids may be used alone or as mixtures.

In the practice of this invention, the proportion of the metal salt of a fatty acid is generally no greater than about 10.0%, preferably 0.5 to 7.0% and most suitably, from about 1.0 to 5.0% by weight, based on the total weight of the ring-opening polymerization product.

Amounts greater than about 10.0% by weight are not preferred, since they do not increase the impact strength of the composition, and also reduce the mechanical properties thereof, such as tensile strength. Where the composition of this invention is formed as a master batch, it is particularly advantageous to control the proportion of the metal salt of a fatty acid based on the total weight of the finally obtained composition so as to fall within the above-mentioned range.

The flame retarding compounds employed in this invention are halogen-containing multicyclic compounds and the bromine-containing aromatic compounds.

The halogen-containing multicyclic compounds are represented by following general formulae (1) to (3):

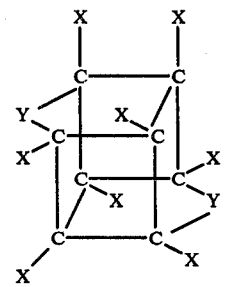
(1)

This compound is hereinafter referred to as "flame retardant (1)".

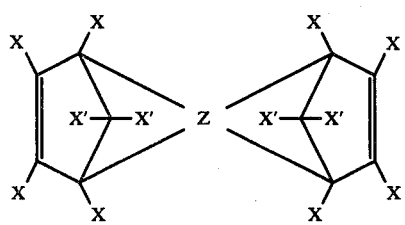
(2)

This compound is hereinafter referred to as "flame retardant (2)".

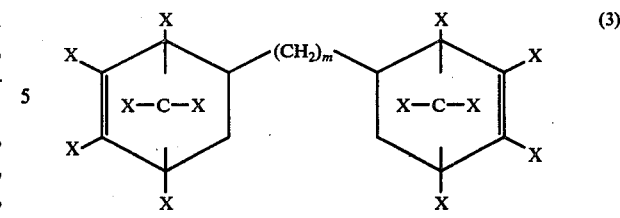
(3)

This compound is hereinafter referred to as "flame retardant (3)".

For the formulae (1) – (3), X is chlorine or bromine; X' is fluorine, chlorine, bromine, alkyl or alkoxy having 1-20 carbon atoms; Y represents

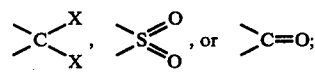

Z is a tetravalent cyclic hydrocarbon group having at least 5 carbon atoms and $m$ is an integer from 4 to 16.

The bromine-containing aromatic compounds are bromine-containing benzene, diphenyl and diphenyl-ether compounds, as represented by following general formulae (4) to (6):

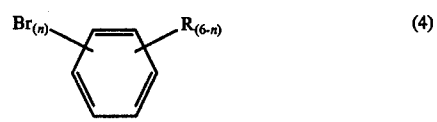
(4)

This compound is hereinafter referred to as "flame retardant (4)".

In formula (4), R is a hydrogen, alkyl having 1 to 6 carbon atoms, bromoalkyl (i.e., an alkyl radical substituted by a bromine atom), or hydroxy wherein one R, but not more than one R, is hydroxy; and $n$ is an integer from 3 to 6.

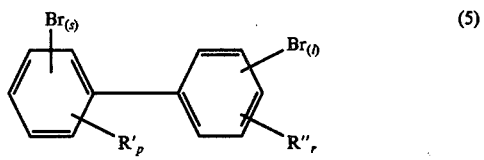
(5)

This compound is hereinafter referred to as "flame retardant (5)".

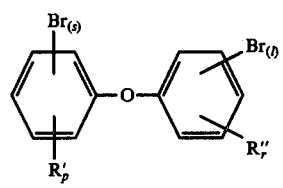

This compound is hereinafter referred to as "flame retardant (6)".

For formulae (5) and (6), R' and R" are hydrogen or alkyl having 1 to 6 carbon atoms, $l$, $s$, $p$ and $r$ are each integers; the sum of $l$ plus $s$ is an integer from 2 to 10; and the sum of $l$, $s$, $p$ and $r$ is 10.

Typical examples of the flame retardant of formula (1) are $C_{10}Cl_{12}$; $C_{10}Cl_{n'}Br_{(12-n')}$ (wherein $n'$ is an integer no greater than 10), $C_{10}Cl_{11}Br$; $C_{10}Cl_{10}Br_2$; $C_{10}Cl_9Br_3$; $C_{10}Cl_8Br_4$; $C_{10}Cl_{10}O$; $C_8Cl_8O_4S_2$ and $C_9Cl_{10}O_2S$.

A method for preparing $C_{10}Cl_{12}$; $C_{10}Cl_{n'}Br_{(12-n')}$; and $C_{10}Cl_{10}O$ is described, respectively, in the specifications of U.S. Pat. Nos. 2,724,730, 3,313,857 and 2,616,928. The disclosure of each of said patents is expressly incorporated herein. A method for preparing $C_8Cl_8O_4S_2$ and $C_9Cl_{10}O_2S$ is described in the specification of Japanese Pat. Publication No. 29,380/70. The disclosure of said patent is expressly incorporated herein. The physical properties (for example, melting point) of each of the above flame retardants are described in the above specifications.

The flame retardant of formula (2) can be obtained by the Diels-Alder reaction between polyhalogenated cyclopentadiene (for example, hexachloro-; 5,5-dimethoxytetrachloro-; hexabromo-; 5,5-difluorotetrachloro-; 5,5-dibromotetrachloro-; and 5,5-diethoxytetrachlorocyclopentadiene) and terminally unsaturated alkadiene (for example, methylcyclopentadiene, cyclopentadiene, dicyclopentadiene, bicyclo [2,2,1]-heptadiene, 1,5-cyclooctadiene, cyclodecadiene and cyclododecadiene). Typical of said Diels-Alder reaction products are 1,4,7,10-dimethanocycloocta-1,2,3,4,7,8,9,10,13,13,14,14,-dodecachloro-1,4,4a,5b,-6a,7,10,10a,11,12,12a-dodecahydro [1,2,5,6] dibenzene; 1,2,3,4,6,7,8,9,13,13,14,14-dodecachloro-1,4;5;10;6,9-trimethano-11H-benzo [b] fluorene; 1,2,3,4,5,6,7,8,10,10,11,11-dodecachloro-1,4;5,8-dimethanofluorene and 1,2,3,4,5,6,7,8,12,12,13,13-dodecachloro- 1,4; 5,8; 9,10-trimethano-anthracene. The structural formulae, for the examples thereof, methods of preparation and the physical properties (for example, melting point, vapor pressure) of these compounds are described in detail in Japanese Patent Publication No. 5549/68, the disclosure of which is expressly incorporated herein.

The flame retardants of formula (3) are 1,2 adducts of (a) 1,7-octadiene or terminally unsaturated diolefinic compounds having a longer chain than said 1,7-octadiene wherein the number of carbon atom is 8 to 20, (for example 1,9-decadiene, 1,11-dodecadiene, 1,15-hexadecadiene, 1,19-eicosadiene) and (b) cyclopentadiene having six chlorine atoms or bromine atoms (for example, hexachlorohexabromo-, bromopentachloro-, dibromotetrachloro-tribromotrichloro-and tetrabromodichlorocyclopentadiene). The general formulae, further specific examples of the adducts, and the method of manufacture of these adducts are described in Japanese Patent Publication No. 1744/70, the disclosure of which is expressly incorporated herein.

For the brominated flame retardants of formula (5) and (6), $l$ is an integer from 1 to 5, preferably from 3 to 5, $s$ is an integer from 1 to 5, preferably from 3 to 5, $p$ is $(5-s)$ and $r$ is $(5-p)$. Typical examples of the flame retardant of formula (4) are 2,4,6-tribromo-m-cresol; 2,3,6-tribromo-p-cresol; 3,4,5,6-tetrabromo-o-cresol; 2,4,5,6-tetrabromo-m-cresol; hexabromobenzene and pentabromophenol.

Typical examples of the flame retardant of formula (5) and formula (6) are 3,4,5,6,3',4',5',6'-octaethyl-2',2-dibromodiphenyl; 5,6-dihexyl-2,3,4,-2'3'-pentabromodiphenyl; 2,3,4,5,6-pentabromo-2',3',4',5',6'-pentabutyldiphenyl; 2,4,6,2',4',6'-hexabromo-3-methyl-5-propyldiphenyl, decabromodiphenyl, decabromodiphenyl ether, tetrabromodiphenyl ether and hexabromodiphenyl ether. The flame retardants of formulae (4)–(6) are well known to the art and their preparation and properties are found in various patents and publications.

It is preferred to employ the flame retarding compounds of aforesaid formulae (1), (2) and (3) having a total of at least six chlorine and/or bromine atoms per compound. Flame retardants of the formulae (1), (2) or (3) having at least six halogen atoms each, provide the compositions of the invention with excellent flame resistance. If less than six halogen atoms are employed in flame retardants of formula (1), (2) or (3), then the flame resistant composition produced therefrom exhibits reduced flame retardency. Should additional amounts of flame retardant compounds having less than about six halogen atoms be added to the composition in an attempt to improve flame resistance thereof, it has been found that the heat resistance (Vicat softening point) of the resulting composition is reduced to an unsatisfactory degree.

It is preferred to employ a flame retarding compound having a melting point of at least about 100° C. and preferably at least 150° C. It has been found that by employing a flame retardant with the above melting point the resulting compositions have more preferred softening points and therefore preferred heat resistance.

In order to provide thermally stable, flame resistant compositions the aforesaid ring-opening polymerization polymers are admixed with the above-noted halogen-containing multicyclic compounds or bromine-containing aromatic compounds. In order to further improve the flame resistance of these compositions of the invention, a metal-containing inorganic compound may be added to the base composition.

Typical examples of the metal-containing inorganic compounds are antimony-containing compounds, such as antimony trioxide, antimony trichloride and, antimony trisulfide; bismuth-containing compounds such as bismuth oxide; arsenic-containing compounds such as arsenic trioxide; tin-containing compounds such as stannous oxide, stannic oxide and stannous chloride; lead-containing compounds such as lead oxide; zirconium-containing compounds such as zirconium oxide, zirconium oxychloride and zirconium chloride; and boron-containing compounds such as boric acid, zinc borate, barium borate and barium metaborate.

To further improve the thermal stability of the compositions of the invention a carboxylic acid may be additionally employed. The carboxylic acids used in the present invention are saturated fatty acids having 6 to 30 carbon atoms or unsaturated fatty acids having 11 to 24 carbon atoms or derivatives thereof. It is preferred that the carboxylic acid employed have a boiling point of more than about 200° C at 100 millimeters of mercury.

Typical saturated fatty acids employed are saturated monobasic fatty acids such as caproic acid, enanthic acid, caprylic acid, pelargonic acid, capric acid, undecanoic acid, lauric acid, myristic acid, palmitic acid, stearic acid, arachic acid, cerotic acid and melissic acid.

Typical saturated dibasic fatty acids are adipic acid, pimelic acid, suberic acid, azelaic acid, sebacic acid, undecane-1,9-dicarboxylic acid, decane-1,10-dicarboxylic acid, dodecane-1,12-dicarboxylic acid, tetradecane-1,14-dicarboxylic acid, hexadecane-1,16-dicarboxylic acid and octadecane-1,18-dicarboxylic acid.

Typical unsaturated fatty acids are linderic acid, tsuzuic acid, 5-myristoleic acid, 9-palmistoleic acid, petroselinic acid, oleic acid, elaidic acid, gadoleic acid, gondoic acid, cetoleic acid, erucic acid, orassidic acid, selacholeic acid, linoleic acid, linolenelaidic acid, linolenic acid, eleostearic acid, moroctic acid, parinaric acid, arachidonic acid, clupanodonic acid, scoliodonic acid and nisinic acid.

Derivatives of said saturated and unsaturated fatty acids can be used. Typical examples are (a) hydroxy fatty acids, such as 2,10-dihydroxy-tridecanoic acid, 3,11-dihydroxytetradecanoic acid, 11-hydroxy-pentadecanoic acid, 2,15-dihydroxy-pentadecanoic acid, 15,16-dihydroxy-hexadecanoic acid, 2,15,16-trihydroxy-hexadecanoic acid, 8,9,16-trihydroxyhexadecanoic acid, 9,10,16-trihydroxy-hexadecanoic acid, tetrahydroxy-hexadecanoic acid, 9,10-dihydroxy-octadecanoic acid, 16-hydroxy-9,10-hexadecanoic acid, 9,10-dihydroxyoctadecanoic acid, ricinostearolic acid, 2-hydroxy-dodecanoic acid, 2-hydroxy-tetradecanoic acid, ricinoleic acid and 2-hydroxy-hexadecanoic acid and (b) halogenated fatty acids, such as chlorostearic acid, 2-bromocaproic acid, 2-bromoenanthic acid, 7-bromoenanthic acid, 2-bromocapric acid, 8-bromocapric acid, 2-bromopelargonic acid, 9-bromopelargonic acid, 2-bromocaprylic acid, 10-bromocaprylic acid, 11-bromoundecanoic acid, 2-bromolauric acid, 12-bromolauric acid, 2-bromomyristic acid, 14-bromomyristic acid, 2-bromopalmitic acid, 16-bromopalmitic acid, 2-bromostearic acid, 18-bromostearic acid, 2-bromoarachidic acid and 20-bromoarachidic acid.

In general, it is preferred that the weight ratio of flame retarding compound to the ring-opening polymerization product is from about 0.03:1 to 0.45:1 (3 to 45 parts flame retardant per 100 parts ring-opening polymerization product). Enhanced results are obtained and, accordingly, it is preferred to employ from about 0.05 to 0.4 part flame retardant per part ring-opening polymerization product. It is particularly preferred to employ from about 0.07 to 0.35 part by weight of flame retarding compound per part ring-opening polymerization product. When the weight ratio of the flame retarding compound to the ring-opening polymerization product is less than about 0.3:1, the flame resistance of the resulting composition is reduced. If the weight ratio of flame retarding compound to ring-opening polymerization product is greater than about 0.45:1, the resulting composition is subject to abrupt reductions in its mechanical properties (for example, impact strength) and the composition becomes unduly expensive for commercial purposes.

In general, the weight ratio of metal-containing inorganic compound to ring-opening polymerization product is less than about 0.25:1, preferably about 0.015:1 to 0.2:1 and most preferably from about 0.025:1 to 0.15:1. When the weight ratio of metal-containing inorganic compound to ring-opening polymerization product is greater than about 0.25:1, increased flame resistance is obtained. However, the mechanical properties of the resulting composition, such as impact strength, tensile strength and workability, are substantially reduced.

In general, the weight ratio of carboxylic acid employed is up to about 0.07 part carboxylic acid per part ring-opening polymerization product. Preferably, the weight ratio of carboxylic acid to ring-opening polymerization product is from about 0.0005:1 and, most preferably, from 0.001:1 to 0.03:1. If weight ratios of carboxylic compound to ring-opening polymerization product greater than about 0.07:1 are employed, the softening point (heat resistance) of the resulting composition is not enhanced. Normally, carboxylic acids are conventionally employed as slipping agents. It was, therefore, quite unexpected that the carboxylic acids provided enhanced thermal stability (resistance to discoloration) for the ring-opening polymerization products.

In order to further improve the thermal stability of the composition of the invention, dehydrochlorination inhibitors may be employed in the composition. These dehydrochlorination inhibitors are well known to the art and have conventionally been employed in combination with PVC resins. Typical inhibitors are organotin compounds, metallic soups and lead inorganic compounds.

Typical examples of the organotin compounds employed in the present invention are dibutyltin maleate, dibutyltin dilaurate, dibutyltin laurate maleate and di-ooctyltin maleate.

Typical metallic soups employed in the present invention include lithium stearate, magnesium stearate, aluminum stearate, calcium stearate, calcium chlorostearate, calcium laurate, strontium stearate, barium stearate, barium chlorostearate, barium laurate, barium 2-ethylhexoate, barium ricinolate, zinc stearate, zinc laurate, zinc 2-ethylhexoate, zinc ricinolate, cadmium stearate, cadmium chlorostearate, cadmium laurate, cadmium 2-ethylhexoate, cadmium ricinolate, lead stearate, dibasic lead stearate, lead 2-ethylhexoate, tribasic lead maleate, dibasic lead phthalate and lead salicylate.

Typical lead inorganic compounds employed in the present invention include lead alkyl aryl phosphite, dibasic lead phosphite, basic lead sulfite, basic lead silicate and basic lead carbonate.

Auxiliary agents employed to further improve thermal stability of the resulting compositions of the invention are epoxy compounds and chelates.

It will be recognized by those skilled in the art that one or more flame retardants, one or more metal-containing inorganic compounds, one or more carboxylic acids and one or more dehydrochlorination inhibitors may be employed in the flame resistant compositions of the invention.

In order to form the flame resistant composition of the present invention the ring-opening polymerization product is homogeneously blended, according to conventional procedures, with the flame retardant of the present invention. Any or all of the aforesaid optional additives can also be homogeneously blended with the ring-opening polymerization product and flame retardant.

Conventional homogeneous blending techniques are employed to form the flame resistant composition of the present invention. Typically, the ingredients are mixed by molten blending techniques employing such mixers as the hot roll mill. Blending may also be accomplished employing a Banbury mixer in combination with an extruder. Conventional dry blending techniques may be employed. For example, the ingredients may be blended in a ribbon blender (mixer) and tumbler.

Of the various techniques, molten blending is preferred, since the ingredients of the composition of the invention are easily worked at elevated temperatures into a homogeneous state. It will be obvious to those skilled in the art that to obtain a more homogeneous composition two or more of the above-mentioned techniques for mixing can be employed in combination; for example, the ribbon mixer and extruder can be sequentially employed on a master batch of the composition of the invention.

It is a feature of the present invention that the novel compositions exhibit not only excellent flame resistance but also possess excellent workability and exhibit excellent mechanical properties. It has been found that when well known conventional thermoplastic resins are admixed with only the flame retardants employed in the invention, the resulting composition exhibits considerably deteriorated mechanical properties, compared to the original samples of thermoplastic resins. In contrast, as illustrated in the working examples described hereinafter, the compositions of the present invention exhibit satisfactory mechanical properties such as impact strength and tensile strength when compared to the mechanical properties of the ring-opened polymerization products alone.

It has been found that when a composition of the present invention is blended at high temperatures and the products fabricated from the composition are exposed to sunlight, both the original composition and product tend to be somewhat degraded by the combined action of oxygen, ozone and ultraviolet radiation. If, therefore is preferred for certain applications that the composition of the invention be admixed with ultraviolet ray stabilizers, heat stabilizers, and oxygen and ozone stabilizers. Typical stabilizers are phenolic compounds, thioethers of carboxylic esters, such as dilaurylthiodipropionate, and benzotriazole.

Additionally, depending upon the application for the composition, other conventional additives may be employed such as slipping agents, plasticizers, fillers, colorants, antistatic agents and foaming agents.

The compositions obtained by the present invention can be formed into films, sheets, tapes, boards, rods, balls, containers, pipes and many other shaped articles employing conventional molding methods such as extruding, injection molding, blow molding, compression molding and casting.

Typical shaped articles include machine parts, vehicle parts, building materials and the like. The present compositions are particularly useful when formed into parts for electrical appliances (for example, cabinets for televisions and radios). Such parts require thermal stability and flame and heat resistance.

Throughout the following examples and controls, flame resistance was determined according to UL Standards (Underwriters' Laboratories, Bulletin No. 94) and tests were conducted according to ASTM D-635 standards. Under the UL Standard, the test pieces fabricated were 5 inches (12.7cm) in length, 0.5 inch (1.3cm) in width, and 0.125 inch (0.3cm) in thickness.

Izod impact strength was determined according to the ASTM D-256-56 test standard. Tensile strength was measured according to the Japanese Industrial Standards — "JIS" K6723. In this test, the test piece dimension was half the size of the conventional JIS No. 2 standard; the thickness was 1 mm; the tensile speed employed was 5 mm./min. Vicat softening point was determined according to ASTM D-1525 standards.

Gel content was calculated as the percentage of insoluble residue in the test piece. For gel content determinations the test piece was extracted for 5 hours with methyl ethyl ketone as an extracting reagent using a Soxhlet extractor. Discolorment was measured as the degree of color change of the compression sheet formed by the procedure set forth hereinafter. Fluidity was determined by a conventional Koka type flow tester under pressure of 300 kg/cm$^2$ and at a temperature of 200° C using a nozzle having 0.1 cm diameter and 1 cm length. The following examples merely illustrate preferred embodiments of the invention and are not intended to limit the scope of the invention.

EXAMPLE 1

Ring-Opening Polymerization of Norbornene Derivative

A twenty liter stainless steel autoclave was dried. The atmosphere therein was replaced with nitrogen. The following ingredients were introduced into the dried, nitrogen filled autoclave: (1) 3.0 kg of 5-cyano-bicyclo (2,2,1)-heptene-2 as a monomer [purified by precision distillation (rectification) under reduced pressure immediately before application], (2) 9.0 liters of 1,2-dichloroethane as a solvent (dehydrated by calcium hydride and purified by precision distillation immediately before application) and (3) 32.9 ml (1.05 mole % based on the monomer) of n-hexene-1 as a molecular weight-controlling agent (purified by dehydration and precision distillation as described above). The ingredients were stirred to provide a homogeneous solution.

Added to this solution were (a) 75.6 ml of a 1,2-dichloro-ethane solution of tungsten hexachloride (0.2 mole/l) as a catalyst, (b) 90.8 ml of a 1,2-dichloroethane solution of diethyl aluminum chloride (1.0 mole/l) as a catalyst and (c) 75.6 ml of 1,2-dichloroethane solution of 1,1-diethoxyethane (0.6 mole/l) as the third component of the catalyst system. Based on 1 mole of the monomer, the proportion of the tungsten hexachloride was 0.6 millimole, the proportion of the diethyl aluminium chloride was 3.6 millimoles and the proportion of the 1,1-diethoxyethane was 1.8 millimoles. Polymerization was continued for 2 hours at 70° C with stirring. After the polymerization was completed, the reaction system was allowed to cool to room temperature.

A solution containing the reaction product was taken out of the autoclave. 100 ml of monoethanolamine was added to said solution, followed by full stirring. The mass was poured in a large amount (about 30 l) of methanol to precipitate the ring-opening polymerization product. The ring-opening polymerization product was subjected to two dissolution-precipitation cycles by an acetone/methanol system. After its removal from the system, the ring-opening polymerization product was dissolved in methylene chloride. The resultant solution was washed three times with a 1% aqueous solution of sodium tripolyphosphate. Next, water washing was carried out three times.

The ring-opening polymerization product was next diluted with acetone to a concentration of about 10% by weight. The diluted ring-opening polymerization product was then precipitated, employing excess methanol. The thus ring-opened polymerization product was recovered and dried 48 hours at 45° C under vacuum to yield 2.59 kilograms of product. The ring-opening polymerization product was obtained in a white flaky form. The product had a reduced viscosity of 0.51 as measured at 30° C in a solvent of dimethylformamide into which said product was dissolved at a concentration of 0.1 g/dl. This product is hereinafter referred to as "polymer 1".

Test of Composition (Blank Test)

100 parts by weight of polymer 1 and 0.5 part by weight of 2,6-di-tert-butyl-p-cresol as a stabilizer were fully kneaded 10 minutes on a hot roll whose surface temperature was set at 180° C. The fluidity of the kneaded mass by the Koka type flow test was $1.6 \times 10^{-2}$ cc/second. The kneaded mass was formed into a compressed plate by being compressed 5 minutes at a pressure of 100 kg/cm² in a press molding machine at 200° C and thereafter was compressed 10 minutes at a pressure of 100 kg/cm² by means of a water-cooled press machine.

The compressed plate obtained had a flame resistance of 94 HB according to the aforementioned UL Standard. The plate was selfburning according to ASTM Standard D-635. The plate was found to have 0% gel content and good transparency (light yellow). A compressed sheet of said polymer 1 was formed by compressing polymer 1 at 230° C by a conventional compressing method. The sheet exhibited a good appearance (excellent luster and no discolorment) and possessed the following mechanical properties: a Vicat softening point of 132° C; Izod impact strength of 9.2 kg.cm/cm-notched; and a tensile strength of 460 kg/cm².

Test of a Composition of the Invention 100 parts by weight of polymer 1, 0.5 part by weight of 2,6-di-tert-butyl-p-cresol as a stabilizer, 2.0 parts by weight of dibutyl tin maleate as a stabilizer and varying amounts of the flame retardants described below were kneaded on a hot roll in the same manner as described above.

The kneaded samples were formed into a compressed plate as described above. The flame resistance, gel content, discolorment, Vicat softening point, Izod impact strength and tensile strength of the compressed plate were measured, as well as the fluidity of the kneaded sample.

The results are set forth in Table 1.

FLAME RETARDANTS TESTED

A. 1,2,3,4,5,6,7,8,10,10,11,11-dodecachloro-1,4; 5,8-dimethanofluorene

B. perchloropentacyclodecane ($C_{10}Cl_{12}$)

C. 1,4,7,10-dimethanocycloocta-1,2,3,4,7,8,9,10,13,13,14,14-dodecachloro-1,4,4a,5,6,-6a,7,10,10a,11,12,12a-dodecahydro [1,2,5,6]-dibenzene D. 1,2,3,4,5,6,7,8,12,12,13,13-dodecachloro-1,4; 5,8; 9,10-trimethano-anthracene E. 1,2,3,4,5,6,7,8,9,13,13,14,14-dodecachloro-1,4; 5,10; 6,9-trimethano-11H-benzo[b] fluorene

F.

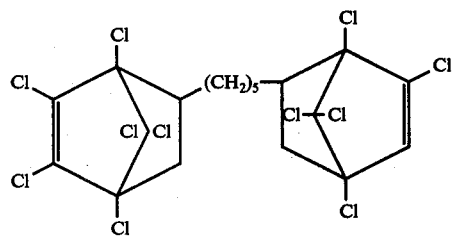

G. hexabromobenzene
H. pentabromotoluene
I. pentabromophenol
J. decabromodiphenyl
K. 2,3,5,6-tetrabromo-4-hydroxy benzylbromide
L. decabromodiphenylether
M. chlorinated paraffin having chlorine content 70% by weight
N. tetrabromobisphenol A
O. tetrabromobutane
P. tris (2,3-dibromopropyl) phosphate
Q. ethylenediamine-di-hydrobromide Flame retardants (A)–(L) represent flame retardants employed in the composition of the invention. Other flame retardants (M)–(Q) are employed for comparative purposes only. The amount of flame retardant employed is expressed in Table 1 in parts flame retardant per 100 parts by weight of ring-opening polymerization product.

Table 1

| Number of Sample | Flame retardant Kind | Flame retardant Amount | Burning Test[1] (ASTM) | | Fluidity (cc/second) | Gel Content (%) | Discolorment |
|---|---|---|---|---|---|---|---|
| 1 | (A) | 5 | N | (12) | $1.6 \times 10^{-2}$ | 0 | White |
| 2 | " | 10 | " | (3) | " | " | " |
| 3 | " | 20 | " | (1) | " | " | " |
| 4 | " | 30 | " | (1) | $1.4 \times 10^{-2}$ | " | " |
| 5 | " | 40 | " | (1) | $1.1 \times 10^{-2}$ | " | " |
| 6* | " | 50 | " | (1) | $0.8 \times 10^{-2}$ | " | Light Yellow |
| 7 | (B) | 20 | " | (1) | $1.5 \times 10^{-2}$ | " | White |
| 8 | (C) | " | " | (2) | $1.6 \times 10^{-2}$ | " | " |
| 9 | " | 30 | " | (0) | $1.4 \times 10^{-2}$ | " | " |
| 10 | (D) | 10 | " | (6) | $1.6 \times 10^{-2}$ | " | " |
| 11 | " | 20 | " | (1) | " | " | " |
| 12 | (E) | " | " | (2) | $1.5 \times 10^{-2}$ | " | " |
| 13 | (F) | " | " | (2) | $1.6 \times 10^{-2}$ | " | " |
| 14 | (G) | 5 | " | (14) | $1.7 \times 10^{-2}$ | " | " |
| 15 | " | 10 | " | (4) | $1.6 \times 10^{-2}$ | " | " |
| 16 | " | 20 | " | (1) | " | " | " |
| 17 | " | 30 | " | (1) | $1.5 \times 10^{-2}$ | " | " |
| 18 | " | 40 | " | (1) | $1.2 \times 10^{-2}$ | " | " |
| 19* | " | 50 | " | (1) | $0.8 \times 10^{-2}$ | " | Light Yellow |
| 20 | (H) | 20 | " | (2) | $1.7 \times 10^{-2}$ | " | White |
| 21 | (I) | " | " | (2) | $1.6 \times 10^{-2}$ | " | " |
| 22 | (J) | " | " | (1) | $1.5 \times 10^{-2}$ | " | " |
| 23 | (K) | " | " | (3) | $6.4 \times 10^{-2}$ | " | " |
| 24 | (L) | 10 | " | (10) | $1.7 \times 10^{-2}$ | " | " |
| 25 | " | 20 | " | (1) | $1.6 \times 10^{-2}$ | " | " |
| 26* | (M) | 20 | "cm-notched) | (1) | $0.4 \times 10^{-2}$ | 11.8 | Black |
| 27* | (N) | " | " | (2) | $6.0 \times 10^{-2}$ | 1.0 | Brown |
| 28* | (O) | " | " | (1) | $0.1 \times 10^{-2}$ | 65.0 | Black |
| 29* | (P) | 20 | " | (4) | $0.4 \times 10^{-2}$ | 62.3 | Black |
| 30* | (Q) | 20 | " | (2) | $0.7 \times 10^{-2}$ | 1.9 | Brown |

| Number of | Flame retardant | Vicat Softening | Impact strength (kg.cm/ | Tensile strength | Appearance of compressed |

Table 1-continued

| Sample | Kind | Amount | Point | cm-notched | (kg/cm²) | sheet² |
|---|---|---|---|---|---|---|
| 1 | (A) | 5 | 132 | 9.5 | 459 | 0 |
| 2 | " | 10 | " | 9.7 | 448 | 0 |
| 3 | " | 20 | " | 10.8 | 441 | 0 |
| 4 | " | 30 | 128 | 10.2 | 430 | 0 |
| 5 | " | 40 | 126 | 9.8 | 425 | 0 |
| 6* | " | 50 | 122 | 6.2 | 422 | Δ |
| 7 | (B) | 20 | 132 | 8.8 | 454 | 0 |
| 8 | (C) | " | " | 9.5 | 451 | 0 |
| 9 | " | 30 | 127 | 9.0 | 436 | 0 |
| 10 | (D) | 10 | 132 | 9.5 | — | 0 |
| 11 | " | 20 | 131 | 9.7 | 452 | 0 |
| 12 | (E) | " | " | 9.5 | 454 | 0 |
| 13 | (F) | " | " | 9.4 | 453 | 0 |
| 14 | (G) | 5 | 132 | 9.0 | 466 | 0 |
| 15 | " | 10 | 131 | 8.9 | 472 | 0 |
| 16 | " | 20 | 130 | 8.8 | 470 | 0 |
| 17 | " | 30 | 129 | 8.5 | " | 0 |
| 18 | " | 40 | 125 | 8.2 | 458 | 0 |
| 19* | " | 50 | 122 | 6.1 | 410 | 0 |
| 20 | (H) | 20 | 130 | 8.5 | 465 | 0 |
| 21 | (I) | " | 129 | 8.4 | 467 | 0 |
| 22 | (J) | " | 132 | 8.8 | 471 | 0 |
| 23 | (K) | " | 127 | 8.3 | 472 | 0 |
| 24 | (L) | 10 | 130 | 8.8 | 466 | 0 |
| 25 | " | 20 | 128 | 8.4 | 457 | 0 |
| 26* | (M) | 20 | — | 3.5 | — | X |
| 27* | (N) | " | — | 1.9 | — | Δ |
| 28* | (O) | " | — | 1.0 | — | X |
| 29* | (P) | 20 | — | 2.0 | — | X |
| 30* | (Q) | 20 | — | 7.3 | — | X |

| Number of Sample | Flame retardant Kind | Flame retardant Amount | Burning Test[1] (ASTM) | Fluidity (cc/second) | Gel Content (%) | Discolorment | Vicat Softening Point | Impact Strength (kg.cm/cm-notched) | Tensile strength (kg/cm²) | Appearance of compressed sheet² |
|---|---|---|---|---|---|---|---|---|---|---|
| 300* | A | 1.5 | SB | 1.6×10⁻² | 0 | White | 132 | 9.2 | 460 | 0 |
| 301 | " | 3.5 | SE | " | " | " | " | 9.4 | " | 0 |
| 302 | " | 43 | N(1) | " | " | " | 125 | 8.8 | 424 | 0 |
| 303* | " | 48 | " | 0.9×10⁻² | " | Light yellow | 123 | 7.0 | 420 | Δ |

*Control
[1]N: Non-combustible, ( ) : burning time in seconds, SB: Self-burning, SE: Self-extinguishing
²0: Good luster and color, Δ: Medium luster and color, X: Bad luster and color The test results illustrate the effective flame retardance, heat resistance and the superior mechanical properties, appearance and workability imparted to the compositions of the invention by the flame retardants of formulae (1)–(6) as compared to other conventionally employed flame retardants. The results show that gel content, discolorment, appearance, impact strength and fluidity of the resulting compositions are enhanced when the flame retardants of formula (1)–(6) are employed as compared to conventional flame retardants.

The results also illustrate the reduction in mechanical properties and appearance imparted to the compositions of the invention when the weight ratio of flame retardant to polymer is greater than about 0.45:1 and less than about 0.03:1.

Similar results are obtained when other ring-opening polymerization products of a norbornene derivative are substituted for the cyano polymer. In particular, enhanced results are expected when a homopolymer of a ring-opening norbornene derivative containing an ether group, ester group, N-substituted cyclic imide group, halogen group and copolymers of such groups according to the present invention are substituted for the cyano product. Again, similar results are expected when a ring-opening polymerization copolymer of a norbornene derivative containing one of the above polar groups and either a cycloolefinic compound or other norbornene derivative containing an amide, acid anhydride, aromatic nitrogen-containing heterocyclic radical, aromatic radical, aromatic norbornadiene radical, ester type norbornadiene radical and the like in accordance with the present invention are substituted.

Again, if other flame retarding compounds selected from halogen-containing multicyclic compounds of formula (1)–(3) or bromine-containing compounds of formula (4)–(6) are substituted for the flame retardants (A)–(L), similar results are expected.

It will be apparent that when any of the combinations of the polymers of the norbornene derivatives actually listed hereinbefore and the flame retardants actually listed hereinbefore are substituted for the ring-opening cyano polymer and flame retardants tested, similar results are expected.

EXAMPLE 2

The polymer (1) of Example 1 was blended with flame retardants employed in Example 1 in accordance with the procedure of Example 1. Kneading was carried out on a hot roll in substantially the same manner as in Example 1, with the exception that the metal-containing inorganic compounds listed in Table 2 were added.

The kneaded samples were press molded as in Example 1. The inflammability, gel content, discolorment and Izod impact strength of the compressed plate obtained were measured. The results are set forth in Table 2. The units employed to express the results of Table 2 are the same as the units of Table 1. The amount of metal-inorganic compound is expressed in parts by weight in Table 2.

The test results illustrate the enhanced flame resistance imparted to the compositions of the invention by the metal-containing inorganic compounds. Similar results are imparted to combinations of other norbornene ring-opened polymers and flame retardants listed hereinbefore.

TABLE 2

| Number of sample | Flame retardant Kind | Flame retardant amount | Metal-containing/inorganic compound Kind | Metal-containing/inorganic compound Amount | Burning test | | Gel content (%) | Discolorment | Impact strength |
|---|---|---|---|---|---|---|---|---|---|
| 31 | (A) | 5 | Diantimony trioxide | 2.5 | N | (6) | 0 | White | 9.5 |
| 32 | " | 10 | " | 5.0 | N | (1) | 0 | " | 9.6 |
| 33 | " | 20 | " | 5.0 | N | (0) | 0 | " | 9.9 |
| 34* | — | — | " | 10.0 | SB | — | 0 | " | 8.7 |
| 35 | (A) | 10 | Stannic oxide | 5.0 | N | (2) | 0 | " | 9.5 |
| 36 | " | 10 | Stannous oxide | 5.0 | " | (3) | 0 | " | 9.4 |
| 37 | " | 10 | Zinc borate | 5.0 | " | (2) | 0 | " | 9.5 |
| 38 | " | 10 | Barium borate | 5.0 | " | (2) | 0 | " | 9.3 |
| 39 | " | 10 | Bismuth oxide | 5.0 | " | (2) | 0 | " | 9.5 |
| 40 | " | 10 | Boric acid | 5.0 | " | (2) | 0 | " | 9.4 |
| 41 | " | 10 | Zirconium oxide | 5.0 | " | (2) | 0 | " | 9.2 |
| 42* | (M) | 10 | Diantimony trioxide | 5.0 | " | (1) | 6.4 | Black | 3.0 |
| 43* | (P) | 10 | " | 5.0 | " | (4) | 38.2 | " | — |
| 44 | (B) | 10 | " | 5.0 | " | (2) | 0 | White | 8.6 |
| 45 | (C) | 10 | " | 5.0 | " | (2) | 0 | " | 9.3 |
| 46 | (D) | 10 | " | 5.0 | " | (1) | 0 | " | 9.4 |
| 47 | (E) | 10 | " | 5.0 | " | (2) | 0 | " | 9.2 |
| 48 | (F) | 10 | " | 5.0 | " | (3) | 0 | " | 9.1 |
| 49 | (C) | 10 | Stannic oxide | 5.0 | " | (3) | 0 | " | 9.0 |
| 50 | (C) | 10 | Bismuth oxide | 5.0 | " | (3) | 0 | " | 9.1 |
| 51* | (Q) | 10 | Diantimony trioxide | 5.0 | " | (3) | 0.9 | Brown | 6.3 |
| 52 | (G) | 5 | Diantimony trioxide | 2.5 | " | (9) | 0 | White | 9.1 |
| 53 | " | 5 | " | 5.0 | " | (6) | 0 | " | 8.9 |
| 54 | " | 10 | " | 5.0 | " | (1) | 0 | " | 8.9 |
| 55 | " | 20 | " | 5.0 | " | (1) | 0 | " | 8.5 |
| 56 | " | 10 | Zinc borate | 5.0 | " | (2) | 0 | " | 8.9 |
| 57 | " | 10 | Barium borate | 5.0 | " | (2) | 0 | " | 9.1 |
| 58 | " | 10 | Zirconium oxide | 5.0 | " | (2) | 0 | " | 8.6 |
| 59 | (J) | 10 | Diantimony trioxide | 5.0 | " | (1) | 0 | " | 9.0 |
| 60 | (H) | 10 | " | 5.0 | " | (2) | 0 | " | 8.5 |

EXAMPLE 3

The polymer (1) of Example 1 was blended with flame retardant (A) of Example 1 according to the procedure of Example 1. Kneading was carried out on a hot roll in substantially the same manner as in Example 1, with the exception that 10.0 parts by weight of flame retardant (A), 5.0 parts by weight of diantimony trioxide and 3.0 parts by weight of the dehydrochlorination inhibitors and the carboxylic acids listed in Table 3 were added.

The kneaded samples were press molded as in Example 1. 1 The compressed plates obtained indicated non-combustibility according to the ASTM method and 0% gel content. Naked eye observation was made and the results reported as discolorment appearing on the compressed plates when they were allowed to stand 15 minutes and 30 minutes at 250° C in nitrogen. The results are set forth in Table 3.

0.5 part by weight of stearic acid as a stabilizer. Each of the combined masses was kneaded on a hot roll in the same manner as in Example 1. Each of the kneaded masses was formed into a compressed plate by being compressed as in Example 1, with the exception of the compositions listed below. The flame retardants denoted by (A) – (Q) are defined in Example 1.

The flame resistance, Izod impact strength, tensile strength and gel content of each obtained compressed plate were measured in accordance with the procedures of Example 1. The results are set forth in Table 4.

Kneading was carried out on a hot roll at 210° C and compression was carried out at 230° C in the case of the flame retardant composition employing polymers (3), (4), (13) and (17). Kneading was carried out on a hot roll at 160° C in the case of the flame retardant composition employing polymer (24). Further, in the case of the flame retardant composition employing polymers (20), (24) and (25) gel content was measured by compressing Table 3

| No. | Dehydrochlorination Inhibitor Kind | Dehydrochlorination Inhibitor Amount | Carboxylic acid Kind | Carboxylic acid Amount | Color Before Test | Color after test After 15 min. | Color after test After 30 min. |
|---|---|---|---|---|---|---|---|
| 61 | — | — | — | — | White | Light Yellow | Brown |
| 62 | Dioctyltin maleate | 3.0 | Stearic acid | 0.5 | " | White | White |
| 63 | Dibutyltin maleate | 3.0 | — | — | " | " | " |
| 64 | " | | 3.0 | Stearic acid | 0.5 | " | " | " |
| 65 | " | 3.0 | Palmitic acid | 0.5 | " | " | " |
| 66 | " | 3.0 | Oleic acid | 0.5 | " | " | " |
| 67 | " | 3.0 | Linoleic acid | 0.5 | " | " | " |
| 68 | " | 3.0 | Ricinoleic acid | 0.5 | " | " | " |
| 69 | " | 3.0 | Sebacic acid | 0.5 | " | " | " |
| 70 | " | 3.0 | Stearic acid | 2.0 | " | " | " |
| 71*[1] | " | 3.0 | " | 0.5 | Brown | Black | — |

[1]Flame retardant (M) was used instead of flame retardant (A).

EXAMPLE 4

100 parts by weight each of the below prepared ring-opening polymerization products were individually combined with a flame retardant as set forth in Table 4 together with diantimony trioxide in amounts of one-half the weight of the applied flame retardant, 0.5 part by weight of 2.6-di-tert-butyl-p-cresol as a stabilizer, 2.0 parts by weight of dibutyl tin maleate as a stabilizer and 20 minutes at 220° C.

The symbol $[\eta]$ refers to the reduced viscosity of the polymer measured at 30° C in the solvent dimethylformamide with the concentration of polymer fixed at 0.1g/dl.

PREPARATION OF RING-OPENING POLYMER OF NORBORNENE DERIVATIVE

POLYMER (2)

The same type of autoclave as used in Example 1 was charged (followed by thorough stirring) with (i) 3.0 kg of 5-methyl-5-methoxycarbonyl-bicyclo[2,2,1]-heptene-2 as a monomer (vacuum distilled immediately before application), (ii) 9l of 1,2-dichloroethane as a solvent (dehydrated by calcium hydride immediately before application) and (iii) 22.4 ml (1.0 mole% based on the monomer) of n-hexene-1 as a molecular weight controlling agent. Added to this solution were (a) 72.3 ml of 1,2-dichloroethane solution of tungsten hexachloride (0.2 mole/l) as a polymerization catalyst, (b) 86.8 ml of 1,2-dichloroethane solution of diethyl aluminum chloride (1.0 mole/l) as a polymerization catalyst and (c) 72.3 ml of 1,2-dichloroethane solution of 1,1-diethoxyethane as a third component. Based on 1 mole of the monomer, the proporton of the tungsten hexachloride was 0.8 millimole, the proportion of the diethyl aluminum chloride was 4.8 millimoles and the proportion of the 1,1-diethoxyethane was 2.4 millimoles). Ring-opening polymerization was continued for 5 hours at a temperature ranging from 45° to 50° C. Upon completion of polymerization, purification (aftertreatment) was carried out in the same manner as in Example 1. The resultant ring-opening polymerization product was obtained as white flakes yielding 2.63 kg of product. The product had a reduced viscosity of 0.76 as measured in 1,2-dichloroethane at 30° C in which said product was dissolved at a concentration of 0.1g/dl. This product is hereinafter referred as "polymer 2".

POLYMER (3)

The autoclave used in Example 1 was fully dried and purged with nitrogen. Next it charged (followed by stirring for homogeneous mixing) with (i) 8.0l of 1,2-dichloroethane as a solvent (dehydrated by calcium hydride immediately before application), (ii) 2.66 kg (20 moles at a monomer concentration of 25 wt/vol%) of 5-cyano-5-methyl-bicyclo[2,2,1]-heptene-2 as a monomer (vacuum distilled immediately before application) and (iii) 17.3 ml (0.7 mole% based on the monomer) of n-hexene-1 as a molecular weight-controlling agent. Added to the charged mass were (a) 80 ml (0.08 mole% based on the monomer) of 1,2-dichloroethane solution of tungsten hexachloride (0.2 mole/l) as a polymerization catalytic component, (b) 80 ml (3 moles per mole of the tungsten hexachloride) of 1,2-dichloroethane solution of 1,1-diethoxyethane (0.6 mole/l) as a third component and (c) 96 ml (6 moles per mole of the tungsten hexachloride) of 1,2-dichloroethane solution of diethyl aluminum chloride (1.0 mole/l) as a polymerization catalystic component. Polymerization was continued 4 hours at 70° C. Upon completion of polymerization, aftertreatment was effected in the same manner as in Example 1. The yield of ring-opening polymerization product obtained was 2.37 kg. The product was recovered as a white powder form having a reduced viscosity of 0.55, as measured in dimethylformamide at 30° C in which said product is hereinafter referred to as "polymer 3".

POLYMER (4)

After being dried and purged with nitrogen, the autoclave used in Example 1 was charged (followed by stirring for homogeneous mixing) with (i) 8.0l of 1,2-dichloroethane as a solvent (dehydrated by calcium hydride immediately before application, (ii) 2.66 kg. (20 moles at a monomer concentration of 25 wt/vol%) of 5-cyanomethyl-bicyclo[2,2,1]-heptene-2 as a monomer (vacuum distilled immediately before application) and (iii) 17.3 ml (0.7 mole% based on the monomer) of application) and (iii) 17.3 ml (0.7 mole% based on the monomer) of n-hexene-1 as a molecular weight-controlling agent. Added to the charged mass were (a) 70 ml (0.07 mole% based on the monomer) of 1,2-dichloroethane solution of tungsten hexachloride (0.2 mole/l) as a polymerization catalytic component, (b) 70 ml (0.21 mole% based on the monomer) of 1,2-dichloroethane solution of 1,1-diethoxyethane (0.6 mole/l) as a third component and (c) 84 ml (0.42 mole% based on the monomer) of 1,2-dichloroethane solution of diethyl aluminum chloride (1.0 mole%/l) as a catalytic component. Polymerization was continued for 5 hours at 70° C. Aftertreatment was carried out in the same manner as in Example 1. The ring-opening polymerization product was obtained in a yield of 2.32 kg as a white powder, having a reduced viscosity of 0.69 as measured in dimethylformamide at 30° C in which said product was dissolved at a concentration of 0.1 g/dl. This polymer is hereinafter referred to as a "polymer 4".

POLYMER (5)

A fully dried and nitrogen-purged autoclave of the same type as used in Example 1 was charged (followed by thorough stirring) with (i) 11.4l of 1,2-dichloroethane as a solvent (dehydrated by calcium hydride immediately before application), (ii) 2.88 kg (20 moles; monomer concentration of 20 wt/vol%) of 5,5-dicyano-bicyclo[2,2,1]-heptene-2 as a monomer (vacuum distilled immediately before application) and (iii) 24.8 ml (1 mole% based on the monomer) of n-hexene-1 as a molecular weight controlling agent. Added to the charged mass were (a) 100 ml (0.1 mole% based on the monomer) of 1,2-dichloroethane solution of tungsten hexachloride (0.2 mole/l) as a polymerization catalytic component, (b) 100 ml (3 moles per mole of the tungsten hexachloride) of 1,2-dichloroethane solution of 1,1-diethoxyethane (0.6 mole/l) as a third component and (c) 120 ml (6 moles per mole of the tungsten hexachloride) of 1,2-dichloroethane solution of diethyl aluminum chloride (1.0 mole/l) as a catalytic component. Polymerization was continued for 5 hours at 70° C. The charged mass was (1) poured in 30l of methyl alcohol containing 5% by volume of 35 wt% hydrochloric acid. (2) thoroughly mixed, and (3) thereafter, filtered. The ring-opening polymerization product obtained was fully washed with methyl alcohol and dried 48 hours under vacuum at 45° C. As the result, the yield of the product was 2.40 kg as a white powder with a reduced viscosity of 0.54 as measured in dimethylformamide at 30° C in which said product was dissolved at a concentration of 0.1 g/dl. This product is hereinafter referred to as "polymer 5".

POLYMER (6)

After being fully dried and purged with nitrogen, the autoclave used in Example 1 was charged (followed by stirring for homogeneous mixing) with (i) 9.0l of 1,2-dichloroethane as a solvent (dehydrated by calcium hydride immediately before application), (ii) 3.0 kg (19.75 moles) of 5-methoxy-carbonyl-bicyclo[2,2,1]-heptene-2 as a monomer (vacuum distilled just before application) and (iii) 36.7 ml (1.5 mole% based on the monomer) of n-hexene-1 as a molecular weight-controlling agent. Added to the charged mass were (a) 59.3 ml (0.06 mole% based on the monomer) of 1,2-dichloroethane solution of tungsten hexachloride (0.2 mole/l) as a polymerization catalytic component, (b) 59.3 ml (3 moles per mole of the tungsten hexachloride) of 1,2-dichloroethane solution of 1,1-diethoxyethane (0.6 mole/l) as a third component and (c) 71.7 ml (6 moles per mole of the tungsten hexachloride) of 1,2-dichloroethane solution of diethyl aluminum monochloride (1.0 mole/l) as a polymerization catalytic component. Ring-opening polymerization was continued for 4 hours at 50° C. The product was purified in the same manner as in Example 1. Upon completion of polymerization the yield of product was 2.5 kg as a white powder with a reduced viscosity of 0.48 as measured in 1,2-dichloroethane at 30° C in which the product was dissolved at a concentration of 0.1 g/dl. This product is hereinafter referred to as "polymer 6".

POLYMER (7)

Ring-opening polymerization was carried out in substantially the same manner as in the case of the polymer 6, except that the monomer consisted of 3.32 kg (18.07 moles) of 5-acetoxymethyl-bicyclo[2,2,1]-heptene-2; the proportion (amount) of n-hexene-1 as a molecular weight-controlling agent was changed to 17.3 ml (0.7 mole% based on the monomer); the proportion of 1,2-dichloroethane solution of tungsten hexachloride (0.2 mole/l) as a polymerization catalytic component was changed to 60.0 ml (0.06 mole % based on the monomer); the proportion of 1,2-dichloroethane solution of 1,1-diethoxyethane (0.6 mole/l) as a third component was changed to 60.0 ml (3 moles per mole of the tungsten hexachloride); the proportion of 1,2-dichloroethane solution of diethyl aluminum monochloride (1.0 mole/l) as a catalytic component was changed to 72.0 ml (6 moles per mole of the tungsten hexachloride); and said polymerization was carried out for 5 hours at 45° C. The product was purified in the same manner as in Example 1. Upon completion of polymerization the product yield was 2.47 kg as a white powder having a reduced viscosity of 0.51 as measured in 1,2-dichloroethane at 30° C in which the product was dissolved at a concentration of 0.1 g/dl. This product is hereinafter referred to as "polymer 7".

POLYMER (8)

Ring-opening polymerization was carried out in substantially the same manner as polymer 6, except that the monomer consisted of 3.0 kg of 5-acetoxy-bicyclo[2,2,1]-heptene-2; the proportion of n-hexene-1 as a molecular weight-controlling agent was changed to 30.6 ml (1.25 mole% based on the monomer), and said polymerization was continued for 5 hours at 45° C. The product was purified in the same manner as in Example 1. Upon completion of polymerization the yield of product was 2.45 kg as a white powder with a reduced viscosity of 0.51 as measured in 1,2-dichloroethane at 30° C in which the product was dissolved at a concentration of 0.1 g/dl. This product is hereinafter referred to as "polymer 8".

POLYMER (9)

Ring-opening polymerization was conducted in substantially the same manner as in the case of polymer 6, except that the monomer consisted of 3.0 kg of 5,6-dimethoxycarbonyl-bicyclo[2,2,1]-heptene-2; the proportion of n-hexene-1 as a molecular weight-controlling agent was changed to 22.1 ml (1.25 mole% based on the monomer); the proportion of 1,2-dichloroethane solution of tungsten hexachloride (0.2 mole/l) as a polymerization catalytic component was changed to 89.3 ml (1.25 mole% based on the monomer); the proportion of 1,2-dichloroethane solution of 1,1-diethoxyethane (0.6 mole/l) as a third component was changed to 89.3 ml (3 moles per mole of the tungsten hexachloride) and the proportion of 1,2-dichloroethane solution of diethyl aluminum monochloride (1.0 mole/l) as a polymerization catalytic component was changed to 107.2 ml (6 moles per mole of the tungsten hexachloride); and said polymerization was carried out for 5 hours at 45° C. The product was purified in the same manner as in Example 1. Upon completion of polymerization the product yield was 26.6 kg as a white powder with a reduced viscosity of 0.52 as measured in 1,2-dichloroethane at 30° C in which the product was dissolved at a concentration of 0.1 g/dl. This product is hereinafter referred to as "polymer 9".

POLYMER (10)

After being fully dried and purged with nitrogen, the autoclave used in Example 1 was charged (followed by stirring for homogeneous mixing) with (a) 9.0l of 1,2-dichloroethane as a solvent purified in the same manner as in Example 1, (b) 1.67 kg (14 moles) of 5-cyano-bicyclo [2,2,1]-heptene-2 as a monomer purified in the same manner as in Example 1, (c) 1.0 kg (6 moles) of 5-methyl-5-methoxycarbonyl-bicyclo[2,2,1]-heptene-2 as a monomer, purified in the same manner as in "polymer 2" and (d) 14.8 ml (0.6 mole% based on the monomer) of n-hexene-1 as a molecular weight-controlling agent. Added to the charged mass were (i) 75 ml (0.075 mole% based on the monomer) of 1,2-dichloroethane solution of tungsten hexachloride as a polymerization catalytic component, (ii) 75 ml (3 moles per mole of the tungsten hexachloride) of 1,2-dichloroethane solution of 1,1-diethoxyethane (0.6 mole/l) as a third component and (iii) 90 ml (6 moles per mole of the tungsten hexachloride) of 1,2-dichloroethane solution of diethyl aluminum chloride (1.0 mole/l) also as a polymerization catalytic component. Polymerization was carried out for 5 hours at 70° C. Upon completion of polymerization, aftertreatment was carried out in the same manner as in Example 1. The product was obtained in a yield of 2.35 kg as a white powder. Elemental analysis showed the product to be a copolymer containing 71.3 mole% of 5-cyano-bicyclo[2,2,1]-heptene-2. The product had a reduced viscosity of 0.75 as measured in dimethylformamide at 30° C in which the product was dissolved at a concentration of 0.1 g/dl. This product is hereinafter referred to as "polymer 10".

POLYMER (11)

After being fully dried and purged with nitrogen, the autoclave used in Example 1 was charged (followed by stirring for homogeneous mixing) with (a) 9.0l of 1,2-dichloroethane as a solvent purified in the same manner as in Example 1, (b) 2.34 kg (19.6 moles) of 5-cyano-bicyclo[2,2,1]-heptene-2 as a monomer purified in the same manner as in Example 1, (c) 27.0 g (0.4 moles) of cyclopentene also as a monomer (vacuum distilled for purification) and (d) 24.8 ml (1.0 mole% based on the monomer) of n-hexene-1 as a molecular weight-controlling agent. Added to the charged mass were (i) 60.0 ml (0.06 mole% based on the monomer) of 1,2-dichloroethane solution of tungsten hexachloride (0.2 mole/l) as a polymerization catalytic component, (ii) 60.0 ml (3 moles per mole of the tungsten hexachloride) of 1,2-dichloroethane solution of 1,1-diethoxyethane (0.6 mole/l) as a third component, and (iii) 72.0 ml (6 moles per mole of the tungsten hexachloride) of 1,2-dichloroethane solution of diethyl aluminum chloride (1.0 mole/l). Polymerization was carried out for 5 hours at 70° C. Upon completion of polymerization, aftertreatment was carried out in the same manner as in Example 1. The product was obtained in a yield of 2.03 kg as a white powder. Elemental analysis confirmed a copolymer containing 97.8 mole% of 5-cyano-bicyclo[2,2,1]-heptene-2. Said copolymer had a reduced viscosity of 0.52, as measured in dimethylformamide at 30° C in which said copolymer was dissolved at a concentration of 0.1g/dl. This product is hereinafter referred to as "polymer 11".

POLYMER (12)

Ring-opening polymerization was undertaken in substantially the same manner as in the case of the polymer 6, except that the monomers consisted of 2.03 kg (17 moles) of 5-cyano-bicyclo[2,2,1]-heptene-2 and 0.43 kg (3 moles) of 5,5-dicyano-bicyclo[2,2,1]-heptene-2. The proportion (amount) of 1,2-dichloroethane as a solvent was changed to 11.4l. The proportion of n-hexene-1 as a molecular weight-controlling agent was changed to 24.8 ml (1 mole% based on the total amount of the monomers). The porportion of 1,2-dichloroethane solution of tungsten hexachloride (0.2 mole/l) as a polymerization catalytic component was changed to 100 ml (0.1 mole% based on the total amount of the monomers). The amount of a 1,2-dichloroethane solution of 1,1-diethoxyethene (0.6 mole/l) as a third component was changed to 100 ml (3 moles per mole of the tungsten hexachloride). The proportion of 1,2-dichloroethane solution of diethyl aluminum monochloride (1.0 mole/l) as a polymerization catalytic component was changed to 120 ml (6 moles per mole of the tungsten hexachloride). The polymerization was carried out for 5 hours at 70° C. The product was purified in the same manner as in Example 1. Upon completion of polymerization the product yield was 2.12 kg, as a white powder with a reduced viscosity of 0.52 as measured in dimethylformamide at 30° C in which the copolymer was dissolved at a concentration of 0.1 g/dl. The ring-opening polymerization copolymer was found to contain 11.9 mole% of 5,5-dicyano-bicyclo[2,2,1]-heptene-2. This product is hereinafter referred to as "polymer 12".

POLYMER (13)

After being fully dried and purged with nitrogen, the autoclave used in Example 1 was charged (followed by stirring for homogeneous mixing) with (i) 9.0l of 1,2-dichloroethane as a solvent (dehydrated by calcium hydride immediately before application), (ii) 2.03 kg (17 moles) of 5-cyano-bicyclo[2,2,1]-heptene-2 as a monomer purified in the same manner as in Example 1, and (iii) 0.49 kg (3 moles) of 3,6-methylene-1,2,3,6-tetrahydrocis-phthalic anhydride also as a monomer (purified by recrystallization immediately before application), with the molar ratio of the first to the second monomer chosen to be 85:15. Added to the charged mass was 100 ml of a 1,2-dichloroethane solution of tungsten hexachloride-acetaldehyde diethylacetal as a polymerization catalytic component. In the aforesaid solution the tungsten hexachloride was dissolved at a concentration of 0.2 mole/l and was 0.1 mole% based on the total amount of the monomers. The acetaldehyde diethylacetal was present as 3 moles per mole of the tungsten hexachloride. After addition, the mix was heated at 60° C. After stirring for homogeneous mixing, 120 ml of a toluene solution of diethyl aluminum chloride was added as a polymerization catalytic component. In the toluene solution, the diethyl aluminum chloride was initially dissolved at a concentration of 1 mole/l and represented 6 moles per mole of the tungsten hexachloride.

Ring-opening polymerization was carried out initially for 2 hours at the above-mentioned temperature of 60° C and later for 18 hours at room temperature. The reaction product was a brown, opaque, nonflowing, soft, swollen mass. After being processed, the solid mass was thoroughly washed with methanol. The washed, processed mass was dried for 24 hours at 50° C under vacuum. The powdered product was obtained in a yield of 2.27 kg.; the product exhibited a whitish, light yellow color. Infrared analysis indicated an absorption band at 2245 cm$^{-1}$ indicative of the nitrile group and an absorption band at 1700 to 1860 cm$^{-1}$ indicative of the acid anhydride group. Elemental analysis demonstrated that the product was a copolymer containing 13.4 mole% of 3,6-methylene-1,2,3,6-tetrahydro-cis-phthalic anhydride. This product is hereinafter referred to as "polymer 13".

POLYMER (14)

Ring-opening polymerization was performed in substantially the same manner as in the case of the polymer 13, except that the monomers consisted of 2.34 kg (19.6 moles) of 5-cyano-bicyclo[2,2,1]-heptene-2 and 0.065 kg (0.4 mole) of 3,6-methylene-1,2,3,6-tetrahydro-cis-phthalic anhydride, with the molar ratio of the first to the second monomer adjusted at 98:2. The proportion (amount) of 1,2-dichloroethane as a solvent was changed to 7.0l. The proportion of 1,2-dichloroethane solution of tungsten hexachloride-acetaldehyde diethylacetal as a polymerization catalytic component was changed to 60 ml. In the said dichloroethane solution, the tungsten hexachloride was dissolved at a concentration of 0.2 mole/l and represented 0.06 mole% based on the total amount of the monomers, and the proportion of acetaldehyde diethylacetal was 3 moles per mole of the tungsten hexachloride. The proportion of 1,2-dichloroethane solution of diethyl aluminum monochloride (1.0 mole/l) as a polymerization catalytic component was changed to 72 ml (6 moles per mole of the tungsten hexachloride). Ring-opening polymerization was carried out for 5 hours at 50° C and then for 18 hours at room temperature.

Upon completion of polymerization, the reaction product was a brown solid, nonflowing, soft, swollen mass. After being processed, the solid mass was thoroughly washed with methanol. The resulting product was dried 24 hours at 50° C under vacuum. The product yield was of 2.20 kg as a light yellow material and elemental analysis confirmed a copolymer containing 1.3 mole% of 3,6-methylene-1,2,3,6-tetrahydro-cis-phthalic anhydride. The copolymer had a reduced viscosity of 0.52, as measured in dimethylformamide at 30° C in which the copolymer was dissolved at a concentration of 0.1 g/dl. This product is hereinafter referred to as "polymer 14".

POLYMER (15)

After being fully dried and purged with nitrogen, the autoclave used in Example 1 was charged (followed by stirring for homogeneous mixing) with (i) 9.01 of 1,2-dichloroethane as a solvent (dehydrated by calcium hydride immediately before application), (ii) 2.38 kg (20 moles) of 5-cyano-bicyclo[2,2,1]-heptene-2 as a monomer (vacuum distilled immediately before application) and (iii) 6.8g of 5-phenyl-bicyclo[2,2,1]-heptene-2 (0.002 mole) also as a monomer. Added to the charged mass were (a) 60 ml of a 1,2-dichloroethane solution of tungsten hexachloride-acetaldehyde diethylacetal as a polymerization catalytic component (in said solution, the tungsten hexachloride was dissolved at a concentration of 0.2 mole/l and the acetaldehyde diethylacetal was present in a ratio of 3 moles per mole of the tungsten hexachloride), and (b) 72 ml of a toluene solution of diethyl aluminum chloride as a polymerization catalytic component (in said solution, the diethyl aluminum chloride was dissolved at a concentration of 1 mole/l and was present in a ratio of 6 moles per mole of the tungsten hexachloride. Ring-opening polymerization was carried out for 2 hours at 70° C. The reaction system became substantially solidified. Polymerization was continued two more hours. The product was purified in the same manner as in Example 1. Upon completion of polymerization the product yield was 2.25 kg. The product had a faintly yellow color. Nuclear magnetic resonance spectral analysis showed that the product was a copolymer containing 0.2 mole% of 5-phenyl-bicyclo[2,2,1]-heptene-2. The copolymer had a reduced viscosity of 0.97 as measured in dimethylformamide at 30° C in which the copolymer was dissolved at a concentration of 0.1 g/dl. This product is hereinafter referred to as "polymer 15".

POLYMER (16)

Ring-opening polymerization was carried out in substantially the same manner as polymer 15, except that the 5-phenyl-bicyclo[2,2,1]-heptene-2 monomer to prepare polymer 15 was replaced by 2-phenyl-1,4,5,8-dimethano-1,2,3,4,4a,5,8,8a-octahydronaphthalene. In this preparation, the copolymerization ratio and the proportions of the catalytic components based on the total amount of the monomers were the same as in the preparation of polymer 15. The product was purified upon completion of copolymerization in the same manner as in the case of polymer 15. The preparation yielded 2.17 kg of a faintly yellow product. Elemental analysis confirmed a copolymer containing 0.19 mole% of 2-phenyl-1,4,5,8-dimethano-1,2,3,4,4a,5,8,8a-octahydronaphthalene. The copolymer had a reduced viscosity of 0.79 as measured in dimethylformamide at 30° C in which the copolymer was dissolved at a concentration of 0.1 g/dl. This product is hereinafter referred to as "polymer 16".

POLYMER (17)

A fully dried and nitrogen-purged 20l stainless steel autoclave was charged (followed by stirring for homogeneous mixing) with (i) 7.0l of 1,2-dichloroethane (dehydrated by calcium hydride immediately before application), (ii) 2.03 kg (17 moles) of 5-cyano-bicyclo[2,2,1]-heptene-2 as a monomer (vacuum distilled immediately before application) and (iii) 0.43 kg (3 moles) of 1,4-dihydro-1,4-methanonaphthalene, also as a monomer and (iv) 17.3 ml (0.7 mole% based on the total amount of the monomers) of n-hexene-1 as a molecular weight-controlling agent. Added to the charged mass were (a) 60 ml of a 1,2-dichloroethane solution of tungsten hexachloride as a polymerization catalytic component (in said solution, the tungsten hexachloride was present as 6 millimoles per mole of the total amount of the monomers), (b) 60 ml of a 1,2-dichloroethane solution of 1,1-diethoxyethane (0.6 mole/l) as a third component and (c) 72 ml of a 1,2-dichloroethane solution of diethyl aluminum chloride (1.0 mole/l) (in said solutions, the 1,1-diethoxyethane was used at the rate of 3 moles per mole of the tungsten hexachloride, and the proportion of the diethyl aluminum chloride constituted 6 moles per mole of said tungsten hexachloride).

Ring-opening polymerization was carried out for 5 hours with stirring at a temperature of 50° C. The product was purified in the same manner as in Example 1. Upon completion of polymerization the product yield was 2.12 kg of faint yellow coloration. Elemental analysis confirmed a copolymer containing 12.6 mole% of 1,4-dihydro-1,4-methanonaphthalene. The copolymer had a reduced viscosity of 0.53 as measured in dimethylformamide at 30° C in which the copolymer was dissolved at a concentration of 0.1 g/dl. This product is hereinafter referred to as "polymer 17".

POLYMER (18)

Ring-opening polymerization was conducted in substantially the same manner as in the case of the polymer 17, except that the monomers consisted of 2.03 kg (17 moles) of 5-cyano-bicyclo[2,2,1]-heptene-2 as a monomer and 0.71 kg (3 moles) of 2,3-diethoxycarbonyl-bicyclo[2,2,1]-hepta-2,5-diene. The product was purified in the same manner as in Example 1. Upon completion of polymerization the product yield was 2.24 kg of a material of faintly yellow coloration. Elemental analysis confirmed a copolymer containing 14.4 mole% of 2,3-diethoxycarbonyl-bicyclo[2,2,1]-hepta-2,5-diene. The copolymer had a reduced viscosity of 0.5 as measured in dimethylformamide at 30° C in which the copolymer was dissolved at a concentration of 0.1 g/dl. This product is hereinafter referred to as "polymer 18".

POLYMER (19)

Ring-opening polymerization was effected in substantially the same manner as in the case of the polymer 17, except that the monomers consisted of 2.03 kg (17 moles) of 5-cyano-bicyclo[2,2,1]-heptene-2 and 0.51 kg (3 moles) of 5-(2-pyridyl)-bicyclo[2,2,1]-heptene-2. The product was purified in the same manner as in the case of Example 1. Upon completion of polymerization the yield of product was 2.01 kg. The product had a faintly yellow color. Elemental analysis determined the product to be a copolymer containing 10.5 mole% of 5-(2-pyridyl)-bicyclo[2,2,1]-heptene-2. The copolymer had a reduced viscosity of 0.49 as measured in dimethylformamide at 30° C in which the copolymer was dissolved at a concentration of 0.1 g/dl. This product is hereinafter referred to as "polymer 19".

POLYMER (20)

Ring-opening polymerization was undertaken in substantially the same manner as in the case of the polymer 15, except that the monomers consisted of 2.03 kg (17 moles) of 5-cyano-bicyclo[2,2,1]-heptene-2 and 0.43 kg (3 moles) of 5-chloromethyl-bicyclo[2,2,1]-heptene-2. Polymerization was carried out for 3 hours at 50° C. The product was purified in the same manner as in Example 1. Upon completion of polymerization the product yielded 2.36 kg of a faintly yellow material, which, upon element analysis, was found to be a copolymer containing 16 mole% of 5-chloromethyl-bicyclo[2,2,1]-heptene-2. The copolymer had a reduced viscosity of 0.54 as measured in dimethylformamide at 30° C in which the copolymer was dissolved at a concentration of 0.1 g/dl. This product is hereinafter referred to as "polymer 20".

POLYMER (21)

Ring-opening polymerization was carried out in substantially the same manner as in Example 1, except that the monomer consisted of 2.45 kg (20 moles) of 5-methoxy-bicyclo [2,2,1]-heptene-2 and said polymerization was carried out for 5 hours at 50° C. The product was purified in the same manner as in Example 1. Upon completion of polymerization the product yielded 2.03 kg of a faintly yellow material having a reduced viscosity of 0.64 as measured in toluene at 30° C in which the product was dissolved at a concentration of 0.1 g/dl. This product is hereinafter referred to as "polymer 21".

POLYMER (22)

Ring-opening polymerization was conducted in substantially the same manner as in the case of polymer 17, except that the monomer consisted of 4.38 kg of N-butyl-3,6-methylene-1,2,3,6-tetrahydro-cis-phthalimide. The proportion (amount) of 1,2-dichloroethane as a solvent was changed to 9.0l. The proportion of 1,2-dichloroethane solution of tungsten hexachloride (0.2 mole/l) as a polymerization catalytic component was changed to 100 ml (in said solution, the tungsten hexachloride was dissolved at the rate of 10 millimoles per mole of the monomer). The proportion of 1,2-dichloroethane solution of 1,1-diethoxyethane (0.6 mole/l) as a third component was changed to 100 ml (3 moles per mole of the tungsten hexachloride). The proportion of 1,2-dichloroethane solution of diethyl aluminum monochloride (1.0 mole/l) as a polymerization catalytic component was changed to 120 ml (6 moles per mole of the tungsten hexachloride). Polymerization was carried out for 5 hours at 60° C. The product was purified in the same manner as in Example 1 and yielded 3.68 kg of a faintly yellow material having a reduced viscosity of 0.67, as measured in dimethylformamide at 30° C in which the product was dissolved at a concentration of 0.1 g/dl. This product is hereinafter referred to as "polymer 22".

POLYMER (23)

Ring-opening polymerization was performed in substantially the same manner as in the case of the polymer 13, except that the monomers consisted of 2.34 kg (19.6 moles) of 5-cyano-bicyclo[2,2,1]-heptene-2 and 50.6g (0.2 mole) of N-methyl-4-(5-bicyclo[2,2,1]-hepta-2-enyl)-phthalimide and 24.8 ml (1 mole% based on the monomer) of n-hexene-1 was employed as a molecular weight controlling agent. Added to the charged mass were (a) 100 ml (0.1 mole% based on the monomer) of a 1,2-dichloroethane solution of tungsten hexachloride (0.2 mole/l) as a polymerization catalytic component, (b) 100 ml (3 moles per mole of the tungsten hexachloride) of a 1,2-dichloroethane solution of 1,1-diethoxyethane (0.6 mole/l) as a third component and (c) 120 ml (6 moles per mole of the tungsten hexachloride) of a 1,2-dichloroethane solution of diethyl aluminum chloride (1.0 mole/l) as a catalytic component. Polymerization was carried out for 5 hours at 60° C.

Aftertreatment was carried out in the same manner as in Example 1. The ring-opening polymerization product yielded 2.09 kg of a white powdery material (containing 1.2 mole% of N-methyl-4-(5-bicyclo[2,2,1]-hepta-2-enyl) phthalimide having a reduced viscosity of 0.53 as measured in dimethylformamide at 30° C in which said product was dissolved at a concentration of 0.1 g/dl. This polymer is hereinafter referred to as "polymer 23".

POLYMER (24)

After being dried and purged with nitrogen, the autoclave used in Example 1 was charged (followed by stirring for homogeneous mixing) with 6.0l of 1,2-dichloroethane as a solvent (dehydrated by calcium hydride immediately before application) and 1.91 kg (20 moles-monomer concentration of 25 wt/vol%) of 5,6-dichloromethyl-bicyclo[2,2,1]-heptene-2 as a monomer (vacuum distilled immediately before application). Added to the charged mass were (a) 100 ml (2.0 millimoles based on 1 mole of the monomer) of a toluene solution of tungsten hexachloride (0.2 mole/l) as a polymerization catalytic component, (b) 2.4g (4.0 millimoles based on 1 mole of the monomer) of isopropyl alcohol as a third component and (c) 60.0 ml (6.0 millimoles based on 1 mole of the monomer) of a toluene solution of ethyl aluminum dichloride (1.0 mole%/l) as a catalytic component. Polymerization was carried out for 10 hours at room temperature. Aftertreatment was carried out in the same manner as in Example 1. The ring-opening polymerization product was obtained in a yield of 1.75 kg of a white powdery material, indicating a conversion of 87%. The product had a reduced viscosity of 0.77 as measured in dimethylformamide at 30° C in which said product was dissolved at a concentration of 0.1 g/dl. This polymer is herein after referred to as "polymer 24".

POLYMER (25)

Ring-opening polymerization was effected in substantially the same manner as in the case of the polymer 24, except that the monomer consisted of 1.29 kg of 5-chlorobicyclo[2,2,1]-heptene-2. The product was purified in the same manner as in Example 1. Upon completion of polymerization the product yielded 1.07 kg of a white powdery form having a reduced viscosity of 0.74, as measured in dimethylformamide at 30° C in which the product was dissolved at a concentration of 0.1 g/dl. This product is hereinafter referred to as "polymer 25".

| Polymer No. | Kind |
|---|---|
| (2) | Ring-opening polymer of 5-methyl-5-methoxycarbonyl-bicyclo [2.2.1]-heptene-2 ([η]: 0.76) |
| (3) | Ring-opening polymer of 5-cyano-5-methyl-bicyclo [2.2.1]-heptene-2 ([η]: 0.55) |
| (4) | Ring-opening polymer of 5-cyanomethyl-bicyclo [2.2.1]-heptene-2 ([η]: 0.69) |
| (5) | Ring-opening polymer of 5,5-dicyano-bicyclo [2.2.1]-heptene-2 ([η]: 0.54) |
| (6) | Ring-opening polymer of 5-methoxycarbonyl-bicyclo [2.2.1]-heptene-2 ([η]: 0.48) |
| (7) | Ring-opening polymer of 5-acetoxymethyl-bicyclo [2.2.1]-heptene-2 ([η]: 0.51) |
| (8) | Ring-opening polymer of 5-acetoxy-bicyclo [2.2.1]-heptene-2 ([η]: 0.51) |
| (9) | Ring-opening polymer of |

| Polymer No. | Kind |
|---|---|
| | 5,6-dimethoxycarbonyl-bicyclo [2.2.1]-heptene-2 ([η]: 0.52) |
| (10) | Ring-opening copolymer of 5-cyano-bicyclo [2.2.1]-heptene-2 (71.3 mole%) and 5-methyl-5-methoxycarbonyl-bicyclo [2.2.1]-heptene-2 (28.7 mole%) ([η]: 0.75) |
| (11) | Ring-opening copolymer of 5-cyano-bicyclo [2.2.1]-heptene-2 (97.8 mole%) and cyclopentene (2.2 mole%) ([η]: 0.52) |
| (12) | Ring-opening copolymer of 5-cyano-bicyclo [2.2.1]-heptene-2 (88.1 mole%) and 5,5-dicyano-bicyclo [2.2.1]-heptene-2 (11.9 mole%) ([η]: 0.52) |
| (13) | Ring-opening copolymer of 5-cyano-bicyclo [2.2.1]-heptene-2 (86.6 mole%) and 3,6-methylene-1,2,3,6-tetrahydro-cis-phthalic-anhydride (13.4 mole%) ([η]: 0.52) |
| (14) | Ring-opening copolymer of 5-cyano-bicyclo [2.2.1]-heptene-2 (98.7 mole%) and 3,6-methylene-1,2,3,6-tetrahydro-cis-phthalic-anhydride (1.3 mole%) ([η]: 0.52) |
| (15) | Ring-opening copolymer of 5-cyano-bicyclo [2.2.1]-heptene-2 (99.8 mole%) and 5-phenyl-bicyclo [2.2.1]-heptene-2 (0.2 mole%), ([η]: 0.97) |
| (16) | Ring-opening copolymer of 5-cyano-bicyclo [2.2.1]-heptene-2 (99.81 mole%) and 2-phenyl-1,4,5,8-dimethano-1,2,3,4,4a,-5,8,8a-octahydronaphthalene (0.19 mole%) ([η]: 0.79) |
| (17) | Ring-opening copolymer of 5-cyano-bicyclo [2.2.1]-heptene-2 (87.4 mole%) and 1,4-dihydro-1,4-methanonaphthalene (12.6 mole%) ([η]: 0.53) |
| (18) | Ring-opening copolymer of 5-cyano-bicyclo [2.2.1]-heptene-2 (85.6 mole%) and 2,3-diethoxycarbonyl-bicyclo [2.2.1]-hepta-2,5-diene (14.4 mole%) ([η]: 0.50) |
| (19) | Ring-opening copolymer of 5-cyano-bicyclo [2.2.1]-heptene-2 (89.5 mole%) and 5-(2-pyridyl)-bicyclo [2.2.1]-heptene-2 (10.5 mole%) ([η]: 0.49) |
| (20) | Ring-opening copolymer of 5-cyano-bicyclo [2.2.1]-heptene-2 (84 mole%) and 5-chloromethyl-bicyclo [2.2.1]-heptene-2 (16.0 mole%) ([η]: 0.54) |
| (21) | Ring-opening polymer of 5-methoxy-bicyclo [2.2.1]-heptene-2 ([η]: 0.64) |
| (22) | Ring-opening polymer of N-butyl-3,6-methylene-1,2,3,6-tetrahydro-cis-phthalimide ([η]: 0.67) |
| (23) | Ring-opening copolymer of 5-cyano-bicyclo [2.2.1]-heptene-2 (98.8 mole%) and N-methyl-4-(5-bicyclo [2.2.1]-hepta-2-enyl) phthalimide (1.2 mole%) ([η]: 0.53) |
| (24) | Ring-opening polymer of 5,6-dichloromethyl-bicyclo [2.2.1]-heptene-2 ([η]: 0.77)*1 |
| (25) | Ring-opening polymer of 5-chloro-bicyclo [2.2.1]-heptene-2 ([η]: 0.74)*1 |
| (26) | Alkali-hydrolyzed product of polymer (14)*2 |

In Table 4 the units and symbols are as set forth in Example 1 and Table 1.

*1The catalyst system used in the polymerization of polymer (24) and (25) is tungsten hexachloride, ethyl aluminum dichloride and isopropyl alcohol, used in amounts, respectively of 2.0 millimole, 6.0 millimole and 4.0 millimole, based on 1 mole of the monomer.

*2Polymer (26) was prepared by the following procedure. 600g of polymer (14) was pulverized and placed in a 10 liter vessel, then 6.0l of pure water and 10.0g of sodium hydroxide was added, followed by stirring for 4 hours at room temperature. When the reaction was completed, the reaction system was not a uniform suspension. 2 liters of methyl alcohol were charged to this reaction system. It was educed as a sodium hydroxide-treated product. After the product was filtered and washed well with methyl alcohol, the product was dried under reduced pressure at 50°C for 20 hours. Consequently, there was obtained 577g of a slightly yellow powdery polymer.

TABLE 4

| No. of sample | Ring-opening polymer | Flame retardant Kind | Flame retardant Amount | Burning test ASTM | Burning test UL | Impact strength (kg.cm/cm. notched) | Tensile strength (kg/cm²) | Gel content (%) |
|---|---|---|---|---|---|---|---|---|
| 72* | (2) | — | — | SB | 94HB | 9.1 | 395 | 0 |
| 73 | " | (A) | 30 | N (0) | 94V-0 | 8.5 | — | 0 |
| 74 | " | (A) | 15 | " (1) | 94V-1 | 8.8 | 392 | 0 |
| 75 | " | (C) | " | " (2) | " | 8.5 | 386 | 0 |
| 76 | " | (G) | 10 | " (1) | " | 8.4 | 398 | 0 |
| 77 | " | (J) | " | " (1) | " | 8.7 | 401 | 0 |
| 78* | " | (M) | 15 | " (1) | " | 3.2 | — | 9.5 |
| 79* | (3) | — | — | SB | 94HB | 14.4 | 560 | 0 |
| 80 | " | (A) | 15 | N (1) | 94V-1 | 14.6 | 548 | 0 |
| 81 | " | (C) | 15 | " (2) | " | 15.0 | — | 0 |
| 82 | " | (G) | 10 | " (1) | " | 13.2 | 562 | 0 |
| 83 | " | (J) | " | " (1) | " | 12.7 | 564 | 0 |
| 84* | " | (M) | 15 | " (2) | " | 3.8 | — | 10.7 |
| 85* | (4) | — | — | SB | 94HB | 9.0 | 465 | 0 |
| 86 | " | (A) | 15 | N (1) | 94V-1 | 8.7 | 463 | 0 |
| 87 | " | (C) | " | " (8) | " | 9.0 | — | 0 |
| 88 | " | (G) | 10 | " (2) | " | 8.5 | 468 | 0 |
| 89 | " | (J) | 10 | " (1) | " | 8.9 | 475 | 0 |
| 90* | " | (M) | " | " (3) | " | — | — | 10.1 |
| 91* | (5) | — | — | SB | 94HB | 8.2 | 490 | 0 |
| 92 | " | (A) | 15 | N (0) | 94V-1 | 8.3 | 491 | 0 |
| 93 | " | (G) | 10 | " (2) | " | 7.6 | 494 | 0 |
| 94* | (6) | — | — | SB | 94HB | 9.4 | 375 | 0 |
| 95 | " | (C) | 15 | N (8) | 94V-1 | 9.1 | — | 0 |
| 96 | " | (J) | 10 | " (1) | " | 9.6 | 371 | 0 |
| 97* | (7) | — | — | SB | 94HB | 8.6 | 390 | 0 |
| 98 | " | (A) | 15 | N (1) | 94V-1 | 8.5 | 378 | 0 |
| 99 | (7) | (J) | 10 | N (2) | 94V-1 | 8.2 | 391 | 0 |
| 100* | " | (N) | 15 | " (2) | " | 1.9 | — | 1.1 |
| 101* | (8) | — | — | SB | 94HB | 9.0 | 400 | 0 |
| 102 | " | (D) | 15 | N (2) | 94V-1 | 8.7 | — | 0 |
| 103 | " | (G) | 10 | " (1) | " | 8.2 | 407 | 0 |
| 104 | " | (J) | " | " (1) | " | 8.6 | 401 | 0 |
| 105* | " | (O) | 15 | " (2) | " | — | — | 56.9 |
| 106* | (9) | — | — | SB | 94HB | 8.5 | 520 | 0 |
| 107 | " | (A) | 15 | N (1) | 94V-1 | 8.6 | 512 | 0 |
| 108 | " | (D) | " | " (3) | " | 8.7 | — | 0 |
| 109 | " | (G) | 10 | " (2) | " | 8.1 | 526 | 0 |
| 110* | " | (P) | 15 | " (6) | " | — | — | 55.1 |
| 111* | (10) | — | — | SB | 94HB | 9.6 | 440 | 0 |
| 112 | " | (A) | 15 | N (2) | 94V-1 | 10.1 | 431 | 0 |
| 113 | " | (G) | 10 | " (2) | " | 9.1 | 447 | 0 |
| 114 | " | (L) | " | " (3) | " | 9.0 | 438 | 0 |

TABLE 4-continued

| No. of sample | Ring-opening polymer | Flame retardant Kind | Flame retardant Amount | Burning test ASTM | Burning test UL | Impact strength (kg.cm/cm. notched) | Tensile strength (kg/cm²) | Gel content (%) |
|---|---|---|---|---|---|---|---|---|
| 115* | " | (M) | " | " (8) | " | 4.7 | — | 9.4 |
| 116* | (11) | — | — | SB | 94HB | 10.5 | 458 | 0 |
| 117 | " | (A) | 15 | N (1) | 94D-1 | " | 448 | 0 |
| 118 | " | (D) | 15 | " (2) | " | 10.1 | 451 | 0 |
| 119 | " | (G) | 10 | " (1) | " | 10.2 | 457 | 0 |
| 120 | " | (L) | " | " (3) | " | 9.8 | 460 | 0 |
| 121* | " | (M) | " | " (4) | — | 3.5 | — | 8.8 |
| 122* | (12) | — | — | SB | 94HB | 9.2 | 475 | 0 |
| 123 | " | (E) | 15 | N (3) | 94V-1 | 9.0 | 460 | 0 |
| 124 | " | (G) | 10 | N (1) | " | 8.3 | 471 | 0 |
| 125* | (13) | — | — | SB | 94HB | 7.6 | 540 | 0 |
| 126 | " | (A) | 15 | N (2) | 94V-1 | 7.5 | 529 | 0 |
| 127 | (13) | (G) | 10 | N (4) | 94V-1 | 7.2 | 548 | 0 |
| 128* | (14) | — | — | SB | 94HB | 9.3 | 498 | 0 |
| 129 | " | (B) | 15 | N (1) | 94V-1 | 8.7 | 484 | 0 |
| 130 | " | (K) | 10 | " (3) | — | 9.0 | 492 | 0 |
| 131* | " | (M) | 15 | " (2) | " | — | — | 10.5 |
| 132* | (15) | — | — | SB | 94HB | 20.2 | 475 | 0 |
| 133 | " | (A) | 15 | N (1) | 94V-1 | 19.1 | 455 | 0 |
| 134 | " | (K) | 10 | N (3) | — | 17.1 | 476 | 0 |
| 135* | " | (M) | 15 | " (1) | 94V-1 | — | — | 10.4 |
| 136* | (16) | — | — | SB | 94HB | 15.5 | 477 | 0 |
| 137 | " | (C) | 15 | N (1) | 94V-1 | 15.0 | 470 | 0 |
| 138 | " | (J) | 10 | N (1) | " | 13.6 | 473 | 0 |
| 139* | (17) | — | — | SB | 94HB | 7.9 | 573 | 0 |
| 140 | " | (A) | 15 | N (1) | 94V-1 | 7.2 | 548 | 0 |
| 141 | " | (G) | — | " (1) | " | 7.5 | 580 | 0 |
| 142* | (18) | — | — | SB | 94HB | 8.9 | 550 | 0 |
| 143 | " | (A) | 15 | N (1) | 94V-1 | 8.8 | 542 | 0 |
| 144 | " | (G) | 10 | N (1) | " | 8.7 | 546 | 0 |
| 145* | (19) | — | — | SB | 94HB | 9.4 | 436 | 0 |
| 146 | " | (A) | 15 | N (1) | 94V-1 | 9.0 | 420 | 0 |
| 147 | " | (J) | 10 | " (2) | " | 8.8 | 439 | 0 |
| 148* | " | (M) | 15 | " (2) | " | — | — | 9.9 |
| 149* | (20) | — | — | SB | 94 HB | 15.9 | 445 | 0 |
| 150 | " | (A) | 15 | N (0) | 94V-0 | 15.8 | 430 | 0 |
| 151 | " | (J) | 10 | " (0) | " | 14.7 | 448 | 0 |
| 152* | " | (M) | 15 | " (0) | " | — | — | 11.3 |
| 153* | (21) | — | — | SB | 94HB | 20.3 | 357 | 0 |
| 154 | " | (A) | 15 | N (1) | 94V-1 | 20.2 | 341 | 0 |
| 155 | " | (G) | 10 | " (1) | " | 17.8 | 361 | 0 |
| 156* | (22) | — | — | SB | 94HB | 10.4 | 542 | 0 |
| 157 | " | (A) | 15 | N (1) | 94V-1 | 10.9 | 528 | 0 |
| 158 | " | (G) | 10 | " (2) | 94V-1 | 9.5 | 547 | 0 |
| 159* | (23) | — | — | SB | 94HB | 9.6 | 485 | 0 |
| 160 | " | (A) | 15 | N (1) | 94V-1 | 9.5 | 473 | 0 |
| 161 | " | (F) | " | " (1) | " | 9.0 | 465 | 0 |
| 162 | " | (J) | 10 | " (1) | " | 9.0 | 478 | 0 |
| 163* | (24) | — | — | " (1) | 94V-0 | 10.1 | 478 | 0 |
| 164 | " | (A) | 15 | " (0) | 94V-0 | 9.9 | 451 | 0 |
| 165 | " | (G) | 10 | " (0) | " | 9.5 | 470 | 0 |
| 166* | (24) | (M) | 15 | " (0) | " | — | — | 14.9 |
| 167* | (25) | — | — | " (3) | 94HB | 7.0 | 367 | 0 |
| 168 | " | (A) | 15 | " (0) | 94V-0 | 7.3 | 362 | 0 |
| 169 | " | (G) | 10 | " (0) | " | 6.9 | 360 | 0 |
| 170* | " | (M) | 15 | " (0) | " | — | — | 16.3 |
| 171* | (26) | — | — | SB | 94HB | 9.4 | 497 | 0 |
| 172 | " | (A) | 15 | N (1) | 94V-1 | 9.6 | 478 | 0 |
| 173 | " | (G) | 10 | " (1) | " | 9.0 | 487 | 0 |

The above test results demonstrate the broad effective scope of the ring-opening polymerization products employed in combination with the flame retardants of the invention to form the thermally stable, flame resistant compositions of the invention having excellent mechanical properties. When shaped articles are formed from the samples set forth in Table 4, such articles exhibit excellent appearance, satisfactory mechanical strength and thermal stability and enhanced heat and flame resistant properties.

When other ring-opening polymers, such as the homo-and copolymers formed from the below norbornene derivatives are substituted for the ring-opening polymers employed in the Table 4, similar results are expected.

Ester type 5-butoxycarbonyl-bicyclo[2,2,1]-heptene-2, 5-allyloxycarbonyl-bicyclo[2,2,1]-heptene-2, 5-methyl-5-methoxycarbonyl-bicyclo [2,2,1]-heptene-2, 5-hexyloxycarbonyl-6-methyl-bicyclo[2,2,1]-heptene-2, 5-heptyl-6-octyloxycarbonyl-bicyclo[2,2,1]-heptene-2, 5-methoxycarbonyl-6-methoxycarbonylmethyl-bicyclo[2,2,1]-heptene-2, 5,5-dibutoxycarbonyl-bicyclo[2,2,1]-heptene-2, 5-methyl-6-dimethoxycarbonyl-bicyclo[2,2,1]-heptene-2, 5-ω-methoxycarbonyl-2-decenyl-6-pentyl-bicyclo[2,2,1]-heptene-2, 5-acetoxy-bicyclo [2,2,1]-heptene-2, 5-propionoxymethyl-bicyclo[2,2,1]-heptene-2, and 5-stearoxymethyl-bicyclo[2,2,1]-heptene-2.

Ether type 5-methoxy-bicyclo[2,2,1]-heptene-2, 5-isopropoxy-bicyclo[2,2,1]-heptene-2, 5-cyclohexoxy-bicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2.

Cyclic Imide type

N-substituted-3,6-methylene-1-methyl-1,2,3,6-tetrahydro-cis-phthalimide compounds, bicyclo[2,2,1]- hepta-2-ene-5-spiro-3'-CN-substituted succinimide compounds, 2-substituted-2-aza-1,3-dioxo-5,8-methano-1,2,4,4a,5,8,8a-octahydronaphthalene compounds, N-substituted-5,8-methano-1,2,3,4,4a,5,8,8a-octahydronaphthalene-2,3-dicarboxyimide compounds, 2-substituted-2-aza-1,3-dioxo-5,8-methano-1,2,3,4,4a,5,8,-9a,9,9a,10,10a-dodecahydroanthracene compounds, 1,4,5,8-dimethano-2-methyl-1,2,3,4,a,5,8,8a-octahydronaphthalene-2,3-dicarboxyimide compounds, N-ethyl-3,6-methylene-1,2,3,6-tetrahydro-cis-phthalimide, N-amyl-3,6-methylene-1,2,3,6-tetrahydro-cis-phthalimide, N-cyclohexyl-3,6-methylene-1,2,3,6-tetrahydro-cis-phthalimide, N-(4-ethylphenyl)-3,6-methylene-1,2,3,6-tetrahydro-cis-phthalimide and N-methoxycarbonyl-3,6-methylene-1,2,3,6-tetrahydro-cis-phthalimide, N-[ω-(5-bicyclo[2,2,1]-hepta-2-enyl) alkyl substituted]-maleimide compounds, N-]ω-(5-bicyclo[2,2,1]-hepta-2-enyl) alkyl substituted]-citraconimide compounds, N-[ω-(5-bicyclo[2,2,1]-hepta-2-enyl) alkyl substituted]-glutaconimide compounds, N-[ω-(5bicyclo[2,2,1]-hepta-2-enyl) alkyl substituted]-succinimide compounds, N-[ω-5-bicyclo[2,2,1]-hepta-2-enyl) alkyl substituted]-phthalimide compounds, N-[ω-(5-bicyclo[2,2,1]-hepta2-enyl) alkyl substituted]-naphthalene-1,8-dicarboxyimide, N-(5-bicyclo[2,2,1]-hepta-2-enyl)-methylmaleimide, N-[12(5-bicyclo[2,2,1]-hepta-2-enyl) dodecyl]maleimide, N-[4-(6-methyl-5-bicyclo[2,2,1]-hepta-2-enyl)butyl]maleimide, N-[16-(6-methyl-5-bicyclo2,2,1]-hepta-2-enyl)hexadecyl]maleimide, N-[18-(6-ethyl-5-bicyclo[2,2,1]-hepta-2-enyl) octadecyl] maleimide, N-[3-(6-dodecyl-5-dicyclo[2,2,1]-hepta-2-enyl propyl] maleimide.

Halogen type 5,5,6,6-tetrachloro-bicyclo[2,2,1]-heptene-2, 5-chloro-5-methyl-bicyclo[2,2,1]-heptene-2, 5-(α-chloroethyl)-bicyclo[2,2,1]-heptene-2, 5-(γ-chloropropyl)-bicyclo[2,2,1]-heptene-2, 5-(β-chloroethyl)-6-methyl-bicyclo[2,2,1]-heptene-2, and 5-chloromethyl-6-ethyl-bicyclo[2,2,1]-heptene-2.

Similar results are also expected when a copolymer formed from the above described norbornene derivatives and up to about 50 mole% of an unsaturated cyclic compound are employed as the ring-opening polymerization product. When the following unsaturated cyclic compounds including the acid anhydride type, aromatic type, amide type and aromatic nitrogen containing heterocyclic type norbornene derivatives or aromatic norbornadiene, ester type norbornadiene derivatives and cycloolefinic compounds are copolymerized with the above-described norbornene derivatives to form the copolymers of the invention and such copolymers are substituted for the ring-opening polymers of Table 4, similar results are expected:

Acid Anhydride Type 6-(5-carboxy-bicyclo[2,2,1]-hepta-2-enyl)acetic anhydride, 3,6-methano-1-methyl-1,2,3,6-tetrahydro-cis-phthalic anhydride, 2-oxa-1,4-dioxo-5-8-methano-1,2,3,4,4a5,8,8a-octahydronaphthalene, 4,7-methano-1-methyl-1,2,3,3a,4,7,7a,8-naphthalene-1,2-dicarboxylic anhydride, and 4-(5-bicyclo[2,2,1]-hepta-2-enyl) phthalic anhydride.

Aromatic Type 5-phenyl-bicyclo[2,2,1]-heptene-2, 5-decenyl-5-phenyl-bicyclo [2,2,1]-heptene-2, 5-cyclohexyl-5-phenyl-bicyclo[2,2,1]-heptene-2, 5-α-naphthyl-bicyclo[2,2,1]-heptene-2, 2-phenyl-1,4:5,8-dimethano-1,2,3,4,4a,5,8,8a-octahydronaphthalene, 2-methyl-2-phenyl-1,4:5,8-dimethano-1,2,3,4,4a,5,8,8a-octahydronaphthalene, Aromatic Nitrogen-Containing Heterocyclic Type 5-(3-pyridyl)-bicyclo[2,2,1]-heptene-2, 5-(4-cyclohexy-2-pyridyl)-bicyclo[2,2,1]-heptene-2, 5(3-phenyl-4-pyridyl)-bicyclo [2,2,1]-heptene-2, 5-(3-hexyl-2-pyridyl)-bicyclo[2,2,1]-heptene-2, 5-(4-quinolyl)-bicyclo[2,2,1]-heptene-2, and 5-(9-carbazolyl)-bicyclo[2,2,1]-heptene-2.

Amide Type

N,N-dimethyl-bicyclo[2,2,1]-heptene-2-carbonamide-5, N-methyl-N-octyl-bicyclo [2,2,1]-heptene-2-carbonamide-5, N,N-di(methylcyclohexyl)-bicyclo[2,2,1]-heptene-2-carbonamide-5, N,N-dibenzyl-bicyclo [2,2,1]-heptene-2-carbonamide-5, N,N-dimethyl-5,6-methyl-bicyclo[2,2,1]-heptene-2-carbonamide-5, N,N,N',N'-tetramethylbicyclo[2,2,1]-heptene-2 carbonamide.

Aromatic Norbornadiene 1,4-dihydro-1,4-methanonaphthalene, 1,4-dihydro-1,4-methano-6-methoxynaphthalene, 6-chloro-1,4-dihydro-1,4-methanonaphthalene, 5,8-diacetoxy-1,4-dihydro-1,4-methanonaphthalene, and 1,4-dihydro-9,10-diphenyl-1,4-methanoanthracene.

Ester Derivative Norbornadiene 2-methoxycarbonyl-bicyclo[2,2,1]-hepta-2-2,5-diene, 2-decyloxycarbonyl-bicyclo[2,2,1]-hepta-2,5-diene, 2-methoxycarbonyl-3-cyclohexyl-bicyclo[2,2,1]-hepta-2,5-diene, 2-methoxycarbonyl-3-phenyl-bicyclo[2,2,1]-hepta-2,5-diene, 2-caproyloxy-3-methyl-bicyclo[2,2,1]-hepta-2,5-diene, 2-acetoxymethyl-3-cyclohexyl-bicyclo[2,2,1]-hepta-2,5-diene, and 2-valeryloxymethyl-decyl-bicyclo[2,2,1]-hepta-2,5-diene.

Cycloolefinic 1,5-cyclooctadiene, dicyclopentadiene, 1,5,9-cyclododecatriene, 1-chloro-1,5-cyclooctadiene, norbornadiene, cyclobutene, cyclopentene, cycloheptene, cyclooctene, cyclododecene, bicyclo[2,2,1]-heptene-2 (norbornene), 5-methyl-bicyclo[2,2,1]-heptene-2, 5,5 or 5,6-dimethyl-bicyclo[2,2,1]-heptene-2, 1,4:5,8-dimethano-1,2,3,4,4a,5,8,8a-octahydronaphthalene, 2-methyl-1,4:5,8-dimethano-1,2,3,4,4a,5,8,8a-octahydronaphthalene, isoprophenyl-bicyclo[2,2,1]-heptene, 2, 2-n-propyl-1,4:5,8-dimethano-1,2,3,4,4a, 5,8,8a-octahydronaphthalene.

When other flame retardants of the present invention are substituted for the flame retardants employed in the compositions of Table 4, similar results are expected. In particular, when the following flame retardants are combined with the above listed norbornene derivative polymers and copolymers, flame resistant compositions exhibiting similar properties to those exemplified in Table 4 are expected:

Compounds of flame retardant formula (1) of the following empirical formula: $C_{10}Cl_{11}Br$; $C_{10}Cl_{10}Br_2$; $C_{10}Cl_{10}Br_2$; $C_{10}$, $Cl_{10}O$; $C_9Cl_{10}O_2S$.

Compounds of flame retardant formula (2): 1,4,7,10-dimethanocycloocta-1,2,3,4,7,8,9,10,13,13,14,14,-dodecachloro 1,4,4a,5,6,6a,7,10,10a,11,12,12a-dodecahydro[1,2,5,6]-dibenzene, 1,2,3,4,6,7,8,13,13,14,14-dodecacholoro-1,4;5;10;6,9-trimethano-11H-benzo [b] fluorene, 1,2,3,4,5,6,7,8,10,10,11,11-dodecachloro-1,4;5,8-dimethanofluorene and 1,2,3,4,5,6,7,8,12,12,13,13-dodecachloro-1,4;5,8;9,10-trimethano-anthracene.

Compounds of flame retardant formula (3): 1,2 adducts of (a) 1,7-octadiene 1,15-hexadecadiene, 1,19-eicosadiene and (b) hexachlorohexabromocyclopentadiene, bromopentachlorocyclopentadiene and tetrabromodichlorocyclopentadiene.

Compounds of flame retardant formula (4), (5) and (6); 2,4,6-tribromo-m-cresol, 3,4,5,6-tetrabromo-o-cresol, hexabromobenzene, pentabromophenol, decabromophenyl ether and hexabromodiphenyl ether.

EXAMPLE 5

In order to illustrate the properties of the flame retardant compositions of the invention when the ring-opening polymerization product is blended with a resinous material and/or rubber, the following tests were conducted. The tests illustrate the flame resistance and impact strength of samples prepared in preparations (1)–(5) set forth below.

1. The ring-opening polymerization product of 5-cyanobicyclo [2,2,1]-heptene-2 (hereinafter referred to as PN-C) was prepared and purified by the procedure set forth in Example 1. PVC having a polymerization degree of 800 (manufactured by Kureha Chemical Industry Co., Ltd. under the trade name "Kureha PVC S9008") and PN-C in amounts listed in Table 5-1, 0.5 part by weight of stearic acid, 0.5 part by weight of 2,6-di-tert-butyl-p-cresol as a stabilizer, 2.0 parts by weight of dibutyl tin maleate as a stabilizer and a flame retardant listed in Table 5-1 were all kneaded on a hot roll in the same manner as in Example 1. Samples from these polymers were tested and the results are reported in Tables 5-1.

2. Kneading was carried out on a hot roll in the same manner as described above except that methyl-methacrylatebutadiene-styrene terpolymer (manufactured by Kanegatuchi Chemical Industry Co., Ltd. under the trade name "Kaneace B12", hereinafter referred to as MBS) was employed in place of PVC. The test results with this sample are set forth in Table 5-2.

3. Kneading was carried out on a hot roll in the same manner as described above, except that styrene-butadiene rubber having a Mooney viscosity of 50 (manufactured by Japan Synthetic Rubber Co., Ltd. under the trade name "JSR-1502", hereinafter referred to as SBR) was employed in place of PVC. Test results are set forth in Table 5-3.

4. Kneading was carried out on a hot roll in the same manner as described above, except that chlorinated polyethylene rubber having a Mooney viscosity of 76 (manufactured by Showa Denko Co., Ltd. under a trade name "Elaslen 401A", Cl content is about 40% by weight, hereinafter referred to as CPE) was employed in place of PVC. Test results for the sample are set forth in Table 5-4.

5. Kneading was carried out on a hot roll in the same manner as described above, except that the aforesaid chlorinated polyethylene and PVC were added. Test results for the sample are set forth in Table 5-5.

Compressed plates were prepared from said kneaded samples in the same manner as in Example 1. All these plates were tested for the flame resistance (UL Standard), gel content and Izod impact strength. Samples designed with an asterisk are controls.

TABLE 5-1

| No. | Amount (part by weight) PN-C | PVC | $Sb_2O_3$ | Flame retardant Kind | Amount | Burning test (UL) | Impact strength |
|---|---|---|---|---|---|---|---|
| 174* | 100 | 0 | 0 | — | — | 94HB | 9.2 |
| 175* | 90 | 10 | 0 | — | — | 94HB | 8.7 |
| 176* | 75 | 25 | 0 | — | — | 94HB | 8.1 |
| 177* | 75 | 25 | 5 | — | — | 94HB | 8.2 |
| 178 | 90 | 10 | 5 | (A) | 10 | 94V-1 | 9.2 |
| 179 | 75 | 25 | 5 | (A) | 10 | 94V-0. | 8.7 |
| 180 | 75 | 25 | — | (A) | 20 | 94V-0 | 8.6 |
| 181 | 75 | 25 | 5 | (C) | 10 | 94V-0 | 8.4 |
| 182 | 75 | 25 | 5 | (D) | 10 | 94V-0 | 8.4 |
| 183 | 90 | 10 | 5 | (G) | 10 | 94V-0 | 8.4 |
| 184 | 50 | 50 | 5 | (G) | 10 | 94V-0 | 6.6 |
| 185* | 75 | 25 | 5 | (M) | 10 | 94V-0 | 2.9 |

TABLE 5-2

| No. | Amount (part by weight) PN-C | MBS | $Sb_2O_3$ | Flame retardant Kind | Amount | Burning test (UL) | Impact strength |
|---|---|---|---|---|---|---|---|
| 188* | 95 | 5 | — | — | — | 94HB | 18.1 |
| 189* | 90 | 10 | — | — | — | 94HB | 69.2 |
| 190 | 95 | 5 | 7.5 | (A) | 15 | 94V-1 | 17.2 |
| 191 | 85 | 15 | 7.5 | (A) | 15 | 94V-1 | 110.4 |
| 192 | 90 | 10 | — | (A) | 30 | 94V-0 | 68.5 |
| 193 | 95 | 5 | 5.0 | (G) | 10 | 94V-1 | 16.5 |
| 194 | 90 | 10 | 5.0 | (G) | 10 | 94V-1 | 39.5 |
| 195 | 85 | 15 | 5.0 | (G) | 10 | 94V-1 | 98.8 |
| 196 | 80 | 20 | 5.0 | (G) | 10 | 94V-1 | 102.8 |
| 197 | 90 | 10 | 5.0 | (J) | 10 | 94V-1 | 36.5 |
| 198* | 90 | 10 | 7.5 | (M) | 15 | 94V-1 | 8.2 |

TABLE 5-3

| No. | Amount (part by weight) PN-C | SBR | $Sb_2O_3$ | Flame retardant Kind | Amount | Burning test (UL) | Impact strength |
|---|---|---|---|---|---|---|---|
| 199* | 95 | 5 | — | — | — | 94HB | 17.2 |
| 200* | 90 | 10 | — | — | — | 94HB | 95.4 |
| 201 | 95 | 5 | 7.5 | (A) | 15 | 94V-1 | 17.0 |
| 202 | 80 | 20 | 7.5 | (A) | 15 | 94V-1 | 109.8 |
| 203 | 90 | 10 | — | (A) | 30 | 94V-0 | 93.8 |
| 204 | 90 | 10 | 5.0 | (G) | 10 | 94V-0 | 60.4 |
| 205 | 85 | 15 | 5.0 | (G) | 10 | 94V-0 | 108.2 |
| 206 | 90 | 10 | 7.5 | (I) | 15 | 94V-0 | 42.7 |
| 207* | 90 | 10 | 7.5 | (M) | 15 | 94V-1 | 7.3 |

TABLE 5-4

| No. | Amount (parts by weight) PN-C | CPE | $Sb_2O_3$ | Flame retardant Kind | Amount | Burning test (UL) | Impact strength |
|---|---|---|---|---|---|---|---|
| 208* | 95 | 5 | — | — | — | 94HB | 24.1 |
| 209* | 90 | 10 | — | — | — | 94HB | 95.4 |
| 210 | 90 | 10 | 7.5 | (A) | 15 | 94V-1 | 98.0 |
| 211 | 80 | 20 | 7.5 | (A) | 15 | 94V-0 | 115.6 |
| 212 | 80 | 20 | 5.0 | (G) | 10 | 94V-0 | 106.0 |
| 213 | 90 | 10 | 7.5 | (H) | 15 | 94V-0 | 56.2 |

TABLE 5-5

| No. | Amount (Part by weight) PN-C | PVC | CPE | $Sb_2O_3$ | Flame retardant Kind | Amount | Burning test (UL) | Impact Strength |
|---|---|---|---|---|---|---|---|---|
| 214* | 72 | 24 | 4 | — | — | — | 94HB | 12.8 |
| 215* | 66 | 22 | 12 | — | — | — | 94HB | 20.0 |
| 216* | 45 | 45 | 10 | — | — | — | 94V-1 | 17.5 |
| 217 | 72 | 24 | 4 | 7.5 | (A) | 15 | 94V-0 | 13.0 |
| 218 | 66 | 22 | 12 | 7.5 | (A) | 15 | 94V-0 | 30.5 |
| 219 | 45 | 45 | 10 | 7.5 | (A) | 15 | 94V-0 | 17.0 |
| 220 | 72 | 24 | 4 | 7.5 | (F) | 15 | 94V-0 | 12.4 |
| 221 | 66 | 22 | 12 | 7.5 | (F) | 15 | 94V-0 | 29.4 |
| 222 | 45 | 45 | 10 | 7.5 | (F) | 15 | 94V-0 | 16.6 |
| 223 | 66 | 22 | 12 | 7.5 | (B) | 15 | 94V-0 | 30.9 |
| 223A | 72 | 24 | 4 | 5.0 | (G) | 10 | 94V-0 | 10.1 |
| 224 | 66 | 22 | 12 | 5.0 | (G) | 10 | 94V-0 | 28.5 |
| 225 | 45 | 45 | 10 | 5.0 | (G) | 10 | 94V-0 | 15.8 |
| 226 | 45 | 45 | 10 | 5.0 | (H) | 10 | 94V-0 | 14.7 |
| 227 | 45 | 45 | 10 | 5.0 | (J) | 10 | 94V-0 | 15.1 |
| 228 | 66 | 22 | 12 | 5.0 | (J) | 10 | 94V-0 | 27.7 |

TABLE 5-5-continued

| No. | Amount (Part by weight) PN-C | PVC | CPE | Sb₂O₃ | Flame retardant Kind | A-mount | Burning test (UL) | Impact Stren-gth |
|---|---|---|---|---|---|---|---|---|
| 229* | 66 | 22 | 12 | 7.5 | (M) | 15 | 94V-0 | 2.7 |

Similar results are expected when other resinous materials, graft copolymers and rubbers are substituted for the additives employed in the tested compositions.

Although certain particular embodiments of the invention are disclosed herein, various modifications will be apparent to those skilled in the art to which this invention pertains.

We claim:

1. A thermally stable, flame resistant composition comprising:
   a. a ring-opening polymerization product of a norbornene derivative containing at least one polar group, and
   b. a flame retarding compound in sufficient amounts to elevate flame resistance of said composition without reducing mechanical strength thereof, said flame retarding compound selected from the group consisting of a halogen-containing multicyclic compound of the formula (1) to (3) or a bromine-containing aromatic compound of the formula (4) to (6) as follows:

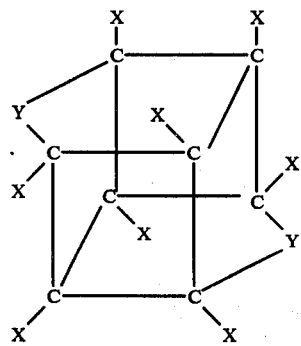

(1)

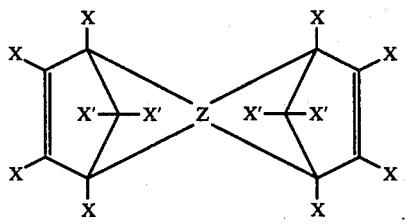

(2)

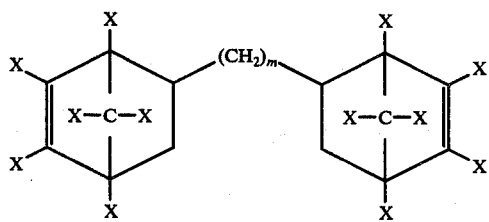

(3)

wherein X is chlorine or bromine, X' is fluorine, chlorine, bromine, alkyl, or alkoxy having 1-20 carbon atoms,

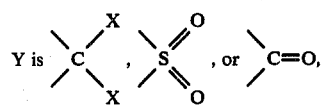

Z is a tetravalent cyclic hydrocarbon group having at least five carbon atoms and m is an integer from 4-16:

(4)

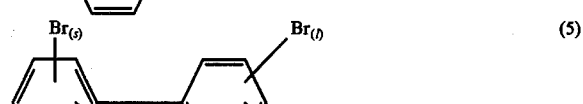

(5)

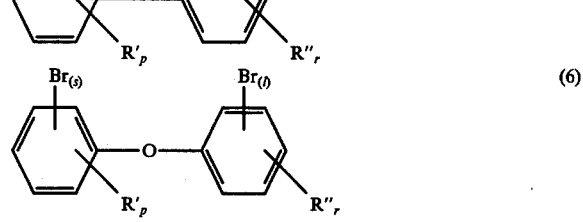

(6)

wherein R is hydrogen, alkyl having 1-6 carbon atoms, bromoalkyl, or hydroxy wherein one R, but not more than one R, is hydroxy; R' and R" are hydrogen or alkyl having 1-6 carbon atoms; n is an integer from 3-6; $l$, $s$, $p$ and $r$ are each integers; the sum of $l$ plus $s$ is an integer from 2-10; and the sum of $l$, $s$, $p$ and $r$ is 10.

2. A composition according to claim 1 wherein said ring-opening polymerization product is a ring-opening polymerization homopolymer of a norborene derivative containing at least one nitrile group.

3. A composition according to claim 1, wherein said ring-opening polymerization product is a ring-opening polymerization homopolymer of a norbornene derivative containing at least one ester group.

4. A composition according to claim 1, wherein said ring-opening polymerization product is a ring-opening polymerization homopolymer of a norbornene derivative containing at least one ether group.

5. A composition according to claim 1, wherein said ring-opening polymerization product is a ring-opening polymerization homopolymer of a norbornene derivative containing at least one N-substituted cyclic imide group.

6. A composition according to claim 1, wherein said ring-opening polymerization product is a ring-opening polymerization homopolymer of a norbornene derivative containing at least one halogen atom.

7. A composition according to claim 1, wherein said ring-opening polymerization product is a ring-opening polymerization copolymer of any combination of a norbornene derivative containing at least one nitrile group, a norbornene derivative containing at least one ester group, a norbornene derivative containing at least one ether group, a norbornene derivative containing at least one N-substituted cyclic imide group and a norbornene derivative containing at least one halogen atom.

8. A composition according to claim 1, wherein said ring-opening polymerization product is a ring-opening polymerization copolymer of (a) a norbornene derivative selected from the group consisting of a norbornene derivative containing at least one nitrile group, a norbornene derivative containing at least one ester group, a norbornene derivative containing at least one ehter group, a norbornene derivative containing at least one N-substituted cyclic imide group and a norbornene derivative containing at least one halogen atom; and (b) a cycloolefinic compound selected from the group consisting of a monocyclic monoolefinic compound, a non-conjugated cyclic polyene compound and a polycyclic olefinic compound, wherein the mole ratio of said norbornene derivative (a) to said cycloolefinic compound (b) is no less then about 1:1.

9. A composition according to claim 1, wherein said ring-opening polymerization product is a ring-opening polymerization copolymer of (a) a norbornene derivative selected from the group consisting of a norbornene derivative containing at least one nitrile group, a norbornene derivative containing at least one ester group, a norbornene derivative containing at least one ether group, a norbornene derivative containing at least one N-substituted cyclic imide group and a norbornene derivative containing at least one halogen atom, and (b) a norbornene derivative containing at least one acid anhydride group, a norbornene derivative containing at least one amide group, an aromatic nitrogen-containing heterocyclic norbornene derivative, an aromatic norbornene derivative, an aromatic norbornadiene derivative, and a norbornadiene derivative containing at least one ester group; wherein the mole ratio of (a) to (b) is no less than about 1:1.

10. A composition according to claim 1, wherein the weight ratio of said flame retarding compound (b) to said ring-opening polymerization product (a) is from about 0.03:1 to 0.45:1.

11. A composition according to claim 1, wherein the said flame retarding compound is a halogen-containing multicyclic compound of the general formula (1):

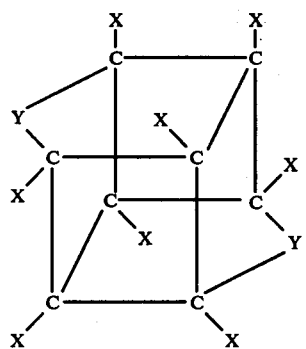

wherein X is chlorine or bromine and

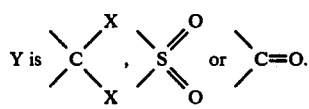

12. A composition according to claim 1, wherein said flame retarding compound is a halogen-containing multicyclic compound of formula (2):

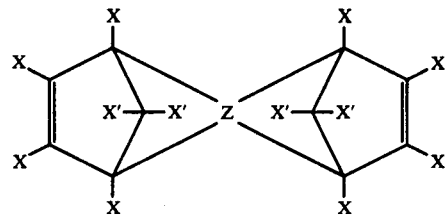

wherein X is chlorine or bromine, X' is fluorine, chlorine, bromine, alkyl or alkoxy having 1-20 carbon atoms and Z is a tetravalent cyclic hydrocarbon group having at least five carbon atoms.

13. A composition according to claim 1, wherein said flame retarding compound is a halogen-containing multicyclic compound of formula (3):

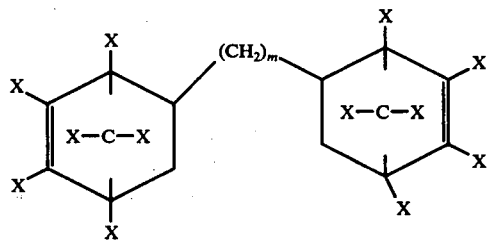

wherein X is chlorine or bromine and $m$ is an integer from 4-16.

14. A composition according to claim 1, wherein said flame retarding compound is a bromine containing aromatic compound of the formula (4):

wherein R is hydrogen, alkyl having 1-6 carbon atoms, bromoalkyl, or hydroxy wherein one R, but not more than one R, is hydroxy; and $n$ is an integer from 3-6.

15. A composition according to claim 1, wherein said flame retarding compound is a bromine-containing aromatic compound of the formula (5):

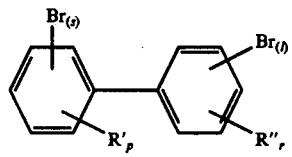

wherein R' and R" are hydrogen or alkyl having 1-6 carbon atoms; $l$, $s$, $p$ and $r$ are each integers; the sum of $l$ plus $s$ is an integer from 2-10; and the sum of $l$, $s$, $p$ and $r$ is 10.

16. A composition according to claim 1, wherein said flame retarding compound is a bromine-containing aromatic compound of the formula (6):

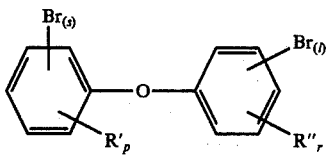

wherein R' and R" are hydrogen or alkyl having 1–6 carbon atoms; $l$, $s$, $p$ and $r$ are each integers; the sum of $l$ plus $s$ is an integer from 2–10 and the sum of $l$, $s$, $p$ and $r$ is 10.

17. A composition according to claim 1, wherein said ring-opening polymerization product is a blend of a ring-opening polymerization product of a norbornene derivative containing at least one polar group and a rubber having a Mooney viscosity from about 10–200.

18. A composition according to claim 1, wherein said ring-opening polymerization product is a blend of a ring-opening polymerization product of a norbornene derivative containing at least one polar group and a resinous material having a molecular weight from about 3,000 to 500,000.

19. A composition according to claim 1, wherein the ring-opening polymerization product is a blend of a ring-opening polymerization product of a norbornene derivative containing at least one polar group and a graft copolymer formed from at least one vinyl compound grafted to a rubber, said vinyl compound having an average molecular weight from about 1,000 to 200,000 and said rubber having a Mooney viscosity from about 20 to 140.

20. A composition according to claim 1, wherein component (a) is a blend of a ring-opening polymerization product of a norbornene derivative containing at least one polar group and a resinous moiety selected from the group consisting of (1) a resinous material having a molecular weight from about 3,000 to 500,000, (2) a graft copolymer of at least one vinyl compound having an average molecular weight from about 1,000 to 200,000 grafted onto a rubber having a Mooney viscosity from about 20 to 140, (3) a rubber having a Mooney viscosity from about 10 to 200, and (4) mixtures thereof.

21. A composition according to claim 20, wherein said blend contains up to about 90 percent by weight, based on the total weight of said blend, of said resinous moiety.

22. A composition according to claim 20, wherein said blend contains said rubber (3) in an amount of up to about 70 percent by weight based on the total weight of said blend.

23. A composition according to claim 18, wherein said resinous material is selected from the group consisting of vinyl chloride homopolymer, styrene homopolymer, methylmethacrylate homopolymer, and copolymers prepared by copolymerizing at least two vinyl monomers selected from the group consisting of vinyl chloride, styrene, acrylonitrile and methylmethacrylate.

24. A composition according to claim 19, wherein said graft copolymer is formed by grafting at least one vinyl compound selected from the group consisting of styrene, acrylonitrile and methylmethacrylate to a rubber.

25. A composition according to claim 17, wherein said rubber is selected from the group consisting of butadiene rubber, chlorinated polyethylene rubber, acrylic ester rubber, ethylene-vinyl acetate rubber, chloroprene rubber, chlorosulfonated polyethylene rubber and alkylene oxide rubber.

26. A composition according to claim 1, wherein component (a) is blended with up to about 10 percent by weight of a metal salt of a fatty acid, based on the total weight of component (a) and said salt.

27. A composition according to claim 1, wherein component (a) is blended with a metal-containing inorganic compound, said metal being selected from Group III to Group V of the Periodic Table, in amounts up to about 0.25 part by weight per part by weight of component (a).

28. A composition according to claim 27 wherein said metal is selected from the group consisting of antimony, bismuth, arsenic, tin, lead, zirconium and boron.

29. A composition according to claim 1, wherein component (a) is blended with a carboxylic acid in amounts up to about 0.07 part by weight acid per part by weight of component (a).

30. A composition according to claim 29, wherein said carboxylic acid is selected from the group consisting of a saturated fatty acid having 6 to 30 carbon atoms, an unsaturated fatty acid having 11 to 24 carbon atoms and derivatives thereof.

31. A composition according to claim 1, wherein component (a) is blended with a dehydrochlorination inhibitor.

32. A composition according to claim 1, wherein component (a) is selected from the group consisting of the ring-opening polymerization homopolymer of 5-cyano-bicyclo [2,2,1]-heptene-2; the ring-opening polymerization homopolymer of 5-methyl-5-methoxycarbonyl-bicyclo [2,2,1]-heptene-2; the ring-opening polymerization copolymer of 5-chlorobicyclo [2,2,1]-heptene-2 and 5,6-dichloromethyl-bicyclo [2,2,1]-heptene-2.

33. A composition according to claim 1, including a metal salt of a fatty acid to enhance the mechanical properties of said composition.

34. A composition according to claim 1, wherein component (a) is the ring-opening polymerization homopolymer of 5-cyano-bicyclo [2,2,1]-heptene -2.

35. A composition according to claim 1, wherein component (a) is the ring-opening polymerization homopolymer of 5-methyl-5-methoxycarbonyl-bicyclo [2,2,1]-heptene-2.

36. A composition according to claim 1, wherein component (a) is the ring-opening polymerization copolymer of 5-chloro-bicyclo [2,2,1]-heptene-2 and 5,6-dichloromethyl- bicyclo [2,2,1]-heptene-2.

37. A composition according to claim 1, wherein flame retarding component (b) is 1,2,3,4,5,6,7,8,10,10,11,11-dodecachloro-1,4; 5,8-dimethanofluorene.

38. A composition according to claim 1, wherein flame retarding component (b) is 1,4,7,10-dimethanocycloocta-1,2,3,4,7,8,9,10,13,13,14,14-dodechloro-$1,4,4_a,5,6,6_a,7,10,10_a,$ $11,12,12_a$-dodecahydro [1,2,5,6]-dibenzene.

39. A composition according to claim 1, wherein flame retarding component (b) is 1,2,3,4,5,6,7,8,12,12,13,13-dodecachloro-1,4; 5,8; 9,10-trimethano-anthracene.

40. A composition according to claim 1, wherein the flame retarding component (b) is hexabromobenzene.

41. A composition according to claim 1, wherein the flame retarding component (b) is decabromodiphenyl.

42. A composition according to claim 1, wherein the flame retarding component (b) is decabromodiphenylether.

43. A shaped article formed from the flame resistant composition of claim 1.

44. Structural material adapted for use in an electrical appliance formed from the flame resistant composition of claim 1.

45. Method for enhancing flame resistance of parts subjected to flame or heat, comprising forming the part from the flame resistant composition of claim 1.

46. A composition according to claim 1 wherein component (a) is a copolymer of (i) a ring-opening polymerization product of a norbornene derivative containing at least one polar group and (ii) a polyolefinic rubber having a Mooney viscosity from about 10 to 200, wherein the weight ratio of (ii) to (i) is no greater than about 10:1.

* * * * *

UNITED STATES PATENT AND TRADEMARK OFFICE
CERTIFICATE OF CORRECTION

PATENT NO. : 4,059,561
DATED : November 22, 1977
INVENTOR(S) : Fumio Arai et al

It is certified that error appears in the above-identified patent and that said Letters Patent are hereby corrected as shown below:

Column 1, line 56, change "process" to --processes--
Column 2, line 2, change "to" to --into--
Column 2, line 35, change "disclosed" to --discolored--
Column 2, line 68, change "brominecontaining" to --bromine-containing--
Column 5, line 31, after "heptene-", insert comma after "2"
Column 6, line 9, insert dash after "carbonyl" (first occurrence)
Column 7, line 13, after "isoproxy" insert dash before "bicyclo"
Column 10, line 40, after "($\alpha$" add --,$\beta$--
Column 12, line 46, change "derivativesinclude" to --derivatives include--
Column 15, line 13, delete "No." (first occurrence)
Column 15, line 16, change "substitute" to --substituent--
Column 15, line 58, "-di(propionyloxymethyl-" should be -- -di(propionyloxymethyl)- --
Column 16, line 65, change "2-norbornene)" to --2(norbornene)--
Column 17, line 40, change "exotypes" to --exo-types--
Column 20, line 17, change "norborene" to --norbornene--
Column 21, line 34, change "polymerized" to --copolymerized--
Column 22, line 8, change "resin",)" to --resin"),--
Column 22, line 37, change "ae" to --are--
Column 22, line 42, change "acrylon-itrile" to --acrylonitrile--
Column 29, line 60, after "0.0005:1" insert --to 0.05:1--
Column 31, line 19, change "If" to --It--

UNITED STATES PATENT AND TRADEMARK OFFICE
CERTIFICATE OF CORRECTION

PATENT NO. : 4,059,561
DATED : November 22, 1977
INVENTOR(S) : Fumio Arai et al

It is certified that error appears in the above-identified patent and that said Letters Patent are hereby corrected as shown below:

In Table 1, col. 33, line 62, under Heading - "Burning Test", change "cm-notched)" to --cm-notched--
In Table 1, col. 35, in Heading "cm-notched" should be --cm-notched)--
In Table 1, col. 36, in Heading "cm-notched" should be --cm-notched)--
Column 53, line 7, change "9a" (first occurrence) to --8a--
Column 53, line 8, after "4," (second occurrence) insert --4a,--
Column 53, line 17, change "N-]" to --N-[--
Column 53, line 29, change "2,2,1[" to --[2,2,1]--
Column 53, line 36, change "α" to --β--
Column 54, line 7, change "5(3-" to --5-(3- --
Column 54, line 30, delete "2,"
Column 54, line 48, change "-heptene," to --heptene- --
Column 54, line 66, after "8" insert --9,--
Column 56, Table 5-1, line designated as 179, change "94V-0.8.7" to --94V-0--
Column 56, Table 5-1, insert --8.7-- into last column
Column 58, line 35, change "norborene" to --norbornene--
Column 59, line 1, change "ehter" to --ether--
Column 62, line 57, change "-dodechloro-" to -- -dodecachloro- --

Signed and Sealed this

Twenty-third Day of May 1978

[SEAL]

Attest:

RUTH C. MASON
Attesting Officer

LUTRELLE F. PARKER
Acting Commissioner of Patents and Trademarks